US010027988B2

(12) United States Patent
Lu et al.

(10) Patent No.: US 10,027,988 B2
(45) Date of Patent: Jul. 17, 2018

(54) IMAGE PROCESSING DEVICE AND METHOD

(71) Applicant: SONY CORPORATION, Tokyo (JP)

(72) Inventors: Shuo Lu, Tokyo (JP); Ohji Nakagami, Tokyo (JP)

(73) Assignee: SONY CORPORATION, Tokyo (JP)

( * ) Notice: Subject to any disclaimer, the term of this patent is extended or adjusted under 35 U.S.C. 154(b) by 81 days.

(21) Appl. No.: 14/420,402

(22) PCT Filed: Sep. 9, 2013

(86) PCT No.: PCT/JP2013/074240
§ 371 (c)(1),
(2) Date: Feb. 9, 2015

(87) PCT Pub. No.: WO2014/045920
PCT Pub. Date: Mar. 27, 2014

(65) Prior Publication Data
US 2015/0215652 A1 Jul. 30, 2015

(30) Foreign Application Priority Data

Sep. 20, 2012 (JP) ................................ 2012-207043
Sep. 21, 2012 (JP) ................................ 2012-207794

(51) Int. Cl.
*H04N 19/86* (2014.01)
*H04N 19/82* (2014.01)
(Continued)

(52) U.S. Cl.
CPC ........... *H04N 19/86* (2014.11); *H04N 19/117* (2014.11); *H04N 19/14* (2014.11); *H04N 19/176* (2014.11);
(Continued)

(58) Field of Classification Search
CPC .... H04N 19/117; H04N 19/14; H04N 19/176; H04N 19/44; H04N 19/51; H04N 19/577;
(Continued)

(56) References Cited

U.S. PATENT DOCUMENTS 9,088,800 B2 * 7/2015 Wang ..................... H04N 19/30
2007/0025448 A1 * 2/2007 Cha ...................... H04N 19/159
375/240.24
(Continued)

FOREIGN PATENT DOCUMENTS

JP 2008-193548 A 8/2008

OTHER PUBLICATIONS

U.S. Appl. No. 14/123,375, filed Dec. 2, 2013, 2014-0112396, Ikeda.
(Continued)

*Primary Examiner* — Behrooz Senfi
(74) *Attorney, Agent, or Firm* — Oblon, McClelland, Maier & Neustadt, L.L.P.

(57) ABSTRACT

The present invention relates to image processing device and method which can suppress block noise. A filter strength determination unit determines the filter strength for every four lines under the control of a control unit. In other words, if a block boundary determination unit has determined to perform filtering, the filter strength determination unit determines at which strength of the strong filter or the weak filter the filtering process is performed, and outputs the determination result to a filter calculation unit. On this occasion, the filter strength determination unit uses the Bs value in the determination formula of the strong filter. For example, in the case of using the Bs value, the threshold of the determination is set in accordance with a linear function of the Bs value from the control unit. The present disclosure can be applied to, for example, an image processing device.

7 Claims, 29 Drawing Sheets

(51) Int. Cl.
*H04N 19/44* (2014.01)
*H04N 19/577* (2014.01)
*H04N 19/51* (2014.01)
*H04N 19/593* (2014.01)
*H04N 19/80* (2014.01)
*H04N 19/91* (2014.01)
*H04N 19/176* (2014.01)
*H04N 19/117* (2014.01)
*H04N 19/14* (2014.01)

(52) U.S. Cl.
CPC ............ *H04N 19/44* (2014.11); *H04N 19/51* (2014.11); *H04N 19/577* (2014.11); *H04N 19/593* (2014.11); *H04N 19/80* (2014.11); *H04N 19/82* (2014.11); *H04N 19/91* (2014.11)

(58) Field of Classification Search
CPC ...... H04N 19/593; H04N 19/80; H04N 19/82; H04N 19/86; H04N 19/91; H04N 19/30; H04N 19/70; H04N 19/61; G06T 9/00
USPC ..................................................... 375/240.29
See application file for complete search history.

(56) References Cited

U.S. PATENT DOCUMENTS

| | | | | |
|---|---|---|---|---|
| 2008/0199090 A1* | 8/2008 | Tasaka | ................. | H04N 19/139 382/233 |
| 2010/0315555 A1* | 12/2010 | Sakurai | .................... | H04N 5/21 348/563 |
| 2011/0194614 A1* | 8/2011 | Norkin | ................. | H04N 19/176 375/240.24 |
| 2013/0182762 A1* | 7/2013 | Seregin | ................ | H04N 19/176 375/240.03 |
| 2013/0251029 A1* | 9/2013 | Ikeda | ............... | H04N 19/00012 375/240.02 |
| 2013/0301944 A1* | 11/2013 | Kim | .......................... | G06T 9/00 382/233 |
| 2014/0050413 A1* | 2/2014 | Sato | .......................... | G06T 9/00 382/233 |
| 2014/0112396 A1 | 4/2014 | Ikeda | | |
| 2014/0233660 A1* | 8/2014 | Sato | ................... | H04N 19/0089 375/240.29 |

OTHER PUBLICATIONS

U.S. Appl. No. 14/382,970, filed Sep. 4, 2014, Lu, et al.
U.S. Appl. No. 14/420,402, filed Feb. 9, 2015, Lu, et al.
U.S. Appl. No. 14/420,115, filed Feb. 6, 2015, Lu, et al.
International Search Report dated Dec. 3, 2013 in PCT/JP2013/074240.
Shuo Lu, et al., "AHG6: On deblocking filter parameters" Joint Collaborative Team on Video Coding (JCT-VC) of ITU-T SG 16 WP 3 and ISO/IEC JTC 1/SC 29/WG 11, Jul. 2012, 15 Pages.
Andrey Norkin, "AHG6: Reduction of block artifacts in HEVC for large blocks" Joint Collaborative Team on Video Coding (JCT-VC) of ITU-T SG 16 WP 3 and ISO/IEC JTC 1/SC 29/WG 11, Jul. 2012, 18 Pages.
Benjamin Bross, et al., "High efficiency video coding (HEVC) text specification draft 8" Joint Collaborative Team on Video Coding (JCT-VC) of ITU-T SG16 WP3 and ISO/IEC JTC1/SC29/WG11, Jul. 2012, 260 Pages.
Combined Chinese Office Action and Search Report dated Jul. 17, 2017 in Patent Application No. 201380047679.3 (with English Translation).
Combined Chinese Office Action and Search Report dated Jul. 4, 2017 in Patent Application No. 201380047681.0 (with English Translation).
Japanese Office Action dated Jul. 18, 2017 in Patent Application No. 2014-536755 (without English Translation).
Japanese Office Action dated Jul. 18, 2017 in Patent Application No. 2014-536756 (without English Translation).

* cited by examiner

FIG. 6

$$|p_{3i}-p_{0i}|+|q_{3i}-q_{0i}|<((f1(Bs)*\text{beta})>>3)$$

IN CASE OF f1(Bs) = Bs+2    THRESHOLD A

Not intra:  (3*beta) >> 3
Intra:      (4*beta) >> 3

| QP | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| CONVENTIONAL TECHNIQUE | 0 | 0 | 0 | 0 | 0 | 0 | 0 | 0 | 0 | 0 | 0 | 0 | 0 | 0 | 0 | 0 | 0 | 0 | 1 |
| PRESENT TECHNIQUE (not intra) | 0 | 0 | 0 | 0 | 0 | 0 | 0 | 0 | 0 | 0 | 0 | 0 | 0 | 0 | 0 | 0 | 2 | 2 | 3 |
| PRESENT TECHNIQUE (intra) | 0 | 0 | 0 | 0 | 0 | 0 | 0 | 0 | 0 | 0 | 0 | 0 | 0 | 0 | 0 | 0 | 3 | 3 | 4 |

| QP | 19 | 20 | 21 | 22 | 23 | 24 | 25 | 26 | 27 | 28 | 29 | 30 | 31 | 32 | 33 | 34 | 35 | 36 | 37 |
|---|---|---|---|---|---|---|---|---|---|---|---|---|---|---|---|---|---|---|---|
| CONVENTIONAL TECHNIQUE | 1 | 1 | 1 | 1 | 1 | 1 | 1 | 2 | 2 | 2 | 2 | 2 | 3 | 3 | 3 | 3 | 4 | 4 | 4 |
| PRESENT TECHNIQUE (not intra) | 3 | 4 | 4 | 4 | 4 | 5 | 5 | 6 | 6 | 6 | 7 | 8 | 9 | 9 | 10 | 11 | 12 | 12 | 13 |
| PRESENT TECHNIQUE (intra) | 5 | 5 | 5 | 6 | 6 | 7 | 7 | 8 | 8 | 9 | 10 | 11 | 12 | 13 | 14 | 15 | 16 | 17 | 18 |

| QP | 38 | 39 | 40 | 41 | 42 | 43 | 44 | 45 | 46 | 47 | 48 | 49 | 50 | 51 | 52 | 53 |
|---|---|---|---|---|---|---|---|---|---|---|---|---|---|---|---|---|
| CONVENTIONAL TECHNIQUE | 4 | 5 | 5 | 5 | 5 | 6 | 6 | 6 | 6 | 7 | 7 | 7 | 7 | 8 | — | — |
| PRESENT TECHNIQUE (not intra) | 14 | 15 | 15 | 16 | 17 | 18 | 18 | 19 | 20 | 21 | 21 | 22 | 23 | 24 | — | — |
| PRESENT TECHNIQUE (intra) | 19 | 20 | 21 | 22 | 23 | 24 | 25 | 26 | 27 | 28 | 29 | 30 | 31 | 32 | — | — |

FIG. 8

$$2*(|p_{2i}-2*p_{1i}+p_{0i}|+|q_{2i}-2*q_{1i}+q_{0i}|) < ((f2(Bs)*beta)>>2) \quad \text{THRESHOLD B}$$

IN CASE OF $f2(Bs)=Bs+2$

Not intra: $(3*beta)>>2$
Intra: $(4*beta)>>2$

| QP | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| CONVENTIONAL TECHNIQUE | 0 | 0 | 0 | 0 | 0 | 0 | 0 | 0 | 0 | 0 | 0 | 0 | 0 | 0 | 0 | 0 | 1 | 1 | 2 |
| PRESENT TECHNIQUE (not intra) | 0 | 0 | 0 | 0 | 0 | 0 | 0 | 0 | 0 | 0 | 0 | 0 | 0 | 0 | 0 | 0 | 4 | 5 | 6 |
| PRESENT TECHNIQUE (intra) | 0 | 0 | 0 | 0 | 0 | 0 | 0 | 0 | 0 | 0 | 0 | 0 | 0 | 0 | 0 | 0 | 6 | 7 | 8 |

| QP | 19 | 20 | 21 | 22 | 23 | 24 | 25 | 26 | 27 | 28 | 29 | 30 | 31 | 32 | 33 | 34 | 35 | 36 | 37 |
|---|---|---|---|---|---|---|---|---|---|---|---|---|---|---|---|---|---|---|---|
| CONVENTIONAL TECHNIQUE | 2 | 2 | 2 | 3 | 3 | 3 | 3 | 4 | 4 | 4 | 5 | 5 | 6 | 6 | 7 | 7 | 8 | 8 | 9 |
| PRESENT TECHNIQUE (not intra) | 6 | 7 | 8 | 9 | 9 | 10 | 11 | 12 | 12 | 13 | 14 | 15 | 16 | 18 | 19 | 21 | 22 | 24 | 25 | 27 |
| PRESENT TECHNIQUE (intra) | 9 | 10 | 11 | 12 | 13 | 14 | 15 | 16 | 17 | 18 | 20 | 22 | 24 | 26 | 28 | 30 | 32 | 34 | 36 |

| QP | 38 | 39 | 40 | 41 | 42 | 43 | 44 | 45 | 46 | 47 | 48 | 49 | 50 | 51 | 52 | 53 |
|---|---|---|---|---|---|---|---|---|---|---|---|---|---|---|---|---|
| CONVENTIONAL TECHNIQUE | 9 | 10 | 10 | 11 | 11 | 12 | 12 | 13 | 13 | 14 | 14 | 15 | 15 | 16 | – | – | – |
| PRESENT TECHNIQUE (not intra) | 28 | 30 | 31 | 33 | 34 | 36 | 37 | 39 | 40 | 42 | 43 | 45 | 46 | 48 | – | – | – |
| PRESENT TECHNIQUE (intra) | 38 | 40 | 42 | 44 | 46 | 48 | 50 | 52 | 54 | 56 | 58 | 60 | 62 | 64 | – | – | – |

IN CASE OF $f3(Bs) = Bs + 2$  THRESHOLD C

Not intra: $(3 * tc * 5 + 1) >> 1$
Intra: $(4 * tc * 5 + 1) >> 1$

| QP | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| CONVENTIONAL TECHNIQUE | 0 | 0 | 0 | 0 | 0 | 0 | 0 | 0 | 0 | 0 | 0 | 0 | 0 | 0 | 0 | 0 | 0 | 0 | 3 |
| PRESENT TECHNIQUE (not intra) | 0 | 0 | 0 | 0 | 0 | 0 | 0 | 0 | 0 | 0 | 0 | 0 | 0 | 0 | 0 | 0 | 0 | 0 | 8 |
| PRESENT TECHNIQUE (intra) | 0 | 0 | 0 | 0 | 0 | 0 | 0 | 0 | 0 | 0 | 0 | 0 | 0 | 0 | 0 | 0 | 0 | 0 | 10 |

| QP | 19 | 20 | 21 | 22 | 23 | 24 | 25 | 26 | 27 | 28 | 29 | 30 | 31 | 32 | 33 | 34 | 35 | 36 | 37 |
|---|---|---|---|---|---|---|---|---|---|---|---|---|---|---|---|---|---|---|---|
| CONVENTIONAL TECHNIQUE | 3 | 3 | 3 | 3 | 3 | 3 | 3 | 3 | 5 | 5 | 5 | 5 | 8 | 8 | 8 | 8 | 10 | 10 | 10 |
| PRESENT TECHNIQUE (not intra) | 8 | 8 | 8 | 8 | 8 | 8 | 8 | 15 | 15 | 15 | 15 | 15 | 23 | 23 | 23 | 23 | 30 | 30 | 30 |
| PRESENT TECHNIQUE (intra) | 10 | 10 | 10 | 10 | 10 | 10 | 10 | 20 | 20 | 20 | 20 | 20 | 30 | 30 | 30 | 30 | 40 | 40 | 40 |

| QP | 38 | 39 | 40 | 41 | 42 | 43 | 44 | 45 | 46 | 47 | 48 | 49 | 50 | 51 | 52 | 53 |
|---|---|---|---|---|---|---|---|---|---|---|---|---|---|---|---|---|
| CONVENTIONAL TECHNIQUE | 13 | 13 | 15 | 15 | 18 | 20 | 23 | 25 | 28 | 33 | 35 | 40 | 45 | 50 | – | – | – |
| PRESENT TECHNIQUE (not intra) | 38 | 38 | 45 | 45 | 53 | 60 | 68 | 75 | 83 | 98 | 105 | 120 | 135 | 150 | – | – | – |
| PRESENT TECHNIQUE (intra) | 50 | 50 | 60 | 60 | 70 | 80 | 90 | 100 | 110 | 130 | 140 | 160 | 180 | 200 | – | – | – |

IMAGE PROCESSING DEVICE AND METHOD

TECHNICAL FIELD

The present disclosure relates to image processing device and method, and particularly to image processing device and method that can suppress block noise.

BACKGROUND ART

In recent years, a device has become popular that handles image information digitally and for the purpose of highly efficiently transmitting and accumulating pieces of information, compresses and encodes an image by employing an encoding method that compresses the image through the motion compensation and orthogonal transform such as discrete cosine transform by using the redundancy unique to the image information. This encoding method includes, for example, MPEG (Moving Picture Experts Group) and H.264 and MPEG-4 Part 10 (Advanced Video Coding, hereinafter referred to as H.264/AVC).

Recently, for the purpose of further improving the encoding efficiency over H.264/AVC, JCTVC (Joint Collaboration Team-Video Coding) as the ITU-T and ISO/IEC joint standardization group has advanced the standardization of the encoding method called HEVC (High Efficiency Video Coding) (for example, see Non-Patent Document 1).

In the current draft of HEVC, a deblocking filter is employed as one of in-loop filters. As the deblocking filters, a strong filter and a weak filter are given; which one is employed is determined by using a filter determination formula for the block boundary.

In other words, whether to apply the strong filter or not is determined using the determination formula of the strong filter and for the block boundary where it has been determined that the strong filter is not applied, whether to apply the weak filter or not is determined using the determination formula of the weak filter.

CITATION LIST

Non-Patent Document

Non-Patent Document 1: Benjamin Bross, Woo-Jin Han, Jens-Rainer Ohm, Gary J. Sullivan, Thomas Wiegand, "High efficiency video coding (HEVC) text specification draft 8", JCTVC-J1003_d7, 2012 Jul. 28

SUMMARY OF THE INVENTION

Problems to be Solved by the Invention

However, if the determination formula of the strong filter in the HEVC draft is still used, the weak filter is often applied in the portion where the block noise is remarkable, in which case the block noise may remain.

The present disclosure has been made in view of the above and can suppress the block noise.

Solutions to Problems

An image processing device according to a first aspect of the present disclosure includes: a filter determination unit that determines whether to apply a strong filter by using a strength parameter representing strength of a deblocking filter for a block boundary, which is a boundary between a block of an image locally decoded when an image is encoded, and an adjacent block adjacent to the block; a filter unit that applies the strong filter for the block boundary if the filter determination unit has determined to apply the strong filter; and an encoding unit that encodes the image in units having a layer structure by using the image to which the strong filter has been applied by the filter unit.

The filter determination unit can determine whether to apply the strong filter by using a strength parameter representing the strength of the deblocking filter for the block boundary and a determination parameter representing a threshold used in the determination of the deblocking filter.

Whether to apply the strong filter can be determined by using a value obtained by multiplying the strength parameter by the determination parameter.

The filter determination unit can determine whether to apply the strong filter by using a function in which the strength parameter or the determination parameter is a variable.

The filter determination unit can determine whether to apply the strong filter by using a linear function of the strength parameter and the determination parameter.

The strength parameter is larger when a prediction mode is intra prediction than when the prediction mode is inter prediction.

The strength parameter is a value of Bs (Boundary Filtering Strength).

The determination parameter is beta used in the determination of whether to apply the deblocking filter and the determination of the strength selection of the deblocking filter.

In an image processing method according to a first aspect of the present disclosure, an image processing device performs the steps of: determining whether to apply a strong filter by using a strength parameter representing strength of a deblocking filter for a block boundary, which is a boundary between a block of an image locally decoded when an image is encoded, and an adjacent block adjacent to the block; applying the strong filter for the block boundary if it has been determined to apply the strong filter; and encoding the image in units having a layer structure by using the image to which the strong filter has been applied.

In the first aspect of the present disclosure, it is determined whether to apply a strong filter by using a strength parameter representing strength for a block boundary, which is a boundary between a block of an image locally decoded when an image is encoded, and an adjacent block adjacent to the block. If it has been determined to apply the strong filter, the strong filter is applied for the block boundary, and the image is encoded in units having a layer structure by using the image to which the strong filter has been applied.

The image processing device may be an independent device or an internal block included in one image encoding device or image decoding device.

Effects of the Invention

According to the first aspect of the present disclosure, the image can be encoded, and particularly the block noise can be suppressed.

BRIEF DESCRIPTION OF DRAWINGS

FIG. 6 is a diagram illustrating the relation between a quantization parameter and a value of the right side of Formula (4) when f1(Bs)=Bs+2.

FIG. 8 is a diagram illustrating the relation between the quantization parameter and a value of the right side of Formula (5) when f2(Bs)=Bs+2.

FIG. 10 is a diagram illustrating the relation between the quantization parameter and a value of the right side of Formula (6) when f3(Bs)=Bs+2.

MODE FOR CARRYING OUT THE INVENTION

A mode for carrying out the present disclosure (hereinafter referred to as an embodiment) is hereinafter described in the following order:

1. Summary of device and operation
2. First embodiment (image encoding device, image decoding device)
3. Second embodiment (multi-viewpoint image encoding/decoding)
4. Third embodiment (layer image encoding/decoding)
5. Fourth embodiment (computer)
6. Application example
7. Fifth embodiment (set, unit, module, processor)

1. Summary of Device and Operation

[Structure Example of Image Encoding Device]

Figure 1:
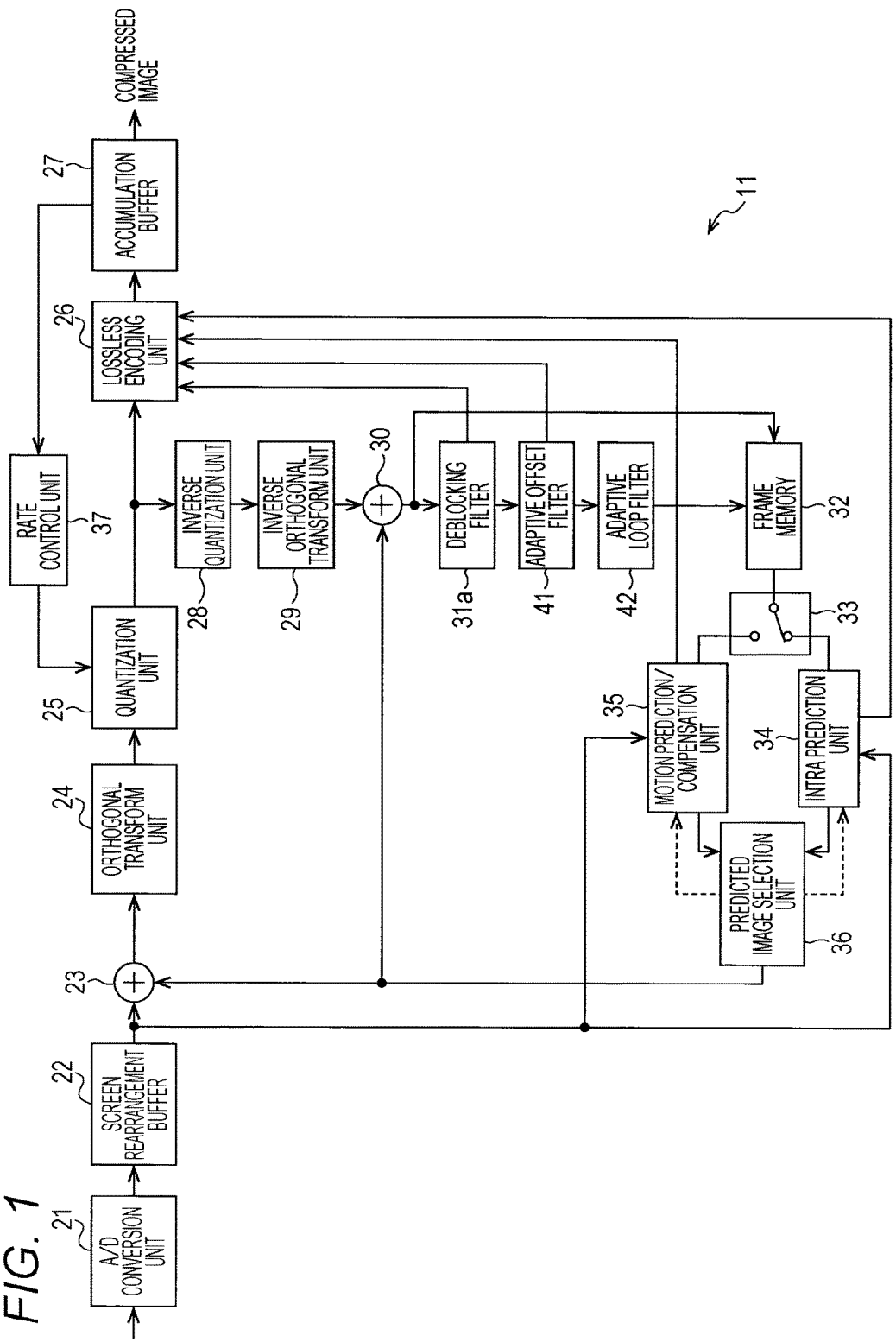
FIG. 1 is a block diagram illustrating a main structure example of an image encoding device.

FIG. 1 illustrates a structure of one embodiment of an image encoding device as an image processing device to which the present disclosure has been applied.

An image encoding device 11 illustrated in FIG. 1 encodes the image data through a prediction process. As the encoding method, for example, the HEVC (High Efficiency Video Coding) method or the like is used.

Note that the coding unit (CU (Coding Unit)) is defined in the HEVC method. CU is also referred to as Coding Tree Block (CTB) and is the partial region of the image in units of picture that plays a role similar to the macroblock in the H.264/AVC method. While the latter is fixed to the size of 16×16 pixels, the size of the former is not fixed and will be specified in the image compression information in each sequence.

For example, in the sequence parameter set (SPS (Sequence Parameter Set)) included in the encoded data to be the output, the maximum size of CU (LCU (Largest Coding Unit)) and the minimum size of CU (SCU (Smallest Coding Unit)) are defined.

In each LCU, by setting to split–flag=1 in the range that the size does not become less than the size of SCU, the unit can be divided into the smaller CUs. When the split_flag has a value of "1", the CU with a size of 2N×2N is divided into CUs with a size of N×N in a one-lower layer.

Moreover, the CU is divided into prediction units (Prediction Units (PUs)), each region serving as a region to be subjected to the intra prediction or inter prediction (partial region of the image in units of picture), and into transform units (Transform Units (TUs)), each region serving as a region to be subjected to the orthogonal transform (partial region of the image in units of picture). At present, in the HEVC method, in addition to the 4×4 and 8×8 orthogonal transforms, 16×16 and 32×32 orthogonal transforms can be used.

The image encoding device 11 of FIG. 1 includes an A/D (Analog/Digital) conversion unit 21, a screen rearrangement buffer 22, a calculation unit 23, an orthogonal transform unit 24, a quantization unit 25, a lossless encoding unit 26, and an accumulation buffer 27. The image encoding device 11 includes an inverse quantization unit 28, an inverse orthogonal transform unit 29, a calculation unit 30, a deblocking filter 31a, a frame memory 32, a selection unit 33, an intra prediction unit 34, a motion prediction/compensation unit 35, a predicted image selection unit 36, and a rate control unit 37.

Moreover, the image encoding device 11 includes an adaptive offset filter 41 and an adaptive loop filter 42 between the deblocking filter 31a and the frame memory 32.

The A/D conversion unit 21 performs the A/D conversion of the input image data and outputs the data to the screen rearrangement buffer 22 and stores the data therein.

The screen rearrangement buffer 22 rearranges the images, whose frames have been arranged in the order of display as stored, in the order of the encoding in accordance with GOP (Group of Picture). The screen rearrangement buffer 22 supplies the images whose frames have been rearranged, to the calculation unit 23. The screen rearrangement buffer 22 also supplies the images whose frames have been rearranged, to the intra prediction unit 34 and the motion prediction/compensation unit 35.

The calculation unit 23 subtracts the predicted image supplied from the intra prediction unit 34 or the motion prediction/compensation unit 35 through the predicted image selection unit 36 from the image read out from the screen rearrangement buffer 22, and outputs the differential information to the orthogonal transform unit 24.

For example, in the case of the image for which the intra-encoding is performed, the calculation unit 23 subtracts the predicted image supplied from the intra prediction unit 34 from the image read out from the screen rearrangement buffer 22. Moreover, in the case of the image for which the inter-encoding is performed, the calculation unit 23 subtracts the predicted image supplied from the motion prediction/compensation unit 35 from the image read out from the screen rearrangement buffer 22.

The orthogonal transform unit 24 performs the orthogonal transform such as the discrete cosine transform or Karhunen-Loeve transform on the differential information supplied from the calculation unit 23. The orthogonal transform unit 24 supplies the transform coefficient to the quantization unit 25.

The quantization unit 25 quantizes the transform coefficient output from the orthogonal transform unit 24. The quantization unit 25 supplies the quantized transform coefficient to the lossless encoding unit 26.

The lossless encoding unit 26 performs the lossless encoding such as the variable-length encoding or arithmetic encoding on the quantized transform coefficient.

The lossless encoding unit 26 acquires the parameter such as the information representing the intra prediction mode from the intra prediction unit 34, and acquires the parameter such as the information representing the inter prediction mode or the motion vector information from the motion prediction/compensation unit 35.

The lossless encoding unit 26 encodes the quantized transform coefficient and encodes the acquired parameters (syntax elements) and makes these a part of the header information of the encoded data (multiplexing). The lossless encoding unit 26 supplies the encoded data to the accumulation buffer 27 and accumulates the data therein.

For example, in the lossless encoding unit 26, the lossless encoding process such as the variable-length encoding or the arithmetic encoding is conducted. As the variable-length encoding, for example, CAVLC (Context-Adaptive Variable Length Coding) is given. As the arithmetic encoding, for example, CABAC (Context-Adaptive Binary Arithmetic Coding) is given.

The accumulation buffer 27 temporarily holds the encoded stream (data) supplied from the lossless encoding unit 26. The accumulation buffer 27 outputs the encoded data as the encoded image to, for example, a transmission path or a recording device in the later stage, which is not shown, at a predetermined timing. In other words, the accumulation buffer 27 also serves as a transmission unit that transmits the encoded stream.

The transform coefficient quantized in the quantization unit 25 is also supplied to the inverse quantization unit 28. The inverse quantization unit 28 inversely quantizes the quantized transform coefficient by a method corresponding to the quantization by the quantization unit 25. The inverse quantization unit 28 supplies the obtained transform coefficient to the inverse orthogonal transform unit 29.

The inverse orthogonal transform unit 29 performs the inverse orthogonal transform on the supplied transform coefficient by a method corresponding to the orthogonal transform process by the orthogonal transform unit 24. The output that has been subjected to the inverse orthogonal transform (recovered differential information) is supplied to the calculation unit 30.

The calculation unit 30 adds the predicted image supplied from the intra prediction unit 34 or the motion prediction/compensation unit 35 through the predicted image selection unit 36 to the inverse orthogonal transform result supplied from the inverse orthogonal transform unit 29, i.e., the recovered differential information, thereby providing the locally decoded image (decoded image).

For example, if the differential information corresponds to the image for which the intra encoding is performed, the calculation unit 30 adds the predicted image supplied from the intra prediction unit 34 to the differential information. For example, if the differential information corresponds to the image for which the inter encoding is performed, the calculation unit 30 adds the predicted image supplied from the motion prediction/compensation unit 35 to the differential information.

The decoded image, which is the result of addition, is supplied to the deblocking filter 31a and the frame memory 32.

The deblocking filter 31a suppresses the block distortion of the decoded image by performing the deblocking filtering process as appropriate. The deblocking filter 31a has the strong (strong) filter and weak (weak) filter, and which filter is to be used is determined by using determination formulae. The determination formulae of the strong filter include three determination formulae, and each employs a value of Bs (Boundary Filtering Strength) in addition to the parameter beta or tc obtained based on the quantization parameter QP. The parameters beta and tc are the thresholds used in the determination related to the filter, and are the determination parameters used in determining whether to apply the deblocking filter and determining the strength selection. The parameter tc is the parameter also used for the filter itself. The value of Bs is the strength parameter representing the strength for the block boundary.

The deblocking filter 31a can be disabled by the user instruction, and the ON/OFF information representing whether to apply the deblocking filter or not is input to the deblocking filter 31a by the user through the operation of the operation unit, which is not shown. Each offset of the aforementioned parameters beta and tc is 0 by default, and if the value is not 0, the value is input to the deblocking filter 31a by the user operation through the operation unit, which is not shown. The ON/OFF information (also referred to as DisableDeblockingFilter flag information) of the deblocking filter and each offset of the parameters beta and tc are encoded in the lossless encoding unit 26 as the parameters of the deblocking filter, and transmitted to an image decoding device 51 of FIG. 3 as described below.

The deblocking filter 31a performs the deblocking filtering process using the aforementioned ON/OFF information, the offset, the Bs value, the parameters beta and tc, and the like for the image from the calculation unit 30. The deblocking filter 31a supplies the filtering process result to the adaptive offset filter 41. Note that the detailed structure of the deblocking filter 31a is described below with reference to FIG. 13.

The adaptive offset filter 41 performs the offset filter (SAO: Sample adaptive offset) process especially for suppressing ringing for the image after the filtering with the deblocking filter 31a.

The types of the offset filters include two type of band offset, six types of edge offset, and non-offset, which are nine types in total. The adaptive offset filter 41 performs the filtering process for the image after the filtering with the deblocking filter 31a using the offset value for each region (such as LOU), for which the type of offset filter is decided for each LCU. The adaptive offset filter 41 supplies the image after the filtering process to the adaptive loop filter 42.

In the image encoding device 11, the offset value for each LCU is calculated by the adaptive offset filter 41 and used. The calculated offset value for each LCU is encoded in the lossless encoding unit 26 as the adaptive offset parameter, and transmitted to the image decoding device 51 of FIG. 3, which is described below.

The adaptive loop filter 42 performs the adaptive loop filter (ALF: AdaptiveLoop Filter) process on the image after the filtering with the adaptive offset filter 41 in units of process (such as LCU) using a filter coefficient. As the adaptive loop filter 42, for example, a two-dimensional Wiener Filter (Wiener Filter) is used. Needless to say, a filter other than the Wiener Filter may be used. The adaptive loop filter 42 supplies the filtering process result to the frame memory 32.

Although not illustrated in the example of FIG. 1, the filter coefficient in the image encoding device 11 is calculated by the adaptive loop filter 42 in units of process so that the difference from the original image from the screen rearrangement buffer 12 is minimized, and then used. The calculated filter coefficient is encoded in the lossless encoding unit 26 as the adaptive loop filter parameter and transmitted to the image decoding device 51 of FIG. 3, which is described below.

The frame memory 32 outputs the accumulated reference images at a predetermined timing to the intra prediction unit 34 or the motion prediction/compensation unit 35 through the selection unit 33.

For example, in the case of the image for which the intra encoding is performed, the frame memory 32 supplies the reference image to the intra prediction unit 34 through the selection unit 33. For example, in the case where the inter encoding is performed, the frame memory 32 supplies the reference image to the motion prediction/compensation unit 35 through the selection unit 33.

If the reference image supplied from the frame memory 32 is the image for which the intra encoding is performed, the selection unit 33 supplies the reference image to the intra prediction unit 34. Moreover, if the reference image supplied from the frame memory 32 is the image for which the inter encoding is performed, the selection unit 33 supplies the reference image to the motion prediction/compensation unit 35.

The intra prediction unit 34 performs the intra prediction (in-screen prediction) for generating the predicted image using the pixel value in the screen. The intra prediction unit 34 performs the intra prediction in a plurality of modes (intra prediction mode).

The intra prediction unit 34 generates the predicted image in all the intra prediction modes, evaluates each predicted image, and then selects the optimum mode. Upon the selection of the optimum intra prediction mode, the intra prediction unit 34 supplies the predicted image generated in that optimum mode to the calculation unit 23 or the calculation unit 30 through the predicted image selection unit 36.

As described above, the intra prediction unit 34 supplies the intra prediction mode information representing the employed intra prediction mode to the lossless encoding unit 26 as appropriate.

In regard to the image for which the inter encoding is performed, the motion prediction/compensation unit 35 performs the motion prediction using the input image supplied from the screen rearrangement buffer 22 and the reference image supplied from the frame memory 32 through the selection unit 33. The motion prediction/compensation unit 35 generates the predicted image (inter predicted image information) through the motion compensation process according to the motion vector detected by the motion prediction.

The motion prediction/compensation unit 35 generates the predicted image by performing the inter prediction process in all the inter prediction mode candidates. The motion prediction/compensation unit 35 supplies the generated predicted image to the calculation unit 23 or the calculation unit 30 through the predicted image selection unit 36.

The motion prediction/compensation unit 35 supplies the parameters such as the inter prediction mode information representing the employed inter prediction mode and the motion vector information representing the calculated motion vector to the lossless encoding unit 26.

In the case of the image for which the intra encoding is performed, the predicted image selection unit 36 supplies the output of the intra prediction unit 34 to the calculation unit 23 or the calculation unit 30; in the case of the image for which the inter encoding is performed, the predicted image selection unit 36 supplies the output of the motion prediction/compensation unit 35 to the calculation unit 23 or the calculation unit 30.

The rate control unit 37 controls the rate of the quantization operation of the quantization unit 25 based on the compressed image accumulated in the accumulation buffer 27 so that the overflow or the underflow does not occur.

[Operation of Image Encoding Device]

Figure 2:
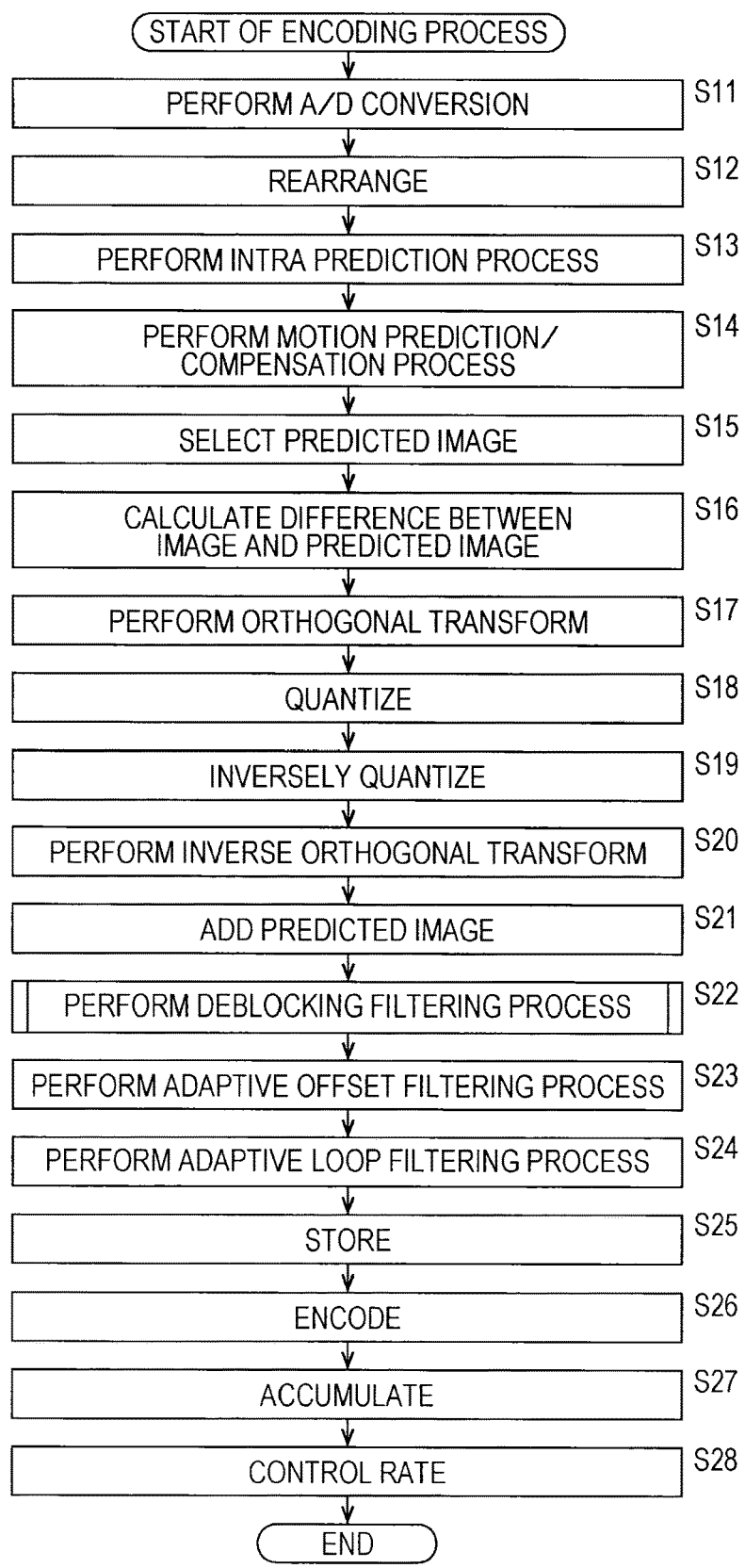
FIG. 2 is a flowchart for describing an example of the flow of an encoding process.

With reference to FIG. 2, the flow of the encoding process to be executed by the aforementioned image encoding device 11 is described.

In step S11, the A/D conversion unit 21 performs the A/D conversion of the input images. In step S12, the screen rearrangement buffer 22 stores the images after the A/D conversion, and rearranges the pictures, which have been arranged in the order of display, in the order of encoding.

If the image to be processed, which is supplied from the screen rearrangement buffer 22, is the image of the block for which the intra process is performed, the decoded image to be referred to is read out of the frame memory 32 and supplied to the intra prediction unit 34 through the selection unit 33.

Based on these images, in step S13, the intra prediction unit 34 performs the intra prediction on the pixels in the block to be processed in all the intra prediction mode candidate. As the decoded pixel to be referred to, the pixel for which the filtering with the deblocking filter 31a is not performed is used.

Through this process, the intra prediction is performed in all the intra prediction mode candidates, and the cost function value is calculated for all the intra prediction mode candidates. Based on the calculated cost function value, the optimum intra prediction mode is selected and the predicted image generated by the intra prediction in the optimum intra prediction mode and the cost function value are supplied to the predicted image selection unit 36.

If the image to be processed, which is supplied from the screen rearrangement buffer 22, is the image for which the inter process is performed, the image to be referred to is read out of the frame memory 32 and supplied to the motion prediction/compensation unit 35 through the selection unit 33. Based on these images, in step S14, the motion prediction/compensation unit 35 performs the motion prediction/compensation process.

Through this process, the motion prediction process is performed in all the inter prediction mode candidates, the cost function value is calculated for all the inter prediction mode candidates, and the optimum inter prediction mode is decided based on the calculated cost function values. Then, the predicted image generated by the optimum inter prediction mode and the cost function value thereof are supplied to the predicted image selection unit 36.

In step S15, the predicted image selection unit 36 decides one of the optimum intra prediction mode and the optimum inter prediction mode as the optimum prediction mode based on each cost function value output from the intra prediction unit 34 and the motion prediction/compensation unit 35. Then, the predicted image selection unit 36 selects the predicted image of the decided optimum prediction mode and supplies the image to the calculation units 23 and 30. This predicted image is used in the calculation in steps S16 and S21 as described below.

The selection information for this predicted image is supplied to the intra prediction unit 34 or the motion prediction/compensation unit 35. If the predicted image in the optimum intra prediction mode has been selected, the intra prediction unit 34 supplies the information representing the optimum intra prediction mode (i.e., parameter related to the intra prediction) to the lossless encoding unit 26.

If the predicted image in the optimum inter prediction mode has been selected, the motion prediction/compensation unit 35 outputs the information representing the optimum inter prediction mode and the information based on the optimum inter prediction mode (i.e., parameter related to the motion prediction) to the lossless encoding unit 26. The information based on the optimum inter prediction mode corresponds to motion vector information, reference frame information, or the like.

In step S16, the calculation unit 23 calculates the difference between the image rearranged in step S12 and the predicted image selected in step S15. In the case of the inter prediction, the predicted image is supplied from the motion prediction/compensation unit 35 to the calculation unit 23 through the predicted image selection unit 36; in the case of the intra prediction, the predicted image is supplied from the intra prediction unit 34 to the calculation unit 23 through the predicted image selection unit 36.

The differential data are smaller in data quantity than the original image data. Therefore, as compared to the case in which the image is encoded without any process, the data quantity can be compressed.

In step S17, the orthogonal transform unit 24 performs the orthogonal transform of the differential information supplied from the calculation unit 23. Specifically, the orthogonal transform such as the discrete cosine transform or Karhunen-Loeve transform is performed, and the transform coefficient is output.

In step S18, the quantization unit 25 quantizes the transform coefficient. In this quantization, the rate is controlled as described below in the process of step S28.

The differential information quantized in this manner is locally decoded as below. In step S19, the inverse quantization unit 28 inversely quantizes the transform coefficient quantized by the quantization unit 25 with the characteristic corresponding to the characteristic of the quantization unit 25. In step S20, the inverse orthogonal transform unit 29 performs the inverse orthogonal transform of the transform coefficient, which has been inversely quantized by the inverse quantization unit 28, with the characteristic corresponding to the characteristic of the orthogonal transform unit 24.

In step S21, the calculation unit 30 adds the predicted image input through the predicted image selection unit 36 to the locally decoded differential information, thereby generating the locally decoded (i.e., local-decoded) image (image corresponding to the input to the calculation unit 23).

In step S22, the deblocking filter 31a performs the deblocking filtering process on the image output from the calculation unit 30. In the deblocking filtering process, which is described in detail with reference to FIG. 14, the Bs value is used for the determination of the strong filter. The image after the filtering with the deblocking filter 31a is output to the adaptive offset filter 41.

The ON/OFF information used in the deblocking filter 31a, which is input by the user operation through the operation unit or the like, and each offset of the parameters beta and tc are supplied to the lossless encoding unit 26 as the parameters of the deblocking filter.

In step S23, the adaptive offset filter 41 performs the adaptive offset filtering process. Through this process, the filtering process is performed on the image after the filtering with the deblocking filter 31a using the offset value for each LCU for which the type of offset filter is decided for each LCU. The image after the filtering is supplied to the adaptive loop filter 42.

The decided offset value for each LCU is supplied to the lossless encoding unit 26 as the adaptive offset parameter.

In step S24, the adaptive loop filter 42 performs the adaptive loop filtering process on the image after the filtering with the adaptive offset filter 41. For example, the image after the filtering with the adaptive offset filter 41 is subjected to the filtering process in units of process using the filter coefficient, and the filtering process result is supplied to the frame memory 32.

The frame memory 32 stores the filtered image in step S25. To the frame memory 32, the images not filtered by the deblocking filter 31, the adaptive offset filter 41, or the adaptive loop filter 42 are also supplied from the calculation unit 30 and stored therein.

On the other hand, the transform coefficient quantized in step S18 is also supplied to the lossless encoding unit 26. In step S26, the lossless encoding unit 26 encodes the quantized transform coefficient output from the quantization unit 25, and each supplied parameter. In other words, the differential image is subjected to the lossless encoding, such as the variable length encoding or the arithmetic encoding, and thus compressed. As each of the parameters to be encoded, the parameter of the deblocking filter, the parameter of the adaptive offset filter, the parameter of the adaptive loop filter, the quantization parameter, the motion vector information, the reference frame information, the prediction mode information, and the like are given.

In step S27, the accumulation buffer 27 accumulates the encoded differential images (i.e., encoded stream) as the compressed image. The compressed images accumulated in the accumulation buffer 27 are read out and transmitted to the decoding side through the transmission path.

In step S28, the rate control unit 37 controls the rate of the quantization operation of the quantization unit 25 based on the compressed images accumulated in the accumulation buffer 27 so that the overflow or underflow does not occur.

Upon the end of the process of step S28, the encoding process ends.

[Structure Example of Image Decoding Device]

Figure 3:
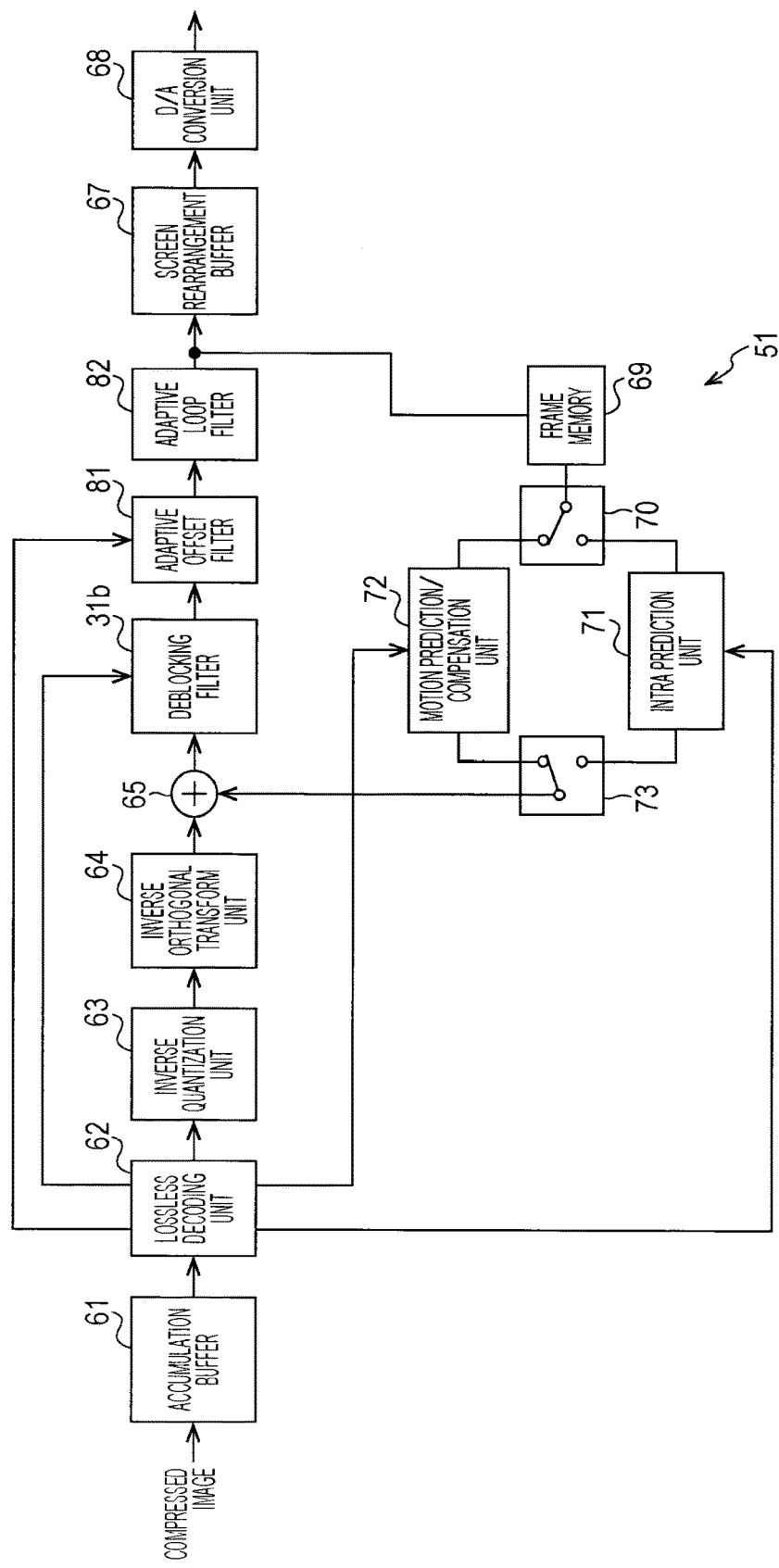
FIG. 3 is a block diagram illustrating a main structure example of an image decoding device.

FIG. 3 illustrates a structure of one embodiment of an image decoding device as an image processing device to which the present disclosure has been applied. The image decoding device 51 illustrated in FIG. 3 is a decoding device for the image encoding device 11 of FIG. 1.

The encoded stream (data) encoded by the image encoding device 11 is transmitted to the image decoding device 51 for the image encoding device 11 through the predetermined transmission path, and decoded therein.

As illustrated in FIG. 3, the image decoding device 51 includes an accumulation buffer 61, a lossless decoding unit 62, an inverse quantization unit 63, an inverse orthogonal transform unit 64, a calculation unit 65, a deblocking filter 31b, a screen rearrangement buffer 67, and a D/A conversion unit 68. The image decoding device 51 includes a frame memory 69, a selection unit 70, an intra prediction unit 71, a motion prediction/compensation unit 72, and a selection unit 73.

Moreover, the image decoding device 51 includes an adaptive offset filter 81 and an adaptive loop filter 82 between the deblocking filter 31b, and the screen rearrangement buffer 67 and the frame memory 69.

The accumulation buffer 61 also serves as a reception unit that receives the transmitted encoded data. The accumulation buffer 61 receives and accumulates the transmitted pieces of encoded data. The encoded data are the data obtained by the encoding of the image encoding device 11. The lossless decoding unit 62 decodes the encoded data, which are read out of the accumulation buffer 61 at a predetermined timing, by a method corresponding to the encoding method of the lossless encoding unit 26 of FIG. 1.

The lossless decoding unit 62 supplies the decoded parameter such as the information representing the intra prediction mode to the intra prediction unit 71, and supplies the parameter such as the information representing the inter prediction mode or the motion vector information to the motion prediction/compensation unit 72. The lossless decoding unit 62 supplies the decoded parameter of the deblocking filter to the deblocking filter 31b, and supplies the decoded adaptive offset parameter to the adaptive offset filter 81.

The inverse quantization unit 63 inversely quantizes the coefficient data (quantization coefficient) obtained by the decoding of the lossless decoding unit 62, by a method corresponding to the quantization method of the quantization unit 25 of FIG. 1. In other words, the inverse quantization unit 63 inversely quantizes the quantization coefficient by a method similar to the method of the inverse quantization unit 28 of FIG. 1 using the quantization parameter supplied from the image encoding device 11.

The inverse quantization unit 63 supplies the inversely quantized coefficient data, i.e., the orthogonal transform coefficient to the inverse orthogonal transform unit 64. The inverse orthogonal transform unit 64 performs the inverse orthogonal transform of the orthogonal transform coefficient by a method corresponding to the orthogonal transform method of the orthogonal transform unit 24 of FIG. 1, thereby providing the decoding residual data corresponding to the residual data before the orthogonal transform in the image encoding device 11.

The decoding residual data obtained by the inverse orthogonal transform are supplied to the calculation unit 65.

To the calculation unit 65, the predicted image is supplied from the intra prediction unit 71 or the motion prediction/compensation unit 72 through the selection unit 73.

The calculation unit 65 adds the decoding residual data and the predicted image, thereby providing the decoded image data corresponding to the image data before the predicted image is subtracted by the calculation unit 23 of the image encoding device 11. The calculation unit 65 supplies the decoded image data to the deblocking filter 31b.

The deblocking filter 31b suppresses the block distortion of the decoded image by performing the deblocking filtering process as appropriate. The deblocking filter 31b is basically structured similarly to the deblocking filter 31a of FIG. 1. In other words, the deblocking filter 31b includes the strong filter and the weak filter, and which filter to apply is determined using the determination formulae. The determination formulae of the strong filter include three determination formulae, in each of which the Bs value is used in addition to the parameter beta or tc obtained based on the quantization parameter QP.

Note that the ON/OFF information of the deblocking filter, which is encoded by the image encoding device 11, and each offset of the parameters beta and tc are received in the image decoding device 51 as the parameters of the deblocking filter, decoded by the lossless decoding unit 62, and used by the deblocking filter 31b.

The deblocking filter 31b performs the deblocking filtering process on the image from the calculation unit 30 using the aforementioned ON/OFF information, offset, and parameters beta and tc. The deblocking filter 31b supplies the filtering process result to the adaptive offset filter 81. Note that the detailed structure of the deblocking filter 31b is described below with reference to FIG. 14.

The adaptive offset filter 81 performs the offset filter (SAO) process on the image after the filtering with the deblocking filter 31b especially for suppressing the ringing.

The adaptive offset filter 81 performs the filtering process on the image after the filtering with the deblocking filter 31b using the offset value for each LCU, for which the type of the offset filter is decided for each LCU. The adaptive offset filter 81 supplies the filtered image to the adaptive loop filter 82.

Note that this offset value for each LCU is the value calculated by the adaptive offset filter 41 of the image encoding device 11 and encoded and transmitted as the adaptive offset parameter. The offset value for each LCU encoded by the image encoding device 11 is received in the image decoding device 51 as the adaptive offset parameter, decoded by the lossless decoding unit 62, and used by the adaptive offset filter 81.

The adaptive loop filter 82 performs the filtering process on the image after the filtering with the adaptive offset filter 81 in units of process using the filter coefficient, and supplies the filtering process result to the frame memory 69 and the screen rearrangement buffer 67.

Although not illustrated in the example of FIG. 3, in the image decoding device 51, the filter coefficient is calculated for each LCU by the adaptive loop filter 42 of the image encoding device 11 and the one encoded and transmitted as the adaptive loop filter parameter is decoded by the lossless decoding unit 62 and is used.

The screen rearrangement buffer 67 rearranges the images. In other words, the order of the frames, which have been rearranged for the encoding by the screen rearrangement buffer 22 of FIG. 1, is rearranged in the original order of display. The D/A conversion unit 68 performs the D/A conversion of the image supplied from the screen rearrangement buffer 67 and outputs the image to the display, which is not shown, where the image is displayed.

The output of the adaptive loop filter 82 is further supplied to the frame memory 69.

The frame memory 69, the selection unit 70, the intra prediction unit 71, the motion prediction/compensation unit 72, and the selection unit 73 correspond to the frame memory 32, the selection unit 33, the intra prediction unit 34, the motion prediction/compensation unit 35, and the predicted image selection unit 36 of the image encoding device 11, respectively.

The selection unit 70 reads out the image to be subjected to the inter process and the image to be referred to out of the frame memory 69, and supplies the images to the motion prediction/compensation unit 72. Moreover, the selection unit 70 reads out the image used in the intra prediction out of the frame memory 69 and supplies the image to the intra prediction unit 71.

To the intra prediction unit 71, the information representing the intra prediction mode obtained by decoding the header information and the like are supplied from the lossless decoding unit 62 as appropriate. Based on this information, the intra prediction unit 71 generates the predicted image from the reference image acquired from the frame memory 69 and supplies the generated predicted image to the selection unit 73.

To the motion prediction/compensation unit 72, the pieces of information obtained by decoding the header information (such as the prediction mode information, the motion vector information, the reference frame information, the flag, and various parameters) are supplied from the lossless decoding unit 62.

The motion prediction/compensation unit 72 generates the predicted image from the reference image acquired from the frame memory 69 based on these pieces of information supplied from the lossless decoding unit 62, and supplies the generated predicted image to the selection unit 73.

The selection unit 73 selects the predicted image generated by the motion prediction/compensation unit 72 or the intra prediction unit 71, and supplies the image to the calculation unit 65.

[Operation of Image Decoding Device]

Figure 4:
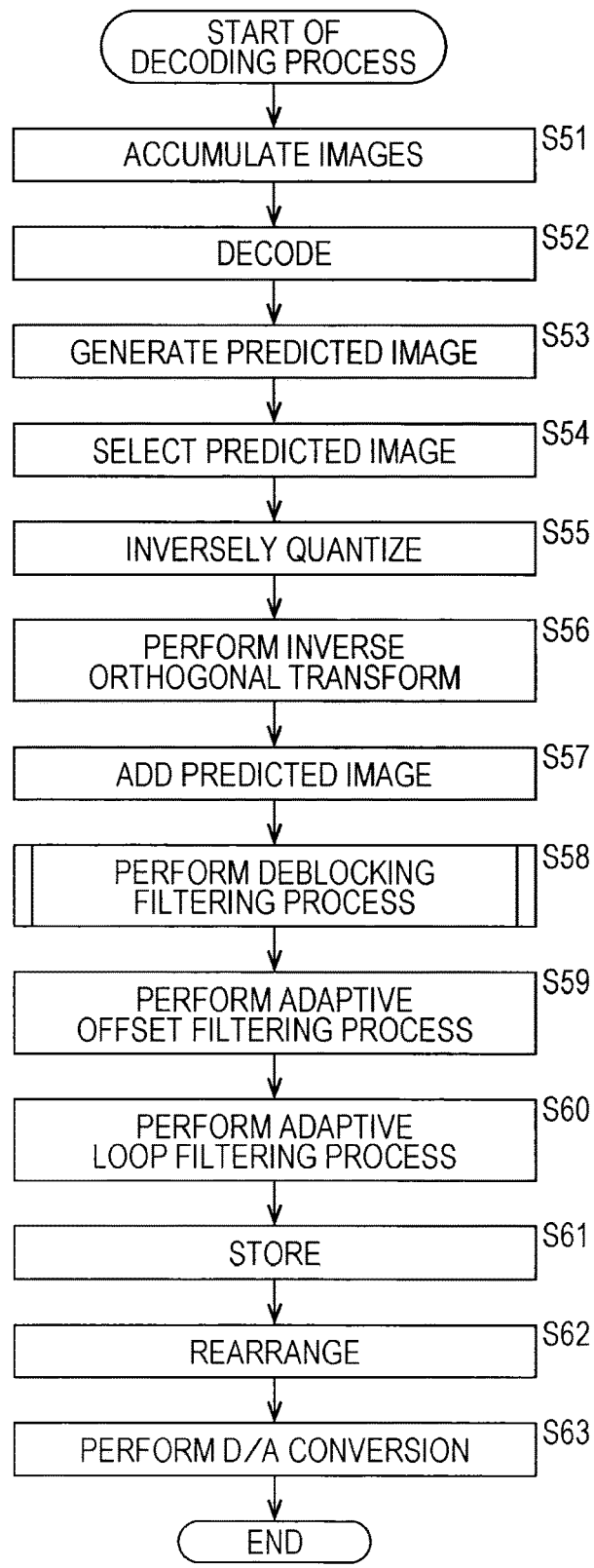
FIG. 4 is a flowchart for describing an example of the flow of a decoding process.

With reference to FIG. 4, description is made of an example of the flow of the decoding process to be executed by the image decoding device 51.

Upon the start of the decoding process, in step S51, the accumulation buffer 61 receives the transmitted encoded stream (data) and accumulates the data. In step S52, the lossless decoding unit 62 decodes the encoded data supplied from the accumulation buffer 61. I picture, P picture, and B picture encoded by the lossless encoding unit 26 of FIG. 1 are decoded.

Before the decoding of the pictures, the pieces of information of the parameters such as the motion vector information, the reference frame information, the prediction mode information (intra prediction mode or inter prediction mode) are also decoded.

If the prediction mode information is the intra prediction mode information, the prediction mode information is supplied to the intra prediction unit 71. If the prediction mode information is the inter prediction mode information, the motion vector information or the like corresponding to the prediction mode information is supplied to the motion prediction/compensation unit 72. Moreover, the parameter of the deblocking filter and the adaptive offset parameter are decoded and supplied to the deblocking filter 31b and the adaptive offset filter 81, respectively.

In step S53, the intra prediction unit 71 or the motion prediction/compensation unit 72 performs the predicted image generation process in accordance with the prediction mode information supplied from the lossless decoding unit 62.

In other words, in the case where the intra prediction mode information is supplied from the lossless decoding unit 62, the intra prediction unit 71 generates the intra predicted image of the intra prediction mode. In the case where the inter prediction mode information is supplied from the lossless decoding unit 62, the motion prediction/compensation unit 72 performs the motion prediction/compensation process of the inter prediction mode to generate the inter predicted image.

Through this process, the predicted image (intra predicted image) generated by the intra prediction unit 71 or the predicted image (inter predicted image) generated by the motion prediction/compensation unit 72 is supplied to the selection unit 73.

In step S54, the selection unit 73 selects the predicted image. In other words, the predicted image generated by the intra prediction unit 71 or the predicted image generated by the motion prediction/compensation unit 72 is supplied. Therefore, the supplied predicted image is selected and supplied to the calculation unit 65, and is added to the output of the inverse orthogonal transform unit 64 in step S57, which is described below.

In step S52 described above, the transform coefficient decoded by the lossless decoding unit 62 is supplied also to the inverse quantization unit 63. In step S55, the inverse quantization unit 63 inversely quantizes the transform coefficient decoded by the lossless decoding unit 62, with the characteristic corresponding to the characteristic of the quantization unit 25 of FIG. 1.

In step S56, the inverse orthogonal transform unit 64 performs the inverse orthogonal transform of the transform coefficient inversely quantized by the inverse quantization unit 63, with the characteristic corresponding to the characteristic of the orthogonal transform unit 24 of FIG. 1. Thus, the differential information corresponding to the input of the orthogonal transform unit 24 of FIG. 1 (output of the calculation unit 23) is decoded.

In step S57, the calculation unit 65 sums up the differential information and the predicted image selected in the process of the aforementioned step S54 and input through the selection unit 73. Thus, the original image is decoded.

In step S58, the deblocking filter 31b performs the deblocking filtering process on the image output from the calculation unit 65. In the deblocking filtering process, which is described in detail with reference to FIG. 14, the Bs value is used in the determination related to the strong filter. The image after the filtering from the deblocking filter 31b is output to the adaptive offset filter 41. In the deblocking filtering process, the ON/OFF information as the parameter of the deblocking filter supplied from the lossless decoding unit 62 and each offset of the parameters beta and tc are also used.

In step S59, the adaptive offset filter 81 performs the adaptive offset filtering process. Through this process, the image after the filtering with the deblocking filter 31b is subjected to the filtering process using the offset value for each LCU for which the type of the offset filter is decided for each LCU. The image after the filtering is supplied to the adaptive loop filter 82.

In step S60, the adaptive loop filter 82 performs the adaptive loop filtering process on the image after the filtering with the adaptive offset filter 81. With the use of the filter coefficient calculated in units of process, the adaptive loop filter 82 performs the filtering process in units of process on the input image, and supplies filtering process result to the screen rearrangement buffer 67 and the frame memory 69.

In step S61, the frame memory 69 stores the filtered image.

In step S62, the screen rearrangement buffer 67 rearranges the images after the adaptive loop filter 82. In other words, the order of frames, which has been rearranged for the encoding by the screen rearrangement buffer 22 of the image encoding device 11, is rearranged in the original order of display.

In step S63, the D/A conversion unit 68 performs the D/A conversion of the image from the screen rearrangement buffer 67. This image is output to the display, which is not shown, where the image is displayed.

Upon the end of the process of step S63, the decoding process ends.

2. First Embodiment

Determination Condition of Strong Filter

Figure 5:
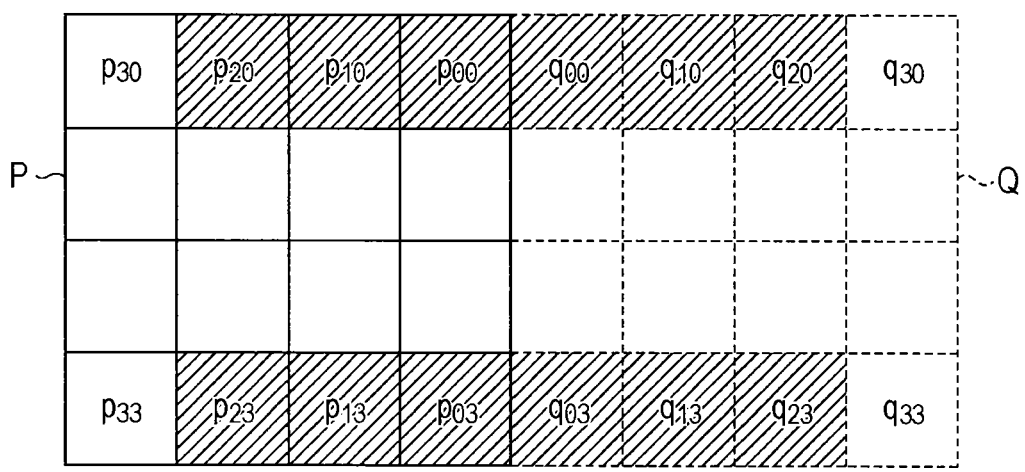
FIG. 5 is a diagram for describing a determination formula of a strong filter.

Next, description is made of determination formulae of the strong filter in the HEVC method and the present technique with reference to FIG. 5.

In the example of FIG. 5, a block P including 4×4 pixels and an adjacent block Q, which is adjacent to the block P on the right side, are shown.

In the HEVC method, three pixels (hatched rectangles in the drawing) from the boundary between the block P and the adjacent block Q are used to determine whether to apply the strong filter or not out of the filters for the boundary therebetween. As the determination formula of the strong filter in the HEVC method, the following formulae (1) to (3) are used.

[Mathematical Formula 1]

$$|p3i-p0i|+|q3i-q0i|<(\text{beta}>>3) \quad (1)$$

[Mathematical Formula 2]

$$2*(|p2i-2*p1i+p0i|+|q2i-2*q1i+q0i|)<(\text{beta}>>2) \quad (2)$$

[Mathematical Formula 3]

$$|p0i-q0i|<((tc*5+1)>>1) \quad (3)$$

In the example of FIG. 5, i=0, 3 in Formulae (1) to (3).

In Formulae (1) and (2), the pixel value in the block is determined. Formulae (1) and (2) indicate that as the block has the gradient values, the strong filter is easily applicable. On the contrary, Formula (3) determines the pixel value at the block boundary.

In other words, if all of Formulae (1) to (3) are true at the block boundary to be determined, the strong filter is used for that block boundary; if at least one is false, the determination of the weak filter is performed next.

If the determination formula of the strong filter in the HEVC method is still used, in the current situation, the weak filter is often applied where the block noise is remarkable, in which case the block noise may remain.

In view of this, the number of block boundaries for which the strong filter is applied at the place where the noise is remarkable is desired to be increased.

In consideration of the above, in the present technique, the determination of the strong filter is adjusted so that the strong filter is applied more. For example, the Bs value is used in the determination of the strong filter as indicated by the next Formulae (4) to (6) instead of Formulae (1) to (3).

[Mathematical Formula 4]

$$|p3i-p0i|+|q3i-q0i|<(f1(Bs)*\text{beta}>>3) \quad (4)$$

[Mathematical Formula 5]

$$2*(|p2i-2*p1i+p0i|+|q2i-2*q1i+q0i|)<(f2(Bs)*\text{beta}>>2) \quad (5)$$

[Mathematical Formula 6]

$$|p0i-q0i|<((f3(Bs)*tc*5+1)>>1) \quad (6)$$

In the example of FIG. 5, i=0, 3 in Formulae (4) to (6). Moreover, for example, f1(Bs)=f2(Bs)=f3(Bs)=Bs+2. In the general expression, F(Bs)=a*Bs+b; however, the state of the function does not matter.

Here, the parameters beta and tc, which are used in the determination of the strong filter, are obtained by using the quantization parameter QP from the table. Thus, as the quantization parameter QP is increased, the parameters beta and tc are increased. Since the larger quantization parameter tends to increase the quantization noise, these values are used in the determination of the strong filter. In the determination of the strong filter, however, the values of the parameters beta and tc are divided to be smaller and used in the determination; thus, the threshold is a little smaller in the image where the block noise often appears, such as water or nature.

In view of this, in the present technique, the values of the parameters beta and tc are increased in the strong filter and the determination is performed with the larger threshold. Accordingly, Formulae (4) to (6) easily become true and the region where the strong filter is applied can be increased.

Further, the prediction accuracy in the intra prediction (in-screen prediction) is lower and the prediction error (residual information) is larger than in the inter prediction; thus, the block noise is caused. The Bs value is the parameter presenting the strength for the block boundary, and is set so that the parameter is larger in the intra prediction than in the inter prediction in consideration of the prediction error.

In other words, the Bs value may be 0, 1, or 2 in the HEVC method. In the case of 0, the deblocking filter is not applicable. In the case of 1, the prediction mode is not the intra prediction; in the case of 2, the prediction mode is the intra prediction.

In the case of the intra prediction, the threshold can be set larger in the determination than in the inter prediction by multiplying the Bs value as above by the values of the parameters beta and tc. As a result, in the case of the intra prediction, the region where the strong filter is applied can be made larger than in the case of the inter prediction.

As described above, by the use of the Bs value as the threshold in the determination of the strong filter, the threshold parameter in the right side of Formulae (4) to (6) is increased, and the large threshold can be used in the determination. Therefore, Formulae (4) to (6) easily become true and the region where the strong filter is applied can be increased.

Note that the description has been made of the example in which the Bs value (the linear function of the Bs value) is multiplied by the parameter beta or tc in the threshold parameter in the right side of the determination formula for increasing the threshold of the determination of the strong filter.

Here, the method of increasing the threshold of the determination of the strong filter is not limited to the multiplication of the Bs value and for example, the shift value may be decreased in the threshold parameter of the right side of Formulae (1) to (3) in the HEVC method and used.

On this occasion, the shift value is set smaller in the intra prediction than in the other prediction, and in the other prediction (for example, inter prediction), the shift value is set larger than in the intra prediction.

In other words, the shift value of the determination is changed in accordance with the prediction mode and used. In this case, the effect similar to the effect obtained when the Bs value is used in the threshold of the determination of the strong filter can be obtained. In other words, since the shift value is set small in the intra prediction, the threshold in the determination is increased. Therefore, in the case of the intra prediction, the strong filter is easily applied.

As described above, the prediction error tends to be increased in the intra prediction as compared to the inter prediction, and in this case, the block noise often appears remarkably. Therefore, when the strong filter is applied in the intra prediction, the block noise can be suppressed further.

Note that the prediction mode is the mode representing the intra prediction or the mode representing the inter prediction. In addition, the prediction mode may include, for example, the vertical mode and horizontal mode in the intra prediction.

[Detailed Description of Strong Filter Determination]

FIG. 6 represents the relation between the quantization parameter QP and the value in the right side of Formula (4) when f1(Bs)=Bs+2. In other words, in this case, a=1 and b=2 in the linear function of the Bs value. Note that the value in the right side of Formulae (1) and (4) is referred to as the threshold A.

When the prediction mode is not the intra prediction, Bs value=1; thus, the threshold A in the right side of Formula (4) is (3*beta)>>3. When the prediction mode is the intra prediction, Bs value=2; thus, the threshold A in the right side of Formula (4) is (4*beta)>>3.

Therefore, for the quantization parameter QP, the threshold A in the right side of Formula (1) in the case of HEVC (conventional technique), the threshold A in the right side of Formula (4) in the case of the prediction other than intra in the present technique, and the threshold A in the right side of Formula (4) in the case of the intra prediction in the present technique are as shown in FIG. 6.

For example, when the quantization parameter QP is 51, the thresholds A are as follows: 8 in the case of HEVC; 24 in the case of the prediction other than intra in the present technique; and 32 in the case of the intra prediction in the present technique.

Thus, the threshold A is larger in the case of the prediction other than intra in the present technique than the threshold A in the case of HEVC. Further, the threshold A in the case of the intra prediction in the present technique is larger than the threshold A in the case of the prediction other than intra in the present technique.

Figure 7:
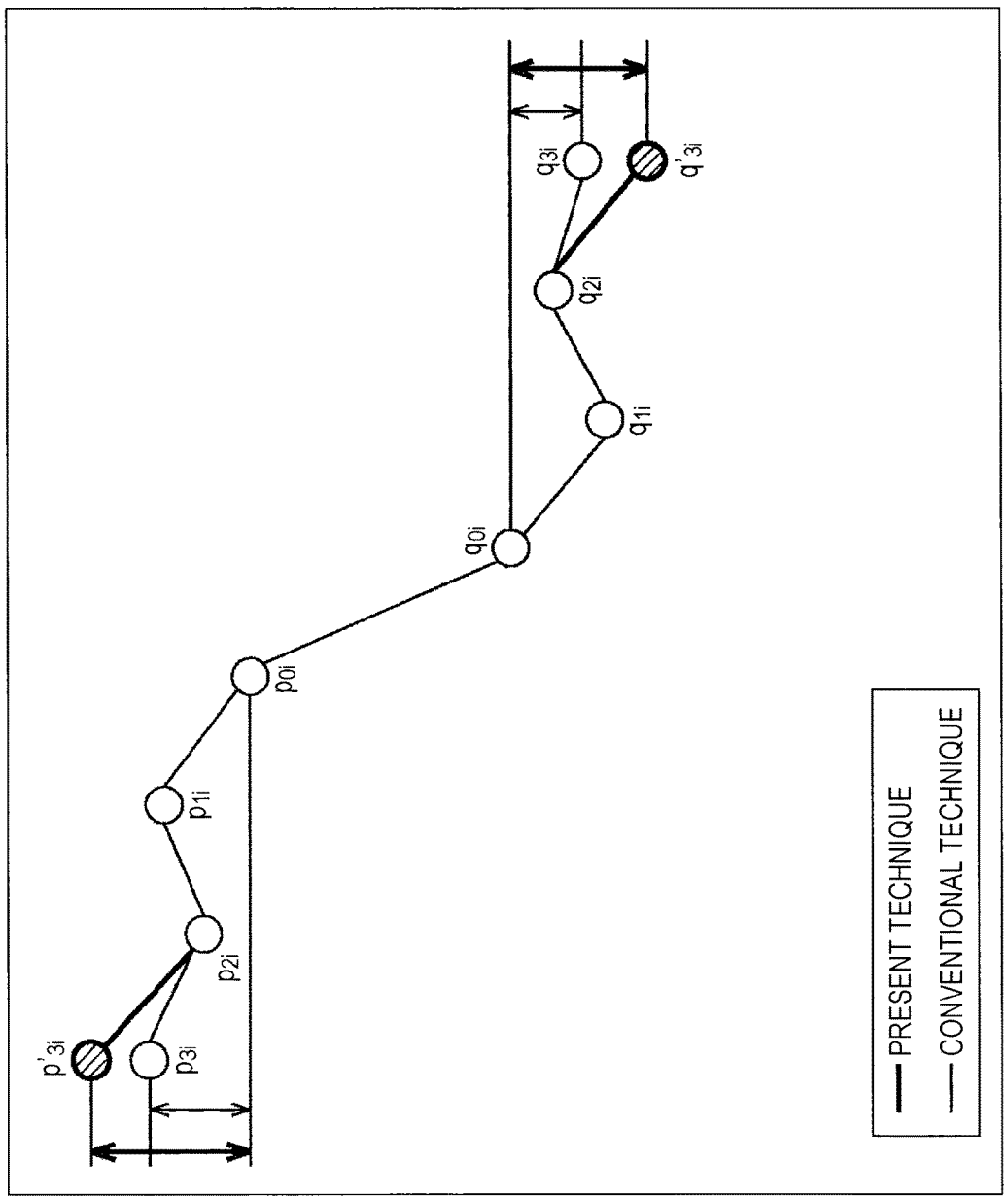
FIG. 7 is a diagram illustrating an example of pixel values of a block P and an adjacent block Q of FIG. 5 in the case of FIG. 6.

FIG. 7 illustrates an example of pixel values of the blocks P and Q of FIG. 5 in the case of FIG. 6. In the example of FIG. 7, p3i and q3i represent the pixel values in the range where the strong filter is applied in the case of HEVC (conventional technique) and p'3i and q'3i represent the pixel values in the range where the strong filter is applied in the case of the present technique.

In other words, the value of p'3i-p0i and the value of q'3i-q0i are larger than the values in the case of HEVC (value of p3i-p0i and value of q3i-q0i). Thus, the determination formula (Formula (4)) in the case of the present technique can be made true for the block boundary, which is false in the determination formula (Formula (1)) in the case of HEVC.

FIG. 8 represents the relation between the quantization parameter QP and the value in the right side of Formula (5) in the case of f2(Bs)=Bs+2. Note that the values in the right side of Formulae (2) and (5) are referred to as threshold B. s When the prediction mode is the prediction other than intra, Bs value=1; thus, the threshold B in the right side of Formula (5) is (3*beta)>>2. When the prediction mode is the intra prediction, Bs value=2; thus, the threshold B in the right side of Formula (5) is (4*beta)>>2.

Therefore, for the quantization parameter QP, the threshold B in the right side of Formula (2) in the case of HEVC (conventional technique), the threshold B in the right side of Formula (5) in the case of the prediction other than intra in the present technique, and the threshold B in the right side in the case of Formula (5) in the intra prediction in the present technique are as shown in FIG. 8.

For example, when the quantization parameter QP is 51, the thresholds B are as follows: 16 in the case of HEVC; 48 in the case of the prediction other than intra in the present technique; and 64 in the case of the intra prediction in the present technique.

In this manner, the threshold B in the case of the prediction other than intra in the present technique is larger than the threshold B in the case of HEVC. The threshold B in the case of the intra prediction in the present technique is larger than the value in the case of the prediction other than intra in the present technique.

Figure 9:
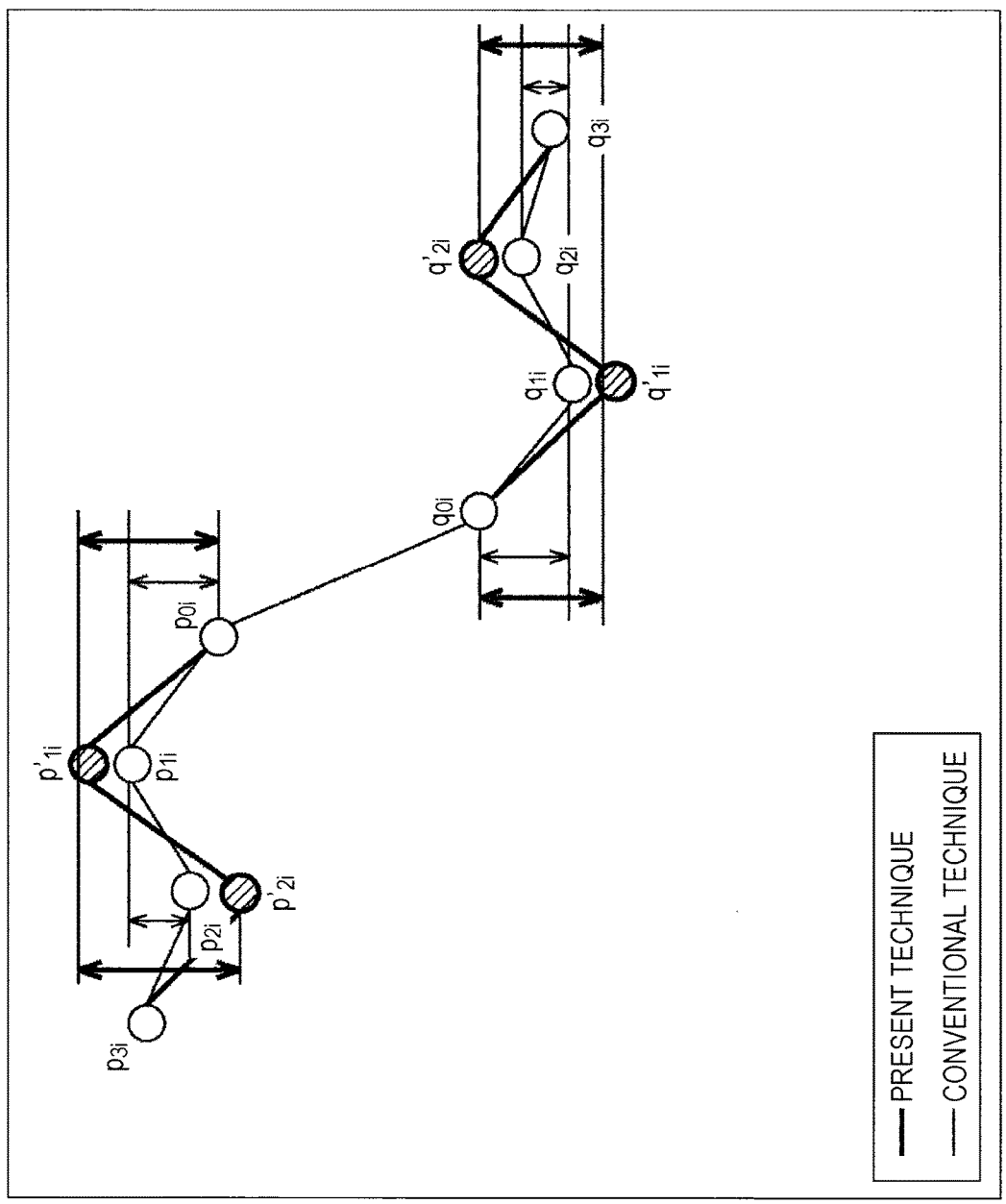
FIG. 9 is a diagram illustrating an example of pixel values of the block P and the adjacent block Q of FIG. 5 in the case of FIG. 8.

FIG. 9 illustrates an example of the pixel values of the blocks P and Q of FIG. 5 in the case of FIG. 8. In the example of FIG. 9, p2i, phi, q2i, and q1i are the pixel values in the range where the strong filter is applied in the case of HEVC (conventional technique). Moreover, p'2i, p'1i, q'2i, and q'1i are the pixel values in the range where the strong filter is applied in the case of the present technique.

In other words, as compared to the case of HEVC (value of p2i-p1i and value of p1i-p0i, value of q3i-q1i and value of q1i-q0i), the value of p'2i-p'1i and the value of p'1i-p0i are larger to some extent and the value of q'3i-q'1i and the value of q'1i-q0i are larger to some extent. Therefore, the determination formula (Formula (5)) in the case of the present technique can be made true for the block boundary for which the determination formula (Formula (2)) is false in the case of HEVC.

Formulae (4) and (5) determine the pixel values in the block while Formula (6) determines the pixel value at the block boundary.

FIG. 10 represents the relation between the quantization parameter QP and the value in the right side of Formula (6) in the case of f3(Bs)=Bs+2. The values in the right side of Formula (3) and Formula (6) are referred to as threshold C.

When the prediction mode is the prediction other than intra, Bs value=1; thus, the threshold C in the right side of Formula (6) is (3*tc*5+1)>>1. When the prediction mode is the intra prediction, Bs value=2; thus, the threshold C in the right side of Formula (6) is (4*tc*5+1)>>1.

Therefore, for the quantization parameter QP, the threshold C in right side of Formula (3) in the case of HEVC (conventional technique), the threshold C in the right side of Formula (6) in the case of the prediction other than intra in the present technique, and the threshold C in the right side in the case of Formula (6) in the intra prediction in the present technique are as shown in FIG. 10.

For example, when the quantization parameter QP is 53, the threshold C in the case of the prediction other than intra in HEVC is 50. In HEVC, however, in the case of the intra prediction, 2 is added to the value of QP for searching tc out of the table; thus, the threshold C in the case of the intra prediction in HEVC is 60 though not illustrated in FIG. 10. On the other hand, the threshold C in the case of the prediction other than intra in the present technique is 150 and the threshold C in the case of the intra prediction in the present technique is 200.

Thus, the threshold C in the case of the prediction other than intra in the present technique is larger than the threshold C in the case of HEVC. Moreover, the threshold C in the case of the intra prediction in the present technique is larger than the threshold C in the case of the prediction other than intra in the present technique.

Note that the value of tc is also used in the portion (filtering process) other than the strong/weak filter determination in the deblocking filter, and in the present technique, the product of multiplying tc by the Bs value is used only in the strong/weak filter determination.

Figure 11:
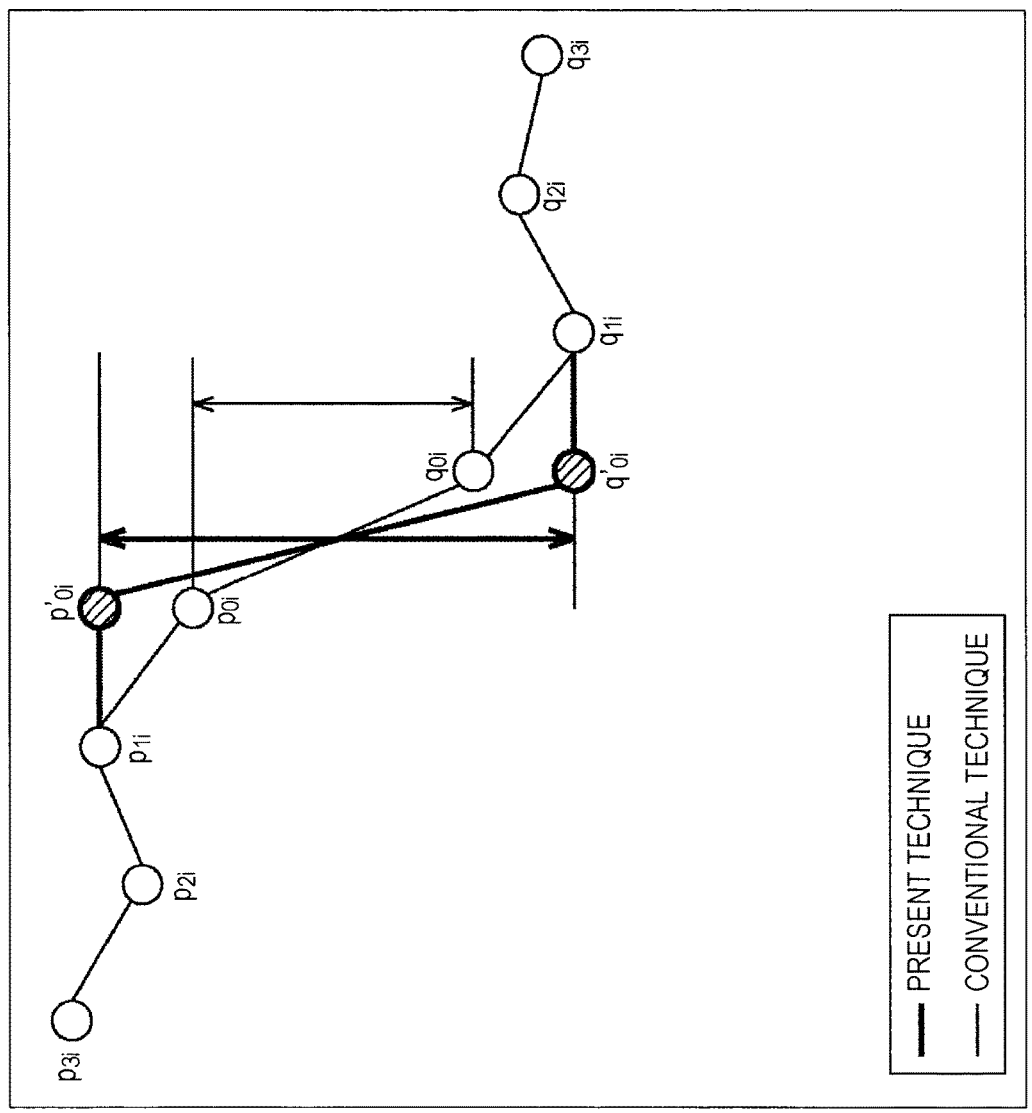
FIG. 11 is a diagram illustrating an example of pixel values of the block P and the adjacent block Q of FIG. 5 in the case of FIG. 10.

FIG. 11 illustrates the example of the pixel values of the blocks P and Q of FIG. 5 in the case of FIG. 10. In the example of FIG. 11, p0i and q0i represent the pixel values in the range where the strong filter is applied in the case of HEVC (conventional technique). Moreover, p'0i and q'0i represent the pixel values in the range where the strong filter is applied in the case of the present technique.

In other words, as compared to the case of HEVC (value p0i−q0i), the value of p'0i−q'0i is larger to some extent. Therefore, the determination formula (Formula (6)) in the case of the present technique can be made true for the block boundary for which the determination formula (Formula (3)) is false in the case of HEVC.

As described thus, Formulae (4) to (6) are highly likely to be true as compared to the case of HEVC. Thus, in the present technique, the strong filter can be applied at the block boundary where the strong filter has been unable to be applied in the case of HEVC, i.e., in the region where the blocking noise is remarkable.

Specific Example

Figure 12:
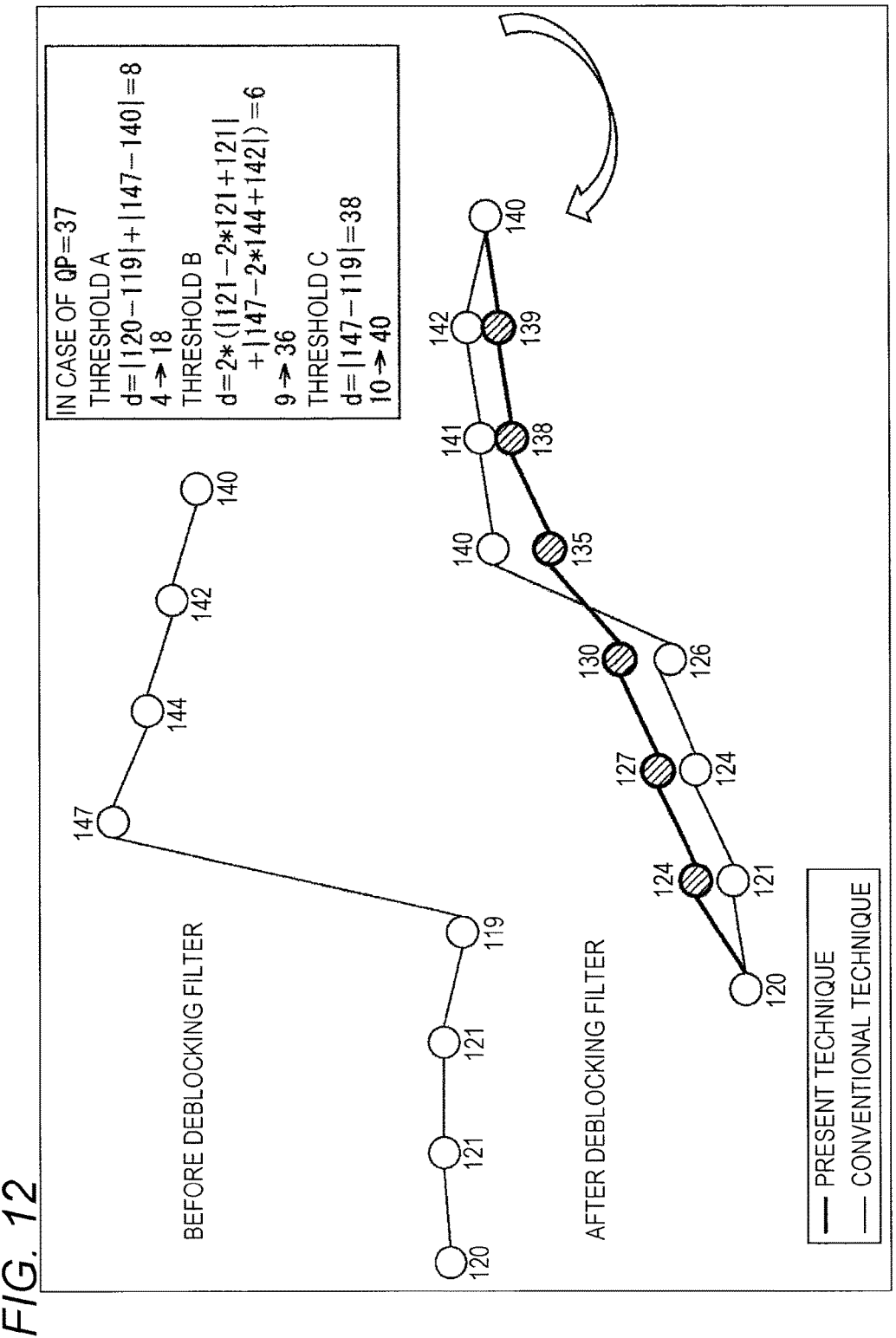
FIG. 12 is a diagram for describing a specific example.

Next, a specific example of the HEVC (conventional technique) and the present technique is described with reference to FIG. 12.

The pixel values at the block boundary before the deblocking filter are 120, 121, 121, 119, 147, 144, 142, and 140 from the left. In the example of FIG. 12, the block boundary is present between the pixel value 119 and the pixel value 147.

For example, when the quantization parameter QP is 37, the value of the left side of Formulae (1) and (4) is:

$d=|120-119|+|147-140|=8$

When the quantization parameter QP is 37, the threshold A in the right side of Formula (1) is 4 and the threshold A in the right side of Formula (4) is 18; thus, Formula (1) is false in the case of HEVC, but Formula (4) is true in the case of the present technique.

Similarly, when the quantization parameter QP is 37, the value of the left side of Formulae (2) and (5) is:

$d=2*(|121-2*121+121|+|147-2*144+142|)=6$

Here, when the quantization parameter QP is 37, the threshold B in the right side of Formula (2) is 9 and the threshold B in the right side of Formula (5) is 36; thus, Formula (2) is true in the case of HEVC and Formula (5) is true in the case of the present technique.

Moreover, when the quantization parameter QP is 37, the value in the left side of Formulae (3) and (6) is:

$d=|147-119|=38$

Here, when the quantization parameter QP is 37, the threshold C in the right side of Formula (3) is 10 and the threshold C in the right side of Formula (6) is 40; thus, Formula (3) is true in the case of HEVC and Formula (6) is true in the case of the present technique.

Thus, in the case of HEVC, the strong filter is not applied at the block boundary, but the weak filter is used, for example. On the other hand, in the case of the present technique, the strong filter is applied at this block boundary.

As a result, the pixel values after the deblocking (weak) filter in the case of HEVC are 120, 121, 124, 126, 140, 141, 192, and 140 from the left. The pixel values at the block boundary are 126 and 140, and there are still a lot of differences in pixel value between the blocks.

On the other hand, the pixel values after the deblocking (strong) filter in the case of the present technique are 120, 124, 127, 130, 135, 138, 139, and 140 from the left. The pixel values at the block boundary are 130 and 135, and there is little difference in pixel value between the blocks. Thus, the block noise can be made less visible.

For example, the natural motion such as the water flow in the river or the quivering of leaves is hard to predict and the intra prediction is more suitable; thus, the present technique is particularly effective for those kinds of images.

[Structure Example of Deblocking Filter]

Next, detailed description is made of the deblocking filter 31a in the image encoding device of FIG. 1 and the deblocking filter 31b in the image decoding device of FIG. 3. Note that since the deblocking filter 31a in the image encoding device of FIG. 1 and the deblocking filter 31b in the image decoding device of FIG. 3 have the basically similar structure and operation, the filters are described as the deblocking filter 31 collectively.

The deblocking filter 31a and the deblocking filter 31b are different in the following point. In the case of the deblocking filter 31a, the ON/OFF information as to whether the deblocking filter is applied or not and the offsets of the parameters beta and tc are input through the operation unit, which is not shown. On the other hand, in the case of the deblocking filter 31b, the ON/OFF information as to whether the deblocking filter is applied or not and the offsets of the parameters beta and tc, which have been encoded in the image encoding device 11, are received and decoded in the lossless decoding unit 62 and input.

Figure 13:
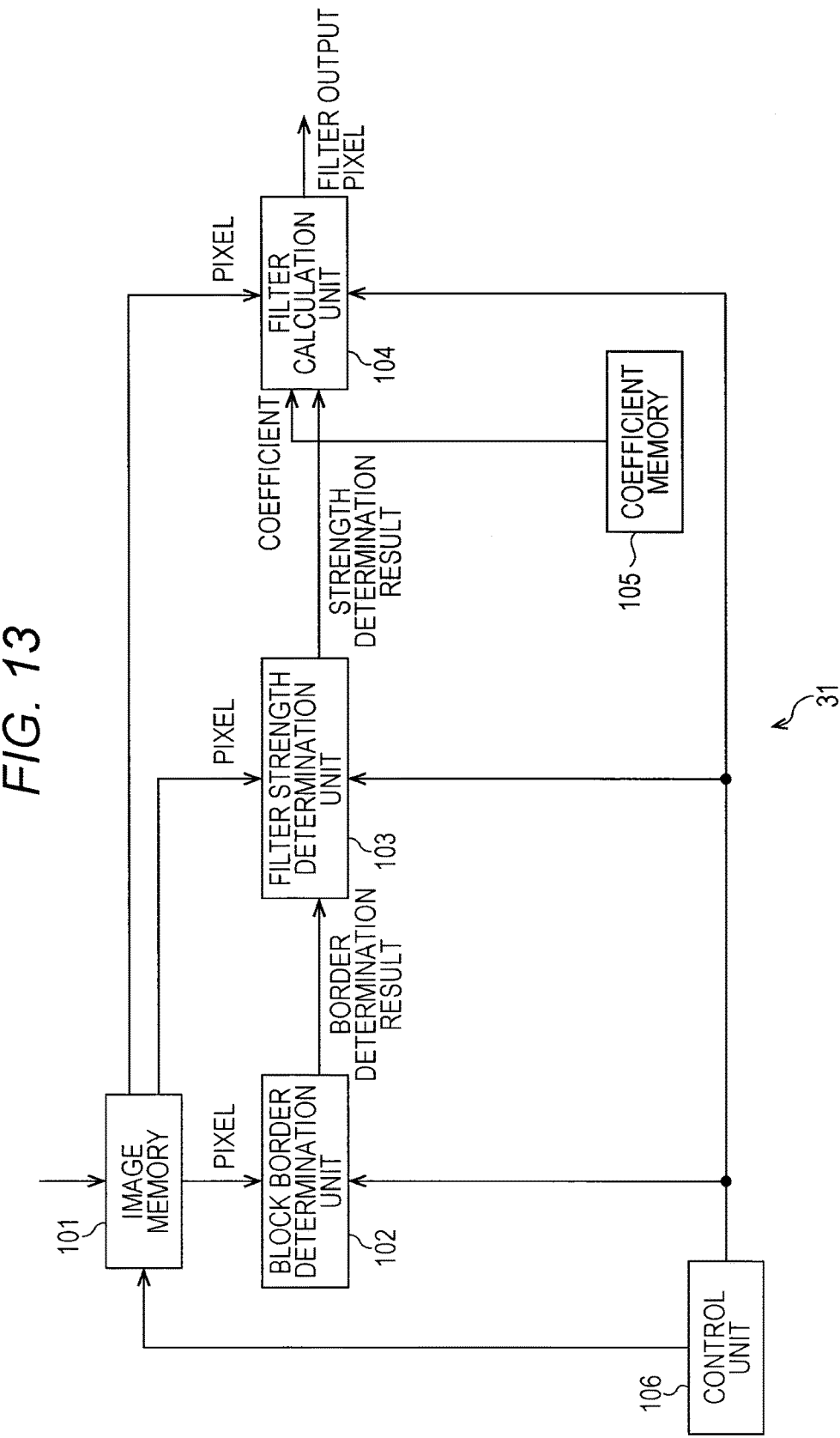
FIG. 13 is a block diagram illustrating a structure example of a deblocking filter to which the present technique has been applied.

FIG. 13 is a block diagram illustrating a structure example of the deblocking filter.

In the example of FIG. 13, the deblocking filter 31 includes an image memory 101, a block boundary determination unit 102, a filter strength determination unit 103, a filter calculation unit 104, a coefficient memory 105, and a control unit 106.

The image memory 101 is formed by a line memory, and stores the image data supplied from an addition unit 30. The image memory 101 reads out the stored image data and supplies the data to the block boundary determination unit 102, the filter strength determination unit 103, and the filter calculation unit 104.

At other than the line boundary, the image data may not be stored in the image memory 101 and the image data supplied from the addition unit 30 may be supplied to each unit and processed. In the example of FIG. 13, however, the image data through the image memory 101 are processed for the convenience of description.

The block boundary determination unit 102 derives the boundary for every eight lines and calculates the parameter used for the determination under the control of the control unit 106, thereby determining the boundary between the blocks for every four lines. In other words, the block boundary determination unit 102 derives the boundary between TU and PU using the image data read out of the image memory 101, thereby deriving the Bs value. Moreover, the block boundary determination unit 102 calculates the average QP (quantization parameter) by averaging the quantization parameters QP in two regions adjacent to the boundary to be processed, and thus the parameters tc and beta are calculated based on the calculated average QP.

Then, the block boundary determination unit 102 determines whether to perform filtering or not for every four lines by using the image data of two blocks adjacent to each other with the block boundary interposed therebetween out of the image memory 101 and the calculated parameter. The block boundary determination unit 102 supplies the calculated parameter with the boundary determination result to the filter strength determination unit 103.

The filter strength determination unit 103 determines the filter strength for every four lines under the control of the control unit 106. In other words, if the block boundary determination unit 102 has determined to perform the filtering, the filter strength determination unit 103 determines at which strength of the strong filter or the weak filter the filtering process is performed, and outputs the determination result to the filter calculation unit 104. On this occasion, the filter strength determination unit 103 uses the Bs value in the determination formula of the strong filter.

The filter calculation unit 104 performs the filter calculation at the filter strength determined by the filter strength determination unit 103 for every four lines by using the image data stored in the image memory 101 and the filter coefficient read out of the coefficient memory 105 under the control of the control unit 106. The filter calculation unit 104 outputs the image data, for which the filtering process has been performed, to the frame memory 32 in the later stage.

The coefficient memory 105 stores the filter coefficient used in the filter calculation of the deblocking filtering process. The coefficient memory 105 reads out the stored filter coefficient, and supplies the coefficient to the filter calculation unit 104.

The control unit 106 inputs the information (such as the ON/OFF information of the deblocking filter, the offset values of the parameters beta and tc, and the parameter in the clip process) from the operation unit (lossless decoding unit 62 in the case of the decoding side), which is not shown. To the control unit 106, the parameter necessary for the deblocking filter such as the prediction mode information or the quantization parameter is supplied.

For example, the control unit 106 supplies the input information to the corresponding unit or controls each unit of the deblocking filter 31 based on the input ON/OFF information.

The control unit 106 stores the image data for several predetermined lines on the lower end side in the block and reads out the stored image data by controlling the image memory 101. The control unit 106 controls the filter strength determination unit 103 to use the Bs value in the determination of the strong filter. Alternatively, the control unit 106 controls the filter strength determination unit 103 and changes the magnitude of the shift value in accordance with the prediction mode.

[Operation of Deblocking Filter Processing Unit]

Next, the deblocking process of the deblocking filter 31 of FIG. 13 is described with reference to the flowchart of FIG. 14. Note that the process includes the process of step S22 of FIG. 2 or step S58 of FIG. 4.

For example, the ON/OFF information, the value of the beta offset, the value of the tc offset, and the parameter in the clip process are input to the control unit 106 through the operation unit (lossless decoding unit 62 in the case of the decoding side), which is not shown. Moreover, to the control unit 106, the parameter necessary for the deblocking filter, such as the prediction mode information or the quantization parameter is supplied.

In step S101, the control unit 106 sets the offset of the filter (beta offset and tc offset) and supplies the set offset information to the filter strength determination unit 103.

In step S102, the control unit 106 determines whether the deblocking filter is unavailable or not based on the ON/OFF information. If it has been determined in step S102 that the deblocking filter is unavailable, the deblocking filtering process ends.

If it has been determined in step S102 that the deblocking filter is not unavailable, the control unit 106 notifies this to the block boundary determination unit 102, the filter strength determination unit 103, and the filter calculation unit 104, and the process advances to step S103. On this occasion, the parameter necessary for each unit is also supplied from the control unit 106.

In step S103, the block boundary determination unit 102 derives the boundary between TU and PU in units of eight lines. In step S104, the block boundary determination unit 102 derives the Bs value based on the information such as the boundary between TU and PU derived in step S103 and the prediction mode information from the control unit 106.

In step S105, the block boundary determination unit 102, the filter strength determination unit 103, and the filter calculation unit 104 perform the filtering process for the luminance boundary. In the filtering process for the luminance boundary, the filtering for the luminance boundary is performed on the luminance signal by the process of step S105 as described below with reference to FIG. 15.

In step S106, the block boundary determination unit 102, the filter strength determination unit 103, and the filter calculation unit 104 perform the filtering process for the color difference boundary. In the process of step S106, the filtering for the color difference boundary is performed on the color difference signal.

In step S107, the control unit 106 determines whether all the boundaries have been processed. If it has been determined in step S107 that the process of all the boundaries is not finished yet, the process returns to step S105 and the processes of step S105 and subsequent thereto are repeated. If it has been determined in step S107 that all the boundaries are already processed in step S107, the process advances to step S108.

In step S108, the control unit 106 determines whether all the CUs have been processed or not. If it has been determined in step S108 that the process of all the CUs is not finished yet, the process returns to step S103 and the processes of step S103 and subsequent thereto are repeated.

If it has been determined in step S108 that all the CUs are processed, the deblocking filtering process ends.

[Example of Filtering Process for Luminance Boundary]

Figure 14:
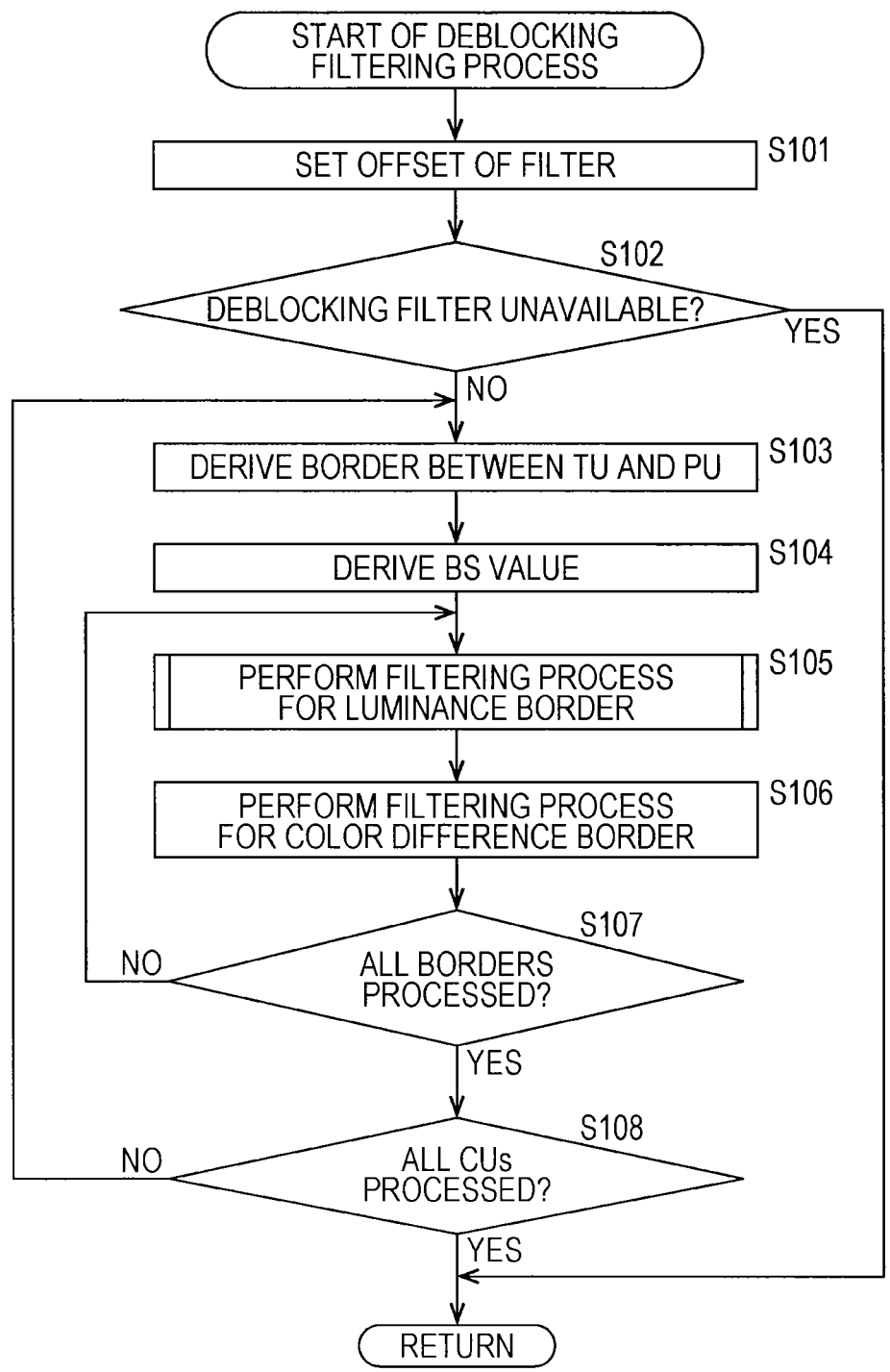
FIG. 14 is a flowchart for describing a deblocking filtering process.
Figure 15:
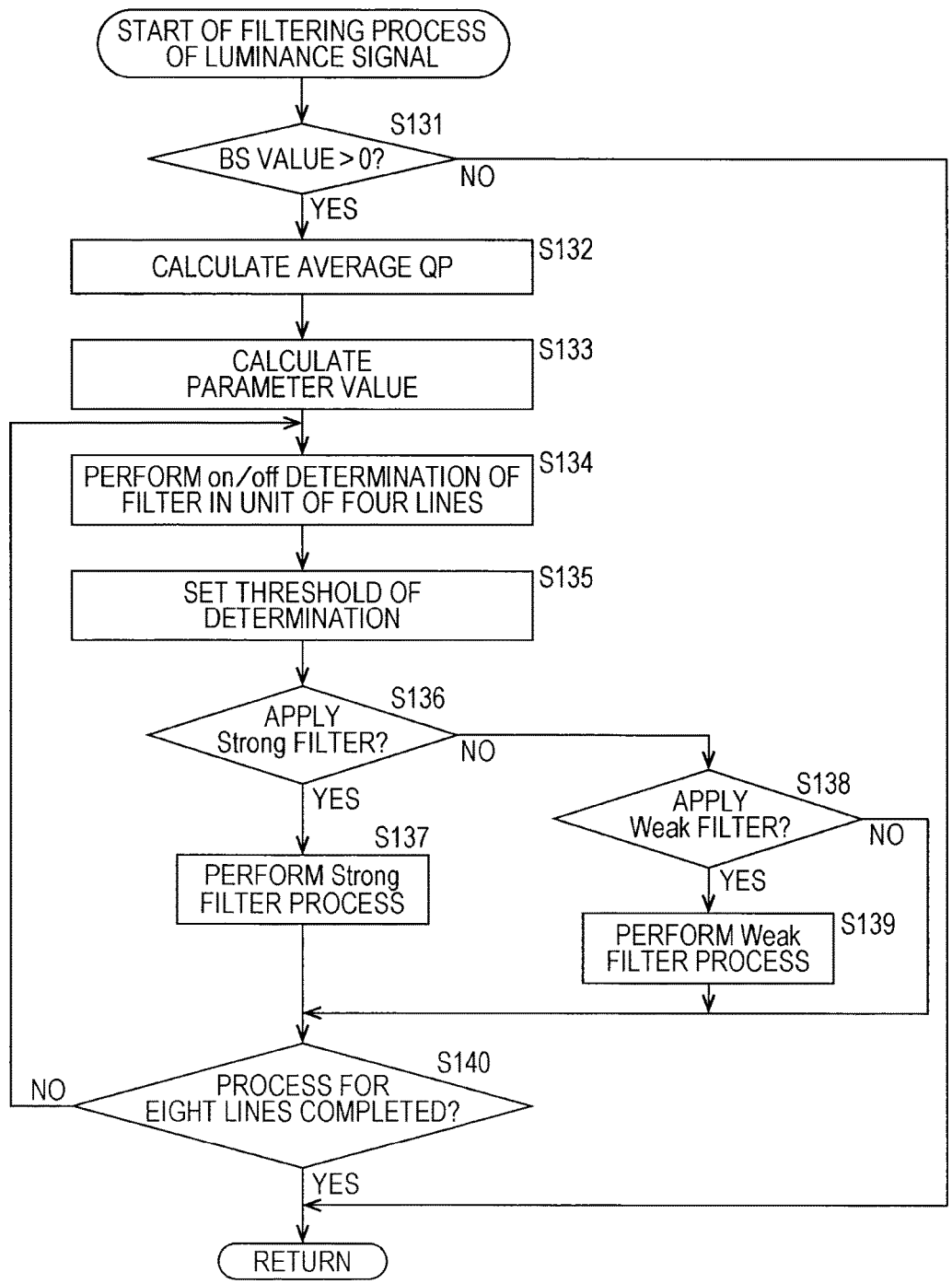
FIG. 15 is a flowchart for describing a filtering process for a luminance boundary.

Next, the filtering process for the luminance boundary in step S105 in FIG. 14 is described with reference to the flowchart of FIG. 15.

The block boundary determination unit 102 determines in step S131 whether the Bs value is larger than 0 or not in units of eight lines. If it has been determined in step S131 that the Bs value is not larger than 0, the filtering process for luminance boundary ends. In other words, the filtering process by the filter calculation unit 104 is not performed on the luminance boundary in this case and the pixel value before the filtering is output.

If it has been determined in step S131 that the Bs value is larger than 0, the process advances to step S132. In step S132, the block boundary determination unit 102 calculates the average QP (quantization parameter) by averaging the quantization parameters QP in the two regions adjacent to the boundary to be processed with the use of the pixel values from the image memory 101 in units of eight lines. The quantization parameter QP is supplied from the control unit 106.

In step S133, the block boundary determination unit 102 calculates the parameters tc and beta based on the average QP calculated by step S132 in units of eight lines.

In step S134, the block boundary determination unit 102 performs the on/off determination of the filter in units of four lines. In other words, the block boundary determination unit 102 performs the on/off determination of the filter in units of four lines by using the calculated parameters beta or tc, or the like.

The on/off determination result in step S134 is supplied to the filter strength determination unit 103 together with the calculated parameters (beta, tc, Bs values) as the boundary determination result.

In step S135, the filter strength determination unit 103 sets the threshold of the determination of the strong filter using each parameter under the control of the control unit 106. In step S135, for example, in the case of using the Bs value, the threshold in the determination in Formulae (4) to (6) is set in accordance with the linear function of the Bs value from the control unit 106. When the shift value is changed, the shift value in Formulae (1) to (3) is changed in accordance with the prediction mode from the control unit 106 and the threshold in the determination is set.

In step S136, the filter strength determination unit 103 determines whether to apply the strong filter in units of four lines, by using Formulae (4) to (6) in which the threshold is set. If it has been determined in step S136 that Formulae (4) to (6) are true and the strong filter is applied, the process advances to step S137.

The on/off determination result in step S134 and the strong filter determination result in step S137 are supplied to the filter calculation unit 104. On this occasion, the parameter tc is also supplied to the filter calculation unit 104.

In step S137, the filter calculation unit 104 performs the strong filtering process for four lines to be processed, based on the determination result from the filter strength determination unit 103. The filter calculation unit 104 outputs the pixel value after the filtering process to the later stage.

If it has been determined in step s136 to apply the strong filter, the process advances to step S138. In step S138, the filter strength determination unit 103 determines whether to apply the weak filter in units of four lines. If it has been determined in step S138 to apply the weak filter, the process advances to step S139.

The on/off determination result in step S134 and the weak filter determination result in step S138 are supplied to the filter calculation unit 104. On this occasion, the parameter tc is also supplied to the filter calculation unit 104.

In step S139, the filter calculation unit 104 uses the weak filter for the four lines to be processed, based on the determination result from the filter strength determination unit 103. The filter calculation unit 104 outputs the pixel value after the filtering process to the later stage.

If it has been determined in step S138 not to use the weak filter, the process advances to step S140. In this case, the filter calculation unit 104 outputs the pixel value after the filtering process to the later stage without any process for four lines to be processed, based on the determination result from the filter strength determination unit 103.

In step S140, the filter calculation unit 104 determines whether the process for eight lines has been completed or not, and if it has been determined that the process for the eight lines is completed, the deblocking of the luminance signal ends. If it has been determined in step S140 that the process for the eight lines is not yet completed, the process returns to step S134 and the processes of step S134 and subsequent thereto are repeated.

Thus, by using the Bs value or by decreasing the shift value, the determination of the strong filter is performed; therefore, the threshold of the determination becomes larger and the strong filter is applied at more boundaries. Thus, in the deblocking process, the strong filter can be applied as appropriate.

In the above description, the HEVC method is used basically as the encoding method. The present disclosure is, however, not limited thereto and other encoding method/decoding method including at least the deblocking filter as the in-loop filter can be used.

Note that the present disclosure can be applied to an image encoding device and an image decoding device that are used when the image information (bit stream) compressed by the orthogonal transform, such as the discrete cosine transform, and the motion compensation is received via a network medium such as the satellite broadcasting, the cable television, the Internet, or the cellular phone, as in the HEVC method or the like, for example. Moreover, the present disclosure can be applied to an image encoding device and an image decoding device that are used in the process in a storage medium such as an optical or magnetic disc or a flash memory.

3. Second Embodiment

Application to Multi-Viewpoint Image Encoding/Multi-Viewpoint Image Decoding

Figure 16:
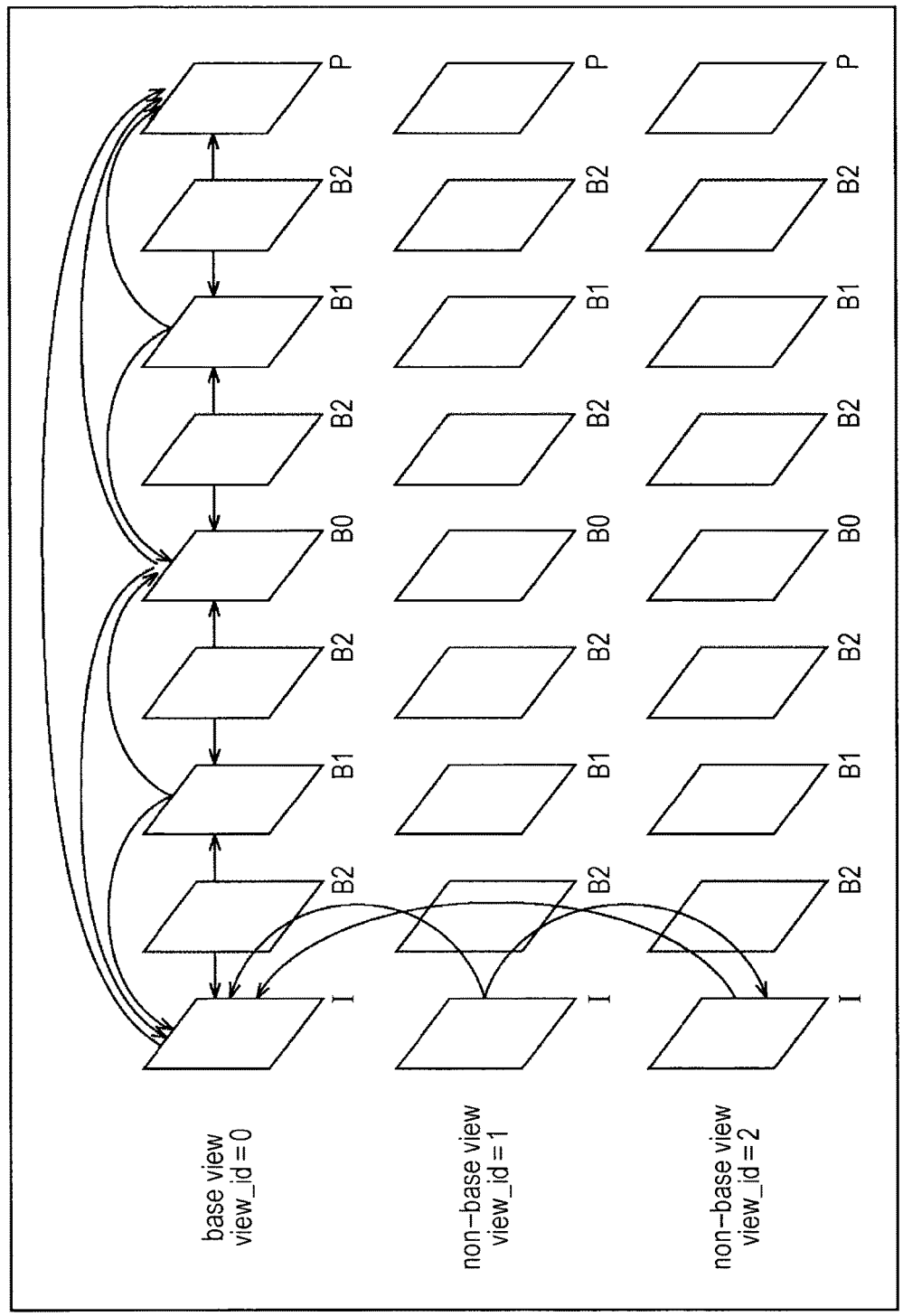
FIG. 16 is a diagram illustrating an example of a multi-viewpoint image encoding method.

The aforementioned processes can be applied to the multi-viewpoint image encoding/multi-viewpoint image decoding. FIG. 16 illustrates an example of the multi-viewpoint image encoding method.

As illustrated in FIG. 16, the multi-viewpoint image includes images of a plurality of viewpoints, and the image of a predetermined viewpoint among the plurality of viewpoints is specified as the image of the base view. The images of the viewpoints other than the image of the base view are treated as the non-base view images.

In encoding the multi-viewpoint image as illustrated in FIG. 16, the parameter of the deblocking filter is set in each view (same view), and whether to apply the strong filter or not can be determined by using the strength parameter of the deblocking filter. In other words, the parameter of the deblocking filter set in another view or the determination result of the strong filter can be used in common in each view (different view).

In this case, the parameter of the deblocking filter set in the base view or whether to apply the strong filter determined is used in at least one non-base view.

Alternatively, the parameter of the deblocking filter set in the non-base view (view_id=i) or whether to apply the strong filter determined is used in at least one of the base view and the non-base view (view_id=j).

Thus, the strong filter can be used as appropriate in the deblocking process. As a result, the block noise can be suppressed.

[Multi-Viewpoint Image Encoding Device]

Figure 17:
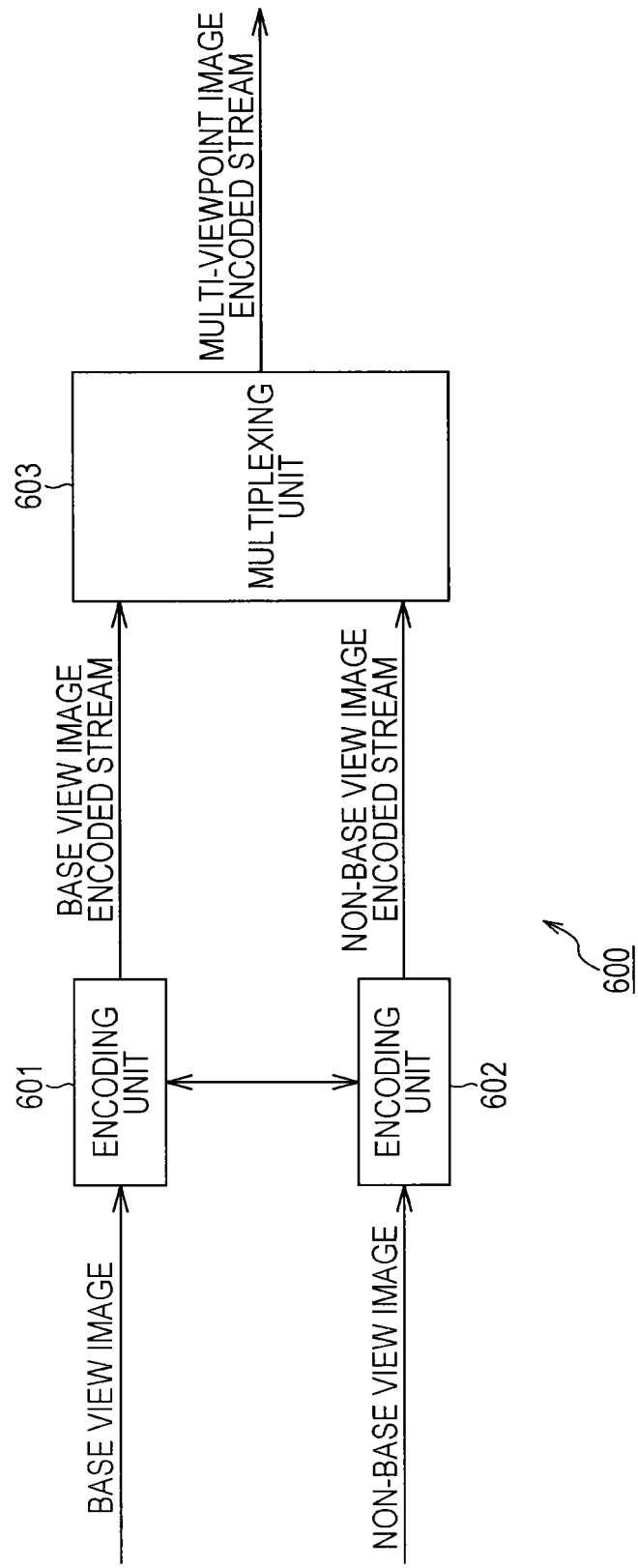
FIG. 17 is a diagram illustrating a main structure example of a multi-viewpoint image encoding device to which the present technique has been applied.

FIG. 17 is a diagram illustrating a multi-viewpoint image encoding device for the multi-viewpoint image encoding described above. As illustrated in FIG. 17, a multi-viewpoint image encoding device 600 includes an encoding unit 601, an encoding unit 602, and a multiplexing unit 603.

The encoding unit 601 encodes the base view image to generate the base-view image encoded stream. The encoding unit 602 encodes the non-base view image to generate the non-base view image encoded stream. The multiplexing unit 603 multiplexes the base view image encoded stream generated in the encoding unit 601 and the non-base view image encoded stream generated in the encoding unit 602, thereby generating the multi-viewpoint image encoded stream.

As the encoding unit 601 and the encoding unit 602 of the multi-viewpoint image encoding device 600, the image encoding device 11 (FIG. 1) can be applied. In this case, the multi-viewpoint image encoding device 600 sets and transmits the parameter of the deblocking filter set by the encoding unit 601 and the parameter of the deblocking filter set by the encoding unit 602.

The parameter of the deblocking filter set by the encoding unit 601 may be set and transmitted to be commonly used in the encoding unit 601 and the encoding unit 602. On the contrary, the parameter of the deblocking filter set by the encoding unit 602 may be set and transmitted to be commonly used in the encoding unit 601 and the encoding unit 602.

[Multi-Viewpoint Image Decoding Device]

Figure 18:
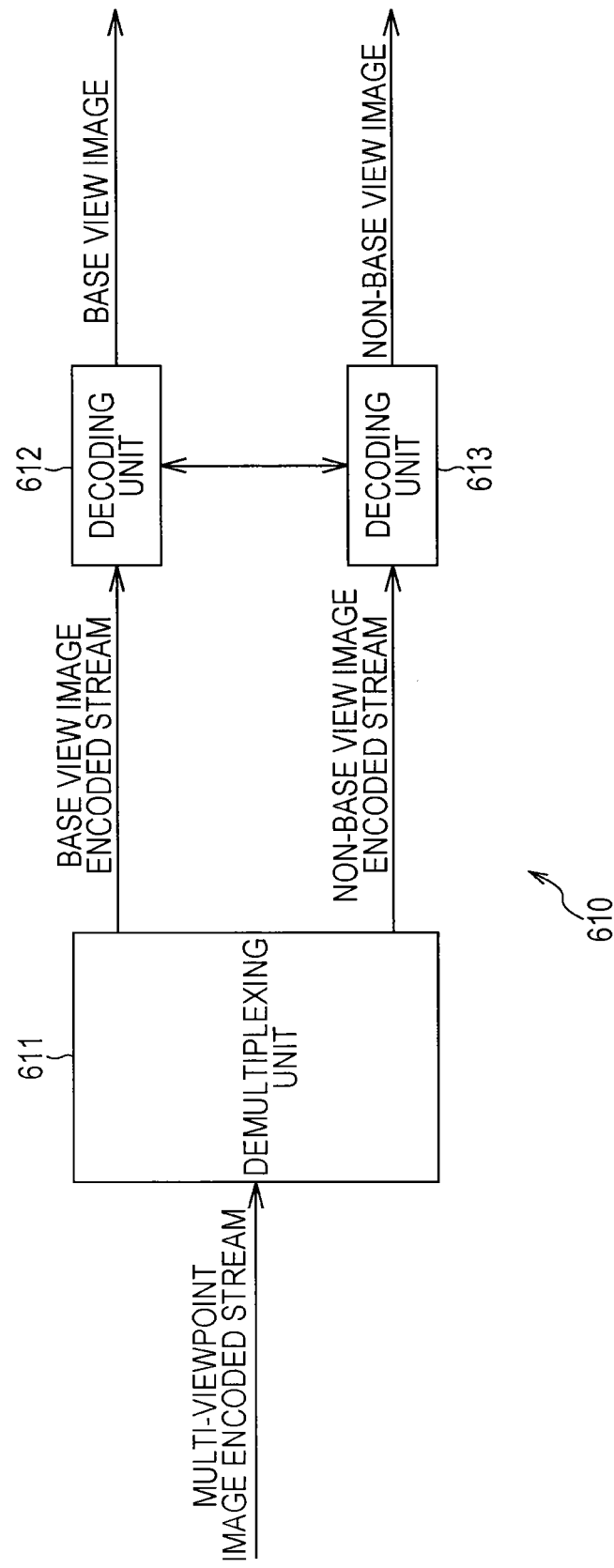
FIG. 18 is a diagram illustrating a main structure example of a multi-viewpoint image decoding device to which the present technique has been applied.

FIG. 18 is a diagram illustrating a multi-viewpoint image decoding device for the aforementioned multi-viewpoint image decoding. As illustrated in FIG. 18, a multi-viewpoint image decoding device 610 includes a demultiplexing unit 611, a decoding unit 612, and a decoding unit 613.

The demultiplexing unit 611 demultiplexes the multi-viewpoint image encoded stream, in which the base view image encoded stream and the non-base view image encoded stream are multiplexed, thereby extracting the base view image encoded stream and the non-base view image encoded stream. The decoding unit 612 decodes the base view image encoded stream extracted by the demultiplexing unit 611, thereby providing the base view image. The decoding unit 613 decodes the non-base view image encoded stream extracted by the demultiplexing unit 611, thereby providing the non-base view image.

As the decoding unit 612 and the decoding unit 613 of the multi-viewpoint image decoding device 610, the multi-viewpoint image decoding device 51 (FIG. 3) can be applied. In this case, the multi-viewpoint image decoding device 610 performs the process using the parameter of the deblocking filter set by the encoding unit 601 and decoded by the decoding unit 612, and the parameter of the deblocking filter set by the encoding unit 602 and decoded by the decoding unit 613.

Note that the parameter of the deblocking filter set by the encoding unit 601 (or encoding unit 602) may be set and transmitted to be commonly used in the encoding unit 601 and the encoding unit 602. In this case, the multi-viewpoint image decoding device 610 performs the process by using the parameter of the deblocking filter set by the encoding unit 601 (or encoding unit 602) and decoded by the decoding unit 612 (or decoding unit 613).

4. Third Embodiment

Application to Layer Image Encoding/Layer Image Decoding

Figure 19:
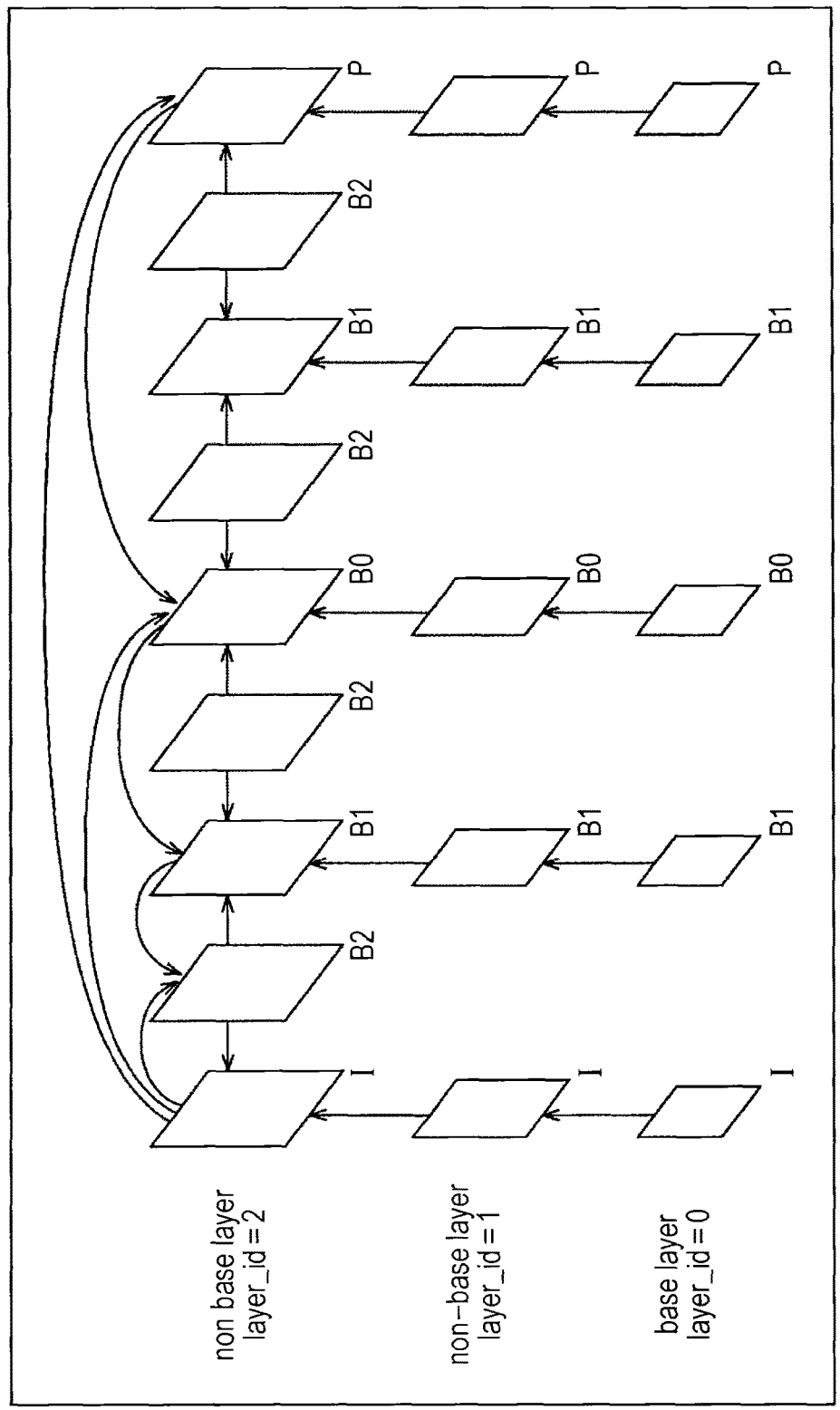
FIG. 19 is a diagram illustrating an example of the multi-viewpoint image encoding method.

The aforementioned processes can be applied to the layer image encoding/layer image decoding. FIG. 19 illustrates an example of the multi-viewpoint image encoding method.

As illustrated in FIG. 19, the layer image includes images of a plurality of layers (resolutions), and the image of a predetermined layer among the plurality of resolutions is specified as the image of the base layer. The images of the layers other than the base layer image are treated as the non-base layer images.

In the case of the layer image encoding (spatial scalability) as illustrated in FIG. 19, the parameter of the deblocking filter is set and whether to apply the strong filter can be determined by using the strength parameter of the deblocking filter. Moreover, among the layers (different layers), the parameters of the deblocking filter set in the other layers or the determination results of the strong filter can be shared.

In this case, the parameter of the deblocking filter set in the base layer or whether to apply the strong filter determined is used in at least one non-base layer.

Alternatively, the parameter of the deblocking filter set in the non-base layer (layer_id=i) or whether to apply the strong filter determined is used in at least one of the base layer and the non-base layer (layer_id=j).

Thus, the strong filter can be applied in the deblocking process as appropriate. As a result, the block noise can be suppressed.

[Layer Image Encoding Device]

Figure 20:
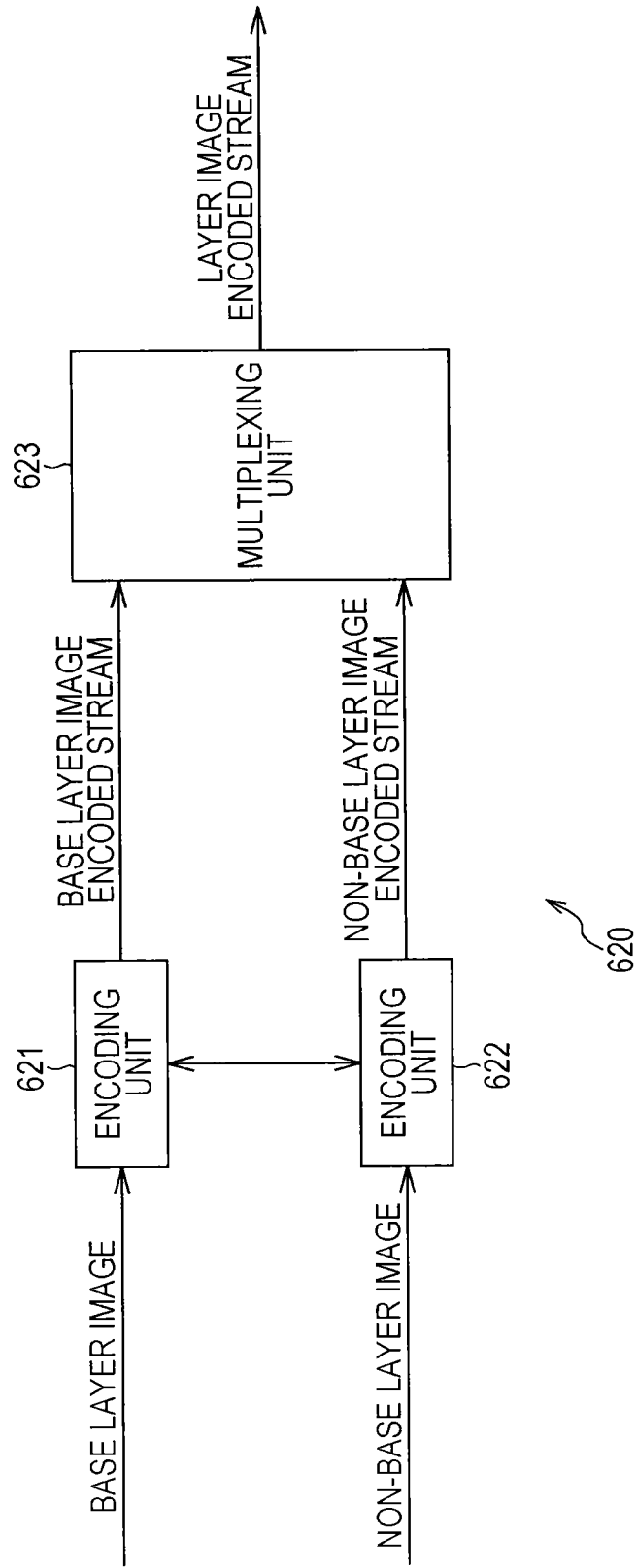
FIG. 20 is a diagram illustrating a main structure example of the multi-viewpoint image encoding device to which the present technique has been applied.

FIG. 20 is a diagram illustrating a layer image encoding device for the aforementioned layer image encoding. As illustrated in FIG. 20, the layer image encoding device 620 includes an encoding unit 621, an encoding unit 622, and a multiplexing unit 623.

The encoding unit 621 encodes the base layer image to generate the base layer image encoded stream. The encoding unit 622 encodes the non-base layer image to generate the non-base layer image encoded stream. The multiplexing unit 623 multiplexes the base layer image encoded stream generated in the encoding unit 621 and the non-base layer image encoded stream generated in the encoding unit 622, thereby generating the layer image encoded stream.

As the encoding unit 621 and the encoding unit 622 in the layer image encoding device 620, the image encoding device 11 (FIG. 1) can be applied. In this case, the layer image encoding device 620 sets and transmits the parameter of the deblocking filter set by the encoding unit 621 and the parameter of the deblocking filter set by the encoding unit 602.

As described above, the parameter of the deblocking filter set by the encoding unit 621 may be set and transmitted to be commonly used in the encoding unit 621 and the encoding unit 622. On the contrary, the parameter of the deblocking filter set by the encoding unit 622 may be set and transmitted to be commonly used in the encoding unit 621 and the encoding unit 622.

[Layer Image Decoding Device]

Figure 21:
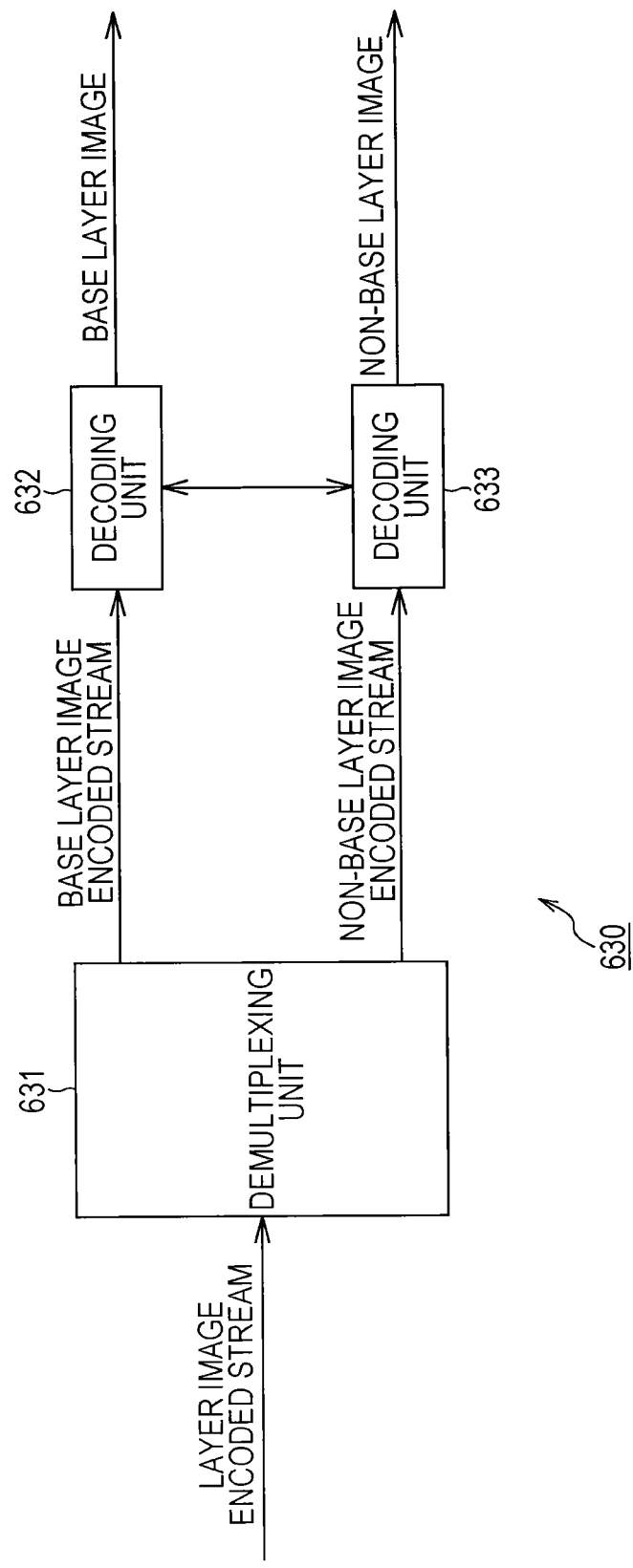
FIG. 21 is a diagram illustrating a main structure example of the multi-viewpoint image decoding device to which the present technique has been applied.

FIG. 21 is a diagram illustrating a layer image decoding device for the aforementioned layer image decoding. As illustrated in FIG. 21, a layer image decoding device 630 includes a demultiplexing unit 631, a decoding unit 632, and a decoding unit 633.

The demultiplexing unit 631 demultiplexes the layer image encoded stream, in which the base layer image encoded stream and the non-base layer image encoded stream are multiplexed, thereby extracting the base layer image encoded stream and the non-base layer image encoded stream. The decoding unit 632 decodes the base layer image encoded stream extracted by the demultiplexing unit 631, thereby providing the base layer image. The decoding unit 633 decodes the non-base layer image encoded stream extracted by the demultiplexing unit 631, thereby providing the non-base layer image.

As the decoding unit 632 and the decoding unit 633 of this layer image decoding device 630, the multi-viewpoint image decoding device 51 (FIG. 3) can be applied. In this case, the layer image decoding device 630 performs the process by using the parameter of the deblocking filter set by the encoding unit 621 and decoded by the decoding unit 632, and the parameter of the deblocking filter set by the encoding unit 622 and decoded by the decoding unit 633.

Note that the parameter of the deblocking filter set by the encoding unit 621 (or encoding unit 622) may be set and transmitted to be commonly used in the encoding unit 621 and the encoding unit 622. In this case, the layer image decoding device 630 performs the process by using the parameter of the deblocking filter set by the encoding unit 621 (or encoding unit 622) and decoded by the decoding unit 632 (or decoding unit 633).

5. Fourth Embodiment

Structure Example of Computer

The aforementioned processes can be executed using either hardware or software. In the case of executing the processes with the software, programs constituting the software are installed in a computer. Here, the computer includes a computer incorporated in dedicated hardware or a versatile personal computer capable of executing various functions by having various programs installed therein.

Figure 22:
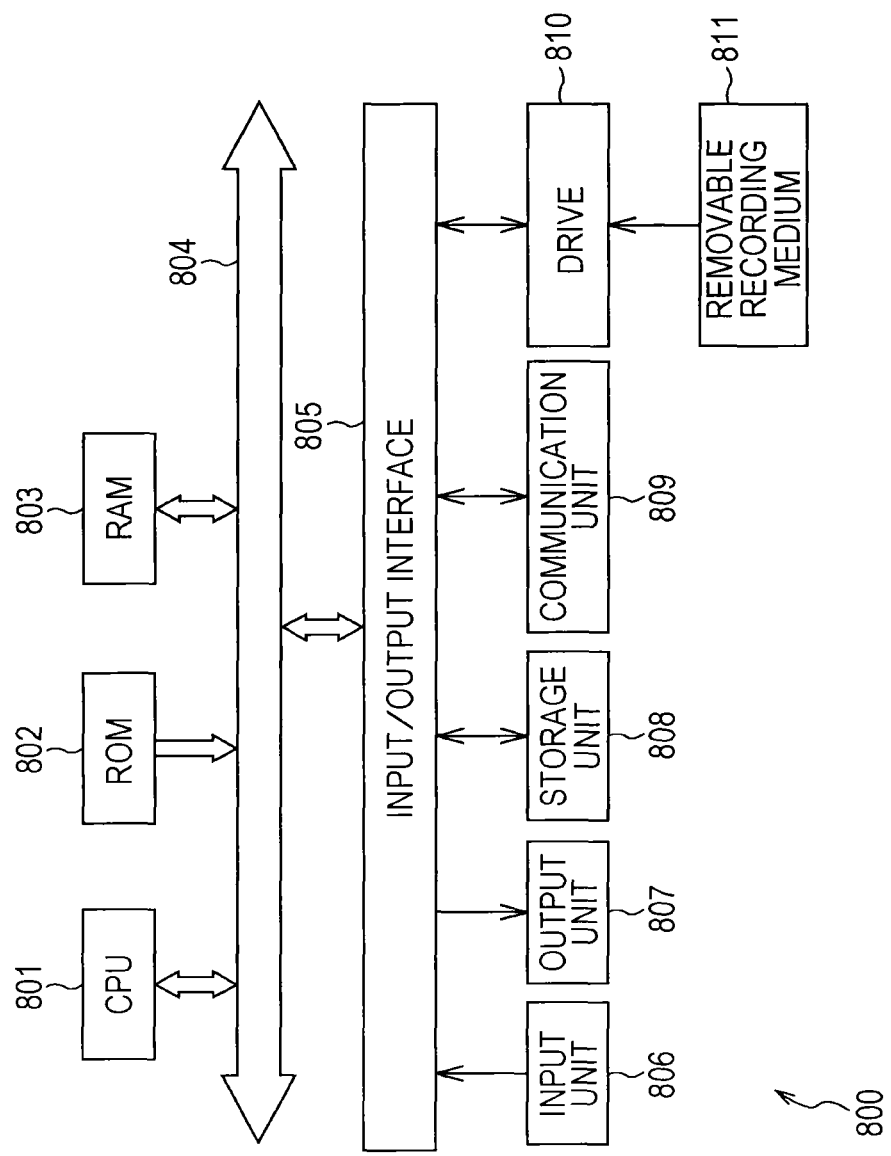
FIG. 22 is a block diagram illustrating a main structure example of a computer.

FIG. 22 is a block diagram illustrating a structure example of the hardware of the computer executing the aforementioned processes with the programs.

In a computer 800, a CPU (Central Processing Unit) 801, a ROM (Read Only Memory) 802, and a RAM (Random Access Memory) 803 are connected to each other with a bus 804.

The bus 804 further has an input/output interface 805 connected thereto. The input/output interface 805 also has an input unit 806, an output unit 807, a storage unit 808, a communication unit 809, and a drive 810 connected thereto.

The input unit 806 corresponds to, for example, a keyboard, a mouse, a microphone, or the like. The output unit 807 corresponds to, for example, a display, a speaker, or the like. The storage unit 808 corresponds to, for example, a hard disk, a nonvolatile memory, or the like. The communication unit 809 corresponds to, for example, a network interface. The drive 810 drives a removable recording medium 811 such as a magnetic disk, an optical disk, a magneto-optic disk, or a semiconductor memory.

In the computer with the above structure, the CPU 801 loads the programs stored in the storage unit 808 to the RAM 803 through the input/output interface 805 and the bus 804 and executes the programs, thereby performing the above-mentioned processes.

The programs executed by the computer 800 (CPU 801) can be provided by being recorded in, for example, the removable recording medium 811 as a package medium, and supplied. The programs can be provided through the wired or wireless transmission medium such as the local area network, the Internet, or digital satellite broadcasting.

In the computer, the programs can be installed in the storage unit 808 through the input/output interface 805 by having the removable recording medium 811 attached to the drive 810. Alternatively, the programs can be installed in the storage unit 808 by having the programs received in the communication unit 809 through a wired or wireless transmission medium. Further alternatively, the programs can be installed in advance in the ROM 802 or the storage unit 808.

The programs to be executed by the computer may be the programs that enable the process in time series order as described in this specification or that enable the processes in parallel or at necessary timing such as when the calling is made.

In this specification, the steps describing the program recorded in the recording medium include not just the process performed in the time series order as described but also the process that is not necessarily performed in the time series but executed in parallel or individually.

In this specification, the system refers to an entire device including a plurality of devices (pieces of apparatus).

In the above description, the structure described as one device (or processing unit) may be divided into and structured as a plurality of devices (or processing units). On the contrary, the structure described above as the plural devices (or processing units) may be structured as one device (or processing unit). The structure other than those described above may be added to the structure of each device (or processing unit). As long as the structure or operation as the whole system is substantially the same, a part of the structure of a certain device (or processing unit) may be included in a structure of another device (or processing unit). Thus, the present technique is not limited to the above embodiment and various modifications can be made without departing from the scope of the present technique.

The image encoding device and image decoding device according to the above embodiments can be applied to various electronic appliances including a transmitter or a receiver used in the distribution on the satellite broadcasting, wired broadcasting such as cable TV, or the Internet, or the distribution to the terminal through the cellular communication, a recording device that records the images in a medium such as an optical disk, a magnetic disk, or a flash memory, and a reproducing device that reproduces the image from these storage media. Description is hereinafter made of four application examples.

6. Application Examples

First Application Example: Television Receiver

Figure 23:
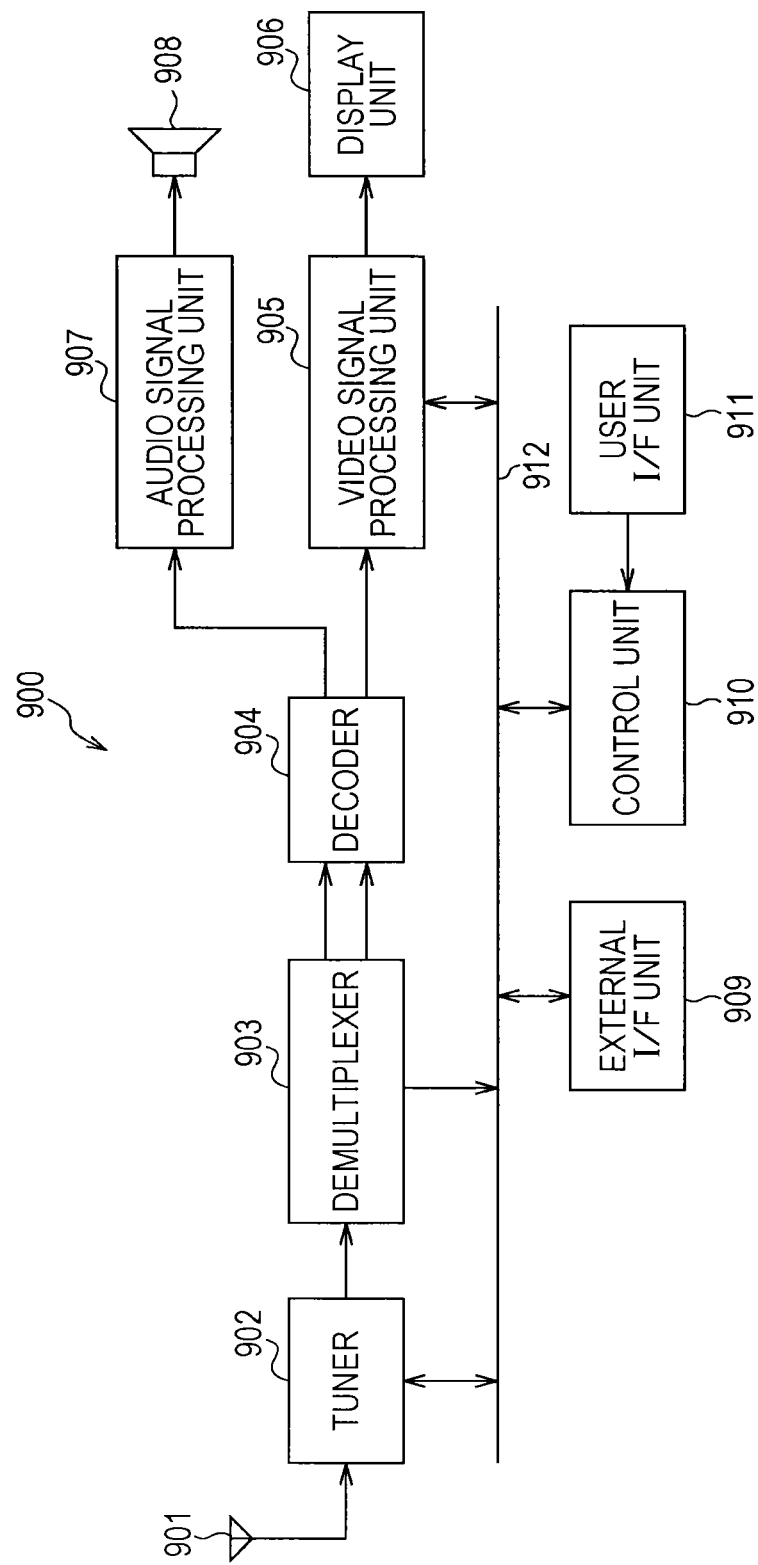
FIG. 23 is a block diagram illustrating an example of a schematic structure of a television device.

FIG. 23 illustrates an example of a schematic structure of a television device to which the above embodiment has been applied. A television device 900 includes an antenna 901, a tuner 902, a demultiplexer 903, a decoder 904, a video signal processing unit 905, a display unit 906, an audio signal processing unit 907, a speaker 908, an external interface 909, a control unit 910, a user interface 911, and a bus 912.

The tuner 902 extracts a signal of a desired channel from broadcasting signals received through the antenna 901, and demodulates the extracted signal. The tuner 902 outputs an encoded bit stream obtained by the demodulation to the demultiplexer 903. In other words, the tuner 902 has a role of a transmission unit in the television device 900 for receiving the encoded stream in which the image is encoded.

The demultiplexer 903 separates the video stream and the audio stream of the program to be viewed from the encoded bit stream, and outputs the separated streams to the decoder 904. The demultiplexer 903 extracts an auxiliary piece of data such as EPG (Electronic Program Guide) from the encoded bit stream, and supplies the extracted data to the control unit 910. Note that the demultiplexer 903 may descramble the encoded bit stream if the encoded bit stream has been scrambled.

The decoder 904 decodes the video stream and the audio stream input from the demultiplexer 903. The decoder 904 outputs the video data generated by the decoding process to the video signal processing unit 905. The decoder 904 moreover outputs the audio data generated by the decoding process to the audio signal processing unit 907.

The video signal processing unit 905 reproduces the video data input from the decoder 904, and displays the video on the display unit 906. The video signal processing unit 905 may display the application screen supplied through the network on the display unit 906. The video signal processing unit 905 may perform an additional process such as noise removal (suppression) on the video data in accordance with the setting. Moreover, the video signal processing unit 905 may generate the image of GUI (Graphical User Interface) such as a menu, a button, or a cursor and overlap the generated image on the output image.

The display unit 906 is driven by a drive signal supplied from the video signal processing unit 905, and displays the video or image on the video screen of a display device (such as a liquid crystal display, a plasma display, or an GELD (Organic ElectroLuminescence Display) (organic EL display)).

The audio signal processing unit 907 performs the reproduction process such as D/A conversion or amplification on the audio data input from the decoder 904, and outputs the audio from the speaker 908. Moreover, the audio signal processing unit 907 may perform the additional process such as noise removal (suppression) on the audio data.

The external interface 909 is the interface for connecting between the television device 900 and an external appliance or a network. For example, the video stream or audio stream received through the external interface 909 may be decoded by the decoder 904. In other words, the external interface 909 also has a role of a transmission unit in the television device 900 for receiving the encoded stream in which the image is encoded.

The control unit 910 includes a processor such as a CPU, and a memory such as a RAM and a ROM. The memory stores programs to be executed by the CPU, program data, EPG data, and data acquired through the network, etc. The programs stored in the memory are read in and executed by the CPU when the television device 900 is activated, for example. By executing the programs, the CPU controls the operation of the television device 900 in response to an operation signal input from the user interface 911, for example.

The user interface 911 is connected to the control unit 910. The user interface 911 includes, for example, a button and a switch for a user to operate the television device 900, and a reception unit for receiving a remote control signal. The user interface 911 generates the operation signal by detecting the operation of the user through these components, and outputs the generated operation signal to the control unit 910.

The bus 912 connects among the tuner 902, the demultiplexer 903, the decoder 904, the video signal processing unit 905, the audio signal processing unit 907, the external interface 909, and the control unit 910.

In the television device 900 with the above structure, the decoder 904 has a function of the image decoding device according to the above embodiment. Thus, in the decoding of the image in the television device 900, the block noise can be suppressed.

Second Application Example: Cellular Phone

Figure 24:
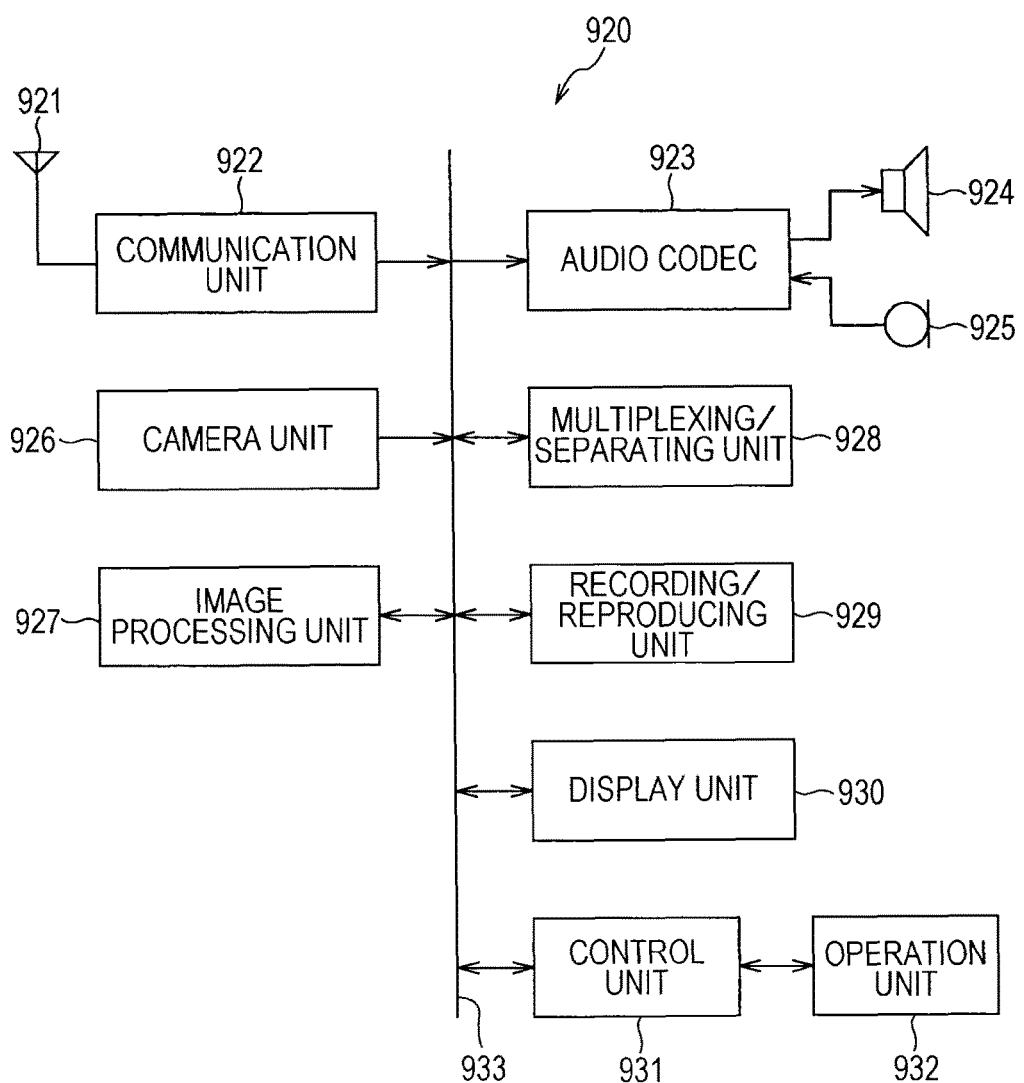
FIG. 24 is a block diagram illustrating an example of a schematic structure of a cellular phone.

FIG. 24 illustrates an example of a schematic structure of a cellular phone to which the above embodiment has been applied. A cellular phone 920 includes an antenna 921, a communication unit 922, an audio codec 923, a speaker 924, a microphone 925, a camera unit 926, an image processing unit 927, a multiplexing/separating unit 928, a recording/reproducing unit 929, a display unit 930, a control unit 931, an operation unit 932, and a bus 933.

The antenna 921 is connected to the communication unit 922. The speaker 924 and the microphone 925 are connected to the audio codec 923. The operation unit 932 is connected to the control unit 931. The bus 933 connects among the communication unit 922, the audio codec 923, the camera unit 926, the image processing unit 927, the multiplexing/separating unit 928, the recording/reproducing unit 929, the display unit 930, and the control unit 931.

The cellular phone 920 performs the operations including the exchange of audio signals, email, and image data, the photographing of images, and the recording of the data in various modes including the voice calling mode, the data communication mode, the photographing mode, and the video calling mode.

In the voice calling mode, the analog audio signal generated by the microphone 925 is supplied to the audio codec 923. The audio codec 923 converts the analog audio signal into the audio data, and compresses the converted audio data through the A/D conversion. Then, the audio codec 923 outputs the compressed audio data to the communication unit 922. The communication unit 922 encodes and modulates the audio data and generates a transmission signal. The communication unit 922 transmits the generated transmission signal to a base station (not shown) through the antenna 921. The communication unit 922 amplifies the wireless signal received through the antenna 921 and converts the frequency thereof, and acquires the reception signal. The communication unit 922 then generates the audio data by demodulating and decoding the reception signal, and outputs the generated audio data to the audio codec 923. The audio codec 923 extends the audio data and performs the D/A conversion thereon, and generates the analog audio signal. The audio codec 923 supplies the generated audio signal to the speaker 924 to output the audio.

In the data communication mode, for example, the control unit 931 generates the text data constituting the email in response to the user operation through the operation unit 932. The control unit 931 displays the text on the display unit 930. The control unit 931 generates the email data in response to the transmission instruction from the user through the operation unit 932, and outputs the generated email data to the communication unit 922. The communication unit 922 encodes and modulates the email data, and generates the transmission signal. The communication unit 922 transmits the generated transmission signal to the base station (not shown) through the antenna 921. The communication unit 922 amplifies the wireless signal received through the antenna 921 and converts the frequency thereof, and acquires the reception signal. The communication unit 922 then decompresses the email data by demodulating and decoding the reception signal, and outputs the decompressed email data to the control unit 931. The control unit 931 causes the display unit 930 to display the content of the email, and at the same time, stores the email data in the storage medium of the recording/reproducing unit 929.

The recording/reproducing unit 929 has an arbitrary readable and writable storage medium. For example, the storage medium may be a built-in type storage medium such as a RAM or a flash memory, or a detachable storage medium such as a hard disk, a magnetic disk, a magneto-optic disk, and an optical disk, a USB (Universal Serial Bus) memory, or a memory card.

In the photographing mode, for example, the camera unit 926 photographs a subject, generates the image data, and outputs the generated image data to the image processing unit 927. The image processing unit 927 encodes the image data input from the camera unit 926, and stores the encoded stream in the storage medium of the recording/reproducing unit 929.

In the video calling mode, for example, the multiplexing/separating unit 928 multiplexes the video stream encoded by the image processing unit 927 and the audio stream input from the audio codec 923, and outputs the multiplexed stream to the communication unit 922. The communication unit 922 encodes and modulates the stream and generates the transmission signal. Then, the communication unit 922 transmits the generated transmission signal to a base station (not shown) through the antenna 921. Moreover, the communication unit 922 amplifies the wireless signal received through the antenna 921 and converts the frequency thereof, and acquires the reception signal. These transmission signal and reception signal can include the encoded bit stream. Then, the communication unit 922 decompresses the stream by demodulating and decoding the reception signal, and outputs the decompressed stream to the multiplexing/separating unit 928. The multiplexing/separating unit 928 separates the video stream and the audio stream from the input stream, and outputs the video stream to the image processing unit 927 and the audio stream to the audio codec 923. The image processing unit 927 decodes the video stream and generates the video data. The video data are supplied to the display unit 930 where a series of images are displayed. The audio codec 923 extends the audio stream and performs the D/A conversion thereon, and generates the analog audio signal. The audio codec 923 supplies the generated audio signal to the speaker 924 to output the audio.

In the cellular phone 920 with the above structure, the image processing unit 927 has a function of the image encoding device and the image decoding device according to the above embodiment. Thus, in the encoding and decoding of the image in the cellular phone 920, the block noise can be suppressed.

Third Application Example: Recording/Reproducing Device

Figure 25:
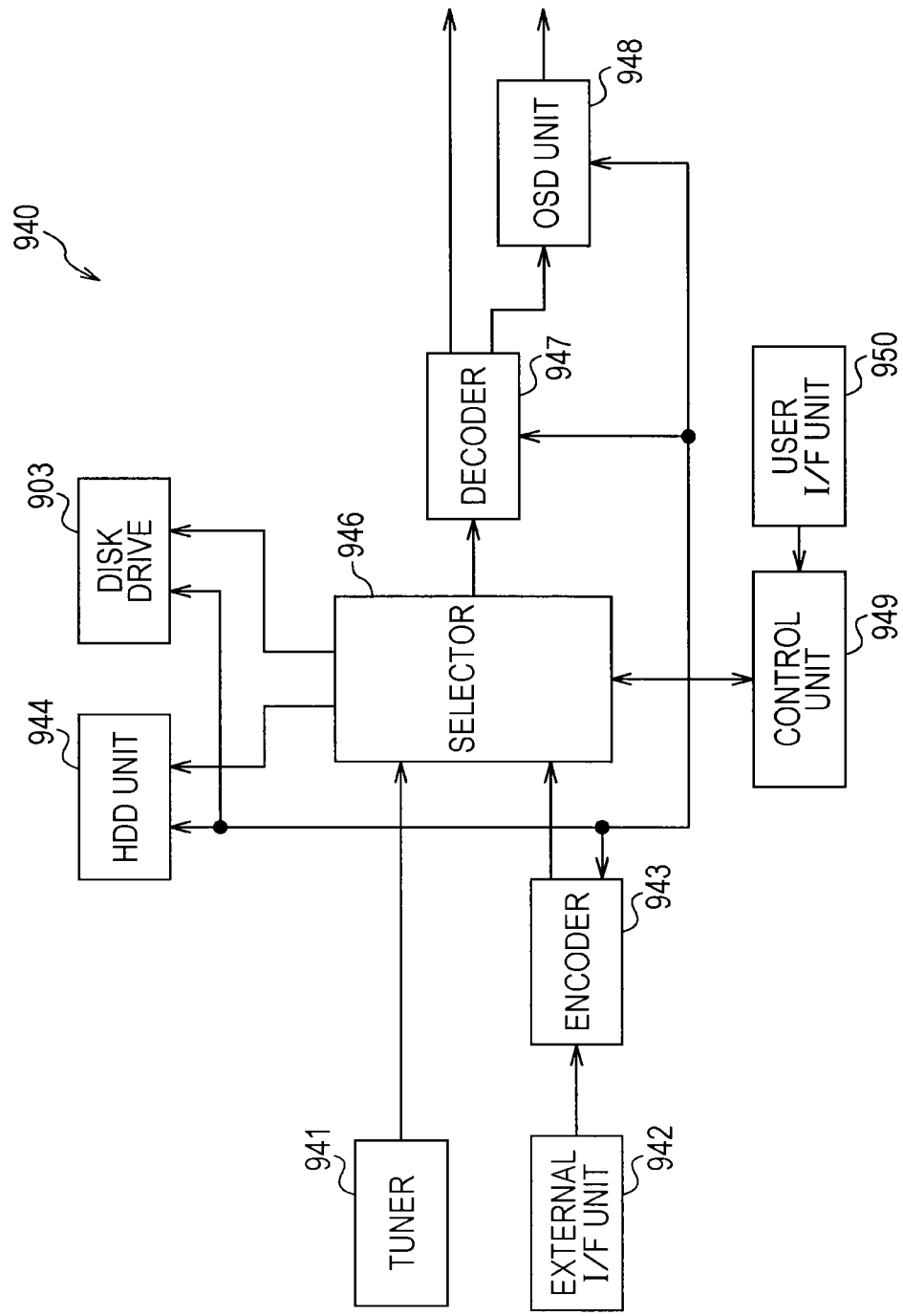
FIG. 25 is a block diagram illustrating an example of a schematic structure of a recording/reproducing device.

FIG. 25 illustrates an example of a schematic structure of a recording/reproducing device to which the above embodiment has been applied. A recording/reproducing device 940 encodes the audio data and the video data of the received broadcast program, and records the data in the recording medium, for example. The recording/reproducing device 940 may encode the audio data and the video data acquired from another device, and record the data in the recording medium. The recording/reproducing device 940 reproduces the data recorded in the recording medium on the monitor and speaker in response to the user instruction. In this case, the recording/reproducing device 940 decodes the audio data and the video data.

The recording/reproducing device 940 includes a tuner 941, an external interface 942, an encoder 943, an HDD (Hard Disk Drive) 944, a disk drive 945, a selector 946, a decoder 947, an OSD (On-Screen Display) 948, a control unit 949, and a user interface 950.

The tuner 941 extracts a signal of a desired channel from broadcasting signals received through an antenna (not shown), and demodulates the extracted signal. The tuner 941 outputs an encoded bit stream obtained by the demodulation to the selector 946. In other words, the tuner 941 has a role of a transmission unit in the recording/reproducing device 940.

The external interface 942 is the interface that connects between the recording/reproducing device 940 and an external appliance or a network. The external interface 942 may be, for example, the IEEE1394 interface, the network interface, the USB interface, or the flash memory interface. For example, the video data and audio data received through the external interface 942 are input to the encoder 943. In other words, the external interface 942 also has a role of a transmission unit in the recording/reproducing device 940.

If the video data and audio data input from the external interface 942 have not been encoded, the encoder 943 encodes the video data and the audio data. Then, the encoder 943 outputs the encoded bit stream to the selector 946.

The HDD 944 records the encoded bit stream containing compressed content data such as video and audio, various programs, and other pieces of data in the internal hard disk. The HDD 944 reads out these pieces of data from the hard disk when the video or audio is reproduced.

The disk drive 945 records and reads out the data into and from the attached recording medium. The recording medium attached to the disk drive 945 may be, for example, a DVD disc (such as DVD-Video, DVD-RAM, DVD-R, DVD-RW, DVD+R, or DVD+RW) or a Blu-ray (registered trademark) disc.

When the video and audio are recorded, the selector 946 selects the encoded bit stream input from the tuner 941 or the encoder 943, and outputs the selected encoded bit stream to the HDD 944 or the disk drive 945. When the video and audio are reproduced, the selector 946 outputs the encoded bit stream input from the HDD 944 or the disk drive 945 to the decoder 947.

The decoder 947 decodes the encoded bit stream to generate the video data and audio data. Then, the decoder 947 outputs the generated video data to the OSD 948. The decoder 904 outputs the generated audio data to the external speaker.

The OSD 948 reproduces the video data input from the decoder 947, and displays the video. The OSD 948 may overlap the GUI image such as a menu, a button, or a cursor on the displayed video.

The control unit 949 includes a processor such as a CPU, and a memory such as a RAM and a ROM. The memory stores programs to be executed by the CPU, and program data, etc. The programs stored in the memory are read in and executed by the CPU when the recording/reproducing device 940 is activated, for example. By executing the programs, the CPU controls the operation of the recording/reproducing device 940 in response to an operation signal input from the user interface 950, for example.

The user interface 950 is connected to the control unit 949. The user interface 950 includes, for example, a button and a switch for a user to operate the recording/reproducing device 940, and a reception unit for receiving a remote control signal. The user interface 950 generates the operation signal by detecting the operation of the user through these components, and outputs the generated operation signal to the control unit 949.

In the recording/reproducing device 940 with the above structure, the encoder 943 has a function of the image encoding device according to the above embodiment. The decoder 947 has a function of the image decoding device according to the above embodiment. Thus, in the encoding and decoding of the image in the recording/reproducing device 940, the block noise can be suppressed.

Fourth Application Example: Photographing Device

Figure 26:
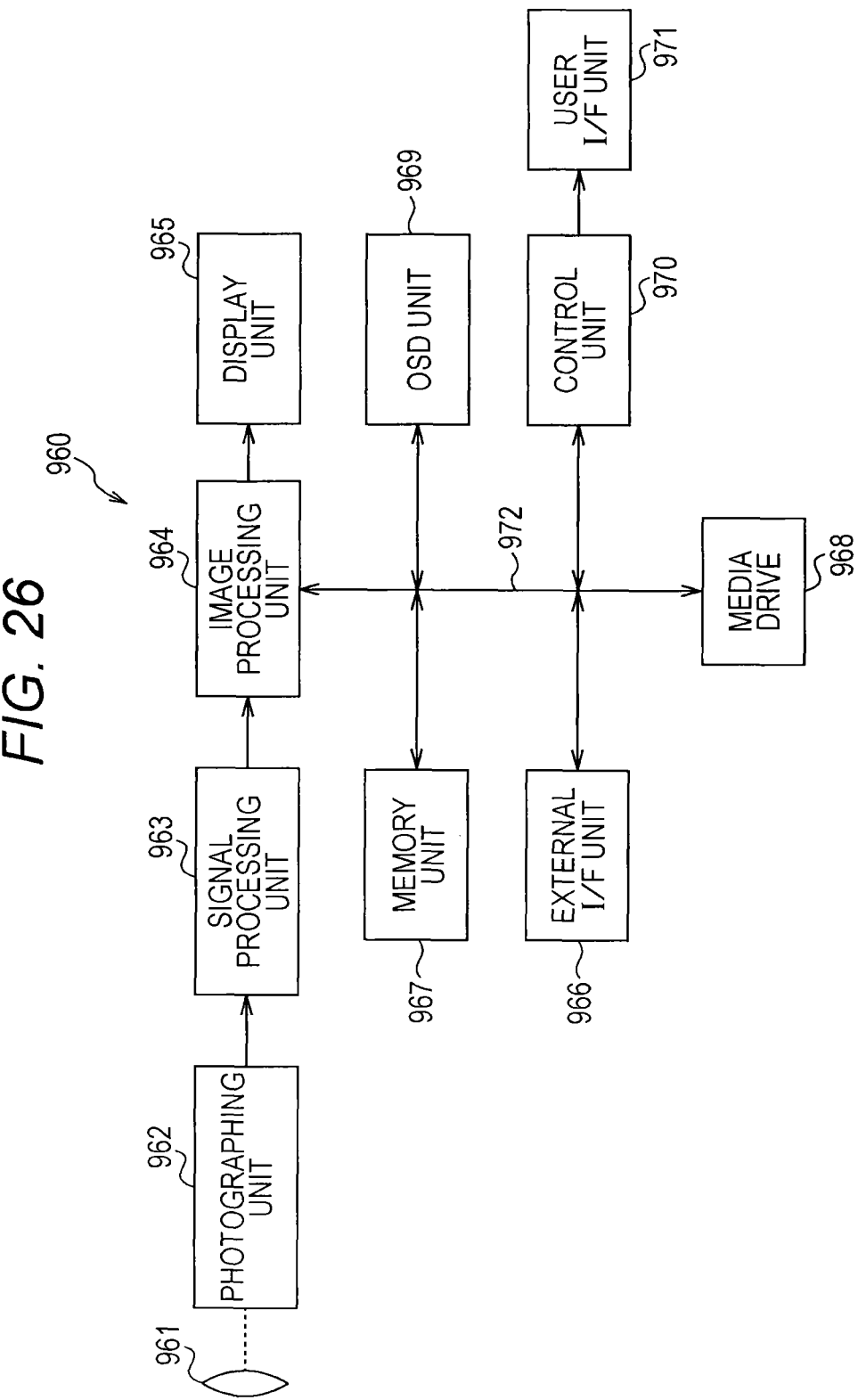
FIG. 26 is a block diagram illustrating an example of a schematic structure of a photographing device.

FIG. 26 illustrates an example of a schematic structure of a photographing device to which the above embodiment has been applied. A photographing device 960 generates an image by photographing a subject, encodes the image data, and records the data in a recording medium.

The photographing device 960 includes an optical block 961, a photographing unit 962, a signal processing unit 963, an image processing unit 964, a display unit 965, an external interface 966, a memory unit 967, a media drive 968, an OSD 969, a control unit 970, a user interface 971, and a bus 972.

The optical block 961 is connected to the photographing unit 962. The photographing unit 962 is connected to the signal processing unit 963. The display unit 965 is connected to the image processing unit 964. The user interface 971 is connected to the control unit 970. The bus 972 connects among the image processing unit 964, the external interface 966, the memory 967, the media drive 968, the OSD 969, and the control unit 970.

The optical block 961 has a focusing lens, a diaphragm mechanism, and the like. The optical block 961 focuses an optical image of a subject on a photographing surface of the photographing unit 962. The photographing unit 962 includes an image sensor such as a CCD (Charge Coupled Device) or a CMOS (Complementary Metal Oxide Semiconductor), and converts the optical image focused on the photographing surface into an image signal as an electric signal through photoelectric conversion. Then, the photographing unit 962 outputs the image signal to the signal processing unit 963.

The signal processing unit 963 performs various camera signal processes such as knee correction, gamma correction, and color correction on the image signal input from the photographing unit 962. The signal processing unit 963 outputs the image data after the camera signal process, to the image processing unit 964.

The image processing unit 964 encodes the image data input from the signal processing unit 963 and generates the encoded data. Then, the image processing unit 964 outputs the generated encoded data to the external interface 966 or the media drive 968. The image processing unit 964 decodes the encoded data input from the external interface 966 or the media drive 968, and generates the image data. Then, the image processing unit 964 outputs the generated image data to the display unit 965. Moreover, the image processing unit 964 may output the image data input from the signal processing unit 963 to the display unit 965 where the image is displayed. The image processing unit 964 may additionally overlap the display data acquired from the OSD 969 on the image output to the display unit 965.

The OSD 969 generates the GUI image such as a menu, a button, or a cursor and outputs the generated image to the image processing unit 964.

The external interface 966 is configured as, for example, a USB input/output terminal. The external interface 966 connects, for example, between the photographing device 960 and a printer when the image is printed. Moreover, the external interface 966 can have a drive connected thereto when necessary. To the drive, for example, a removable medium such as a magnetic disk or an optical disk is attached, and the program read out from the removable medium can be installed in the photographing device 960. Alternatively, the external interface 966 may be configured as the network interface connected to the network such as LAN or the Internet. In other words, the external interface 966 has a role of a transmission unit in the photographing device 960.

The recording medium attached to the media drive 968 may be, for example, any readable and writable removable medium such as a magnetic disk, a magneto-optic disk, an optical disk, or a semiconductor memory. The media drive 968 may have the recording medium fixedly attached thereto and a non-transportable storage unit such as a built-in hard disk drive or an SSD (Solid State Drive) may be configured.

The control unit 970 includes a processor such as a CPU, and a memory such as a RAM and a ROM. The memory stores programs to be executed by the CPU, and program data, etc. The programs stored in the memory are read in and executed by the CPU when the photographing device 960 is activated, for example. By executing the programs, the CPU controls the operation of the photographing device 960 in response to an operation signal input from the user interface 971, for example.

The user interface 971 is connected to the control unit 970. The user interface 971 includes, for example, a button and a switch for a user to operate the photographing device 960. The user interface 971 generates the operation signal by detecting the operation of the user through these components, and outputs the generated operation signal to the control unit 970.

In the photographing device 960 with the above structure, the image processing unit 964 has a function of the image encoding device and the image decoding device according to the above embodiment. Thus, in the encoding and decoding of the image in the photographing device 960, the block noise can be suppressed.

7. Fifth Embodiment

Another Example of Embodiment

The above description has been made of the examples of the device or the system to which the present technique has been applied; however, the present technique is not limited thereto. The present technique can be carried out as any kind of a structure mounted on the device as above and a structure included in the system, for example, to a processor as a system LSI (Large Scale Integration), a module including a plurality of processors, a unit including a plurality of modules, and a set having another function added to the unit (that is, the structure of a part of the device).

<Video Set>

Figure 27:
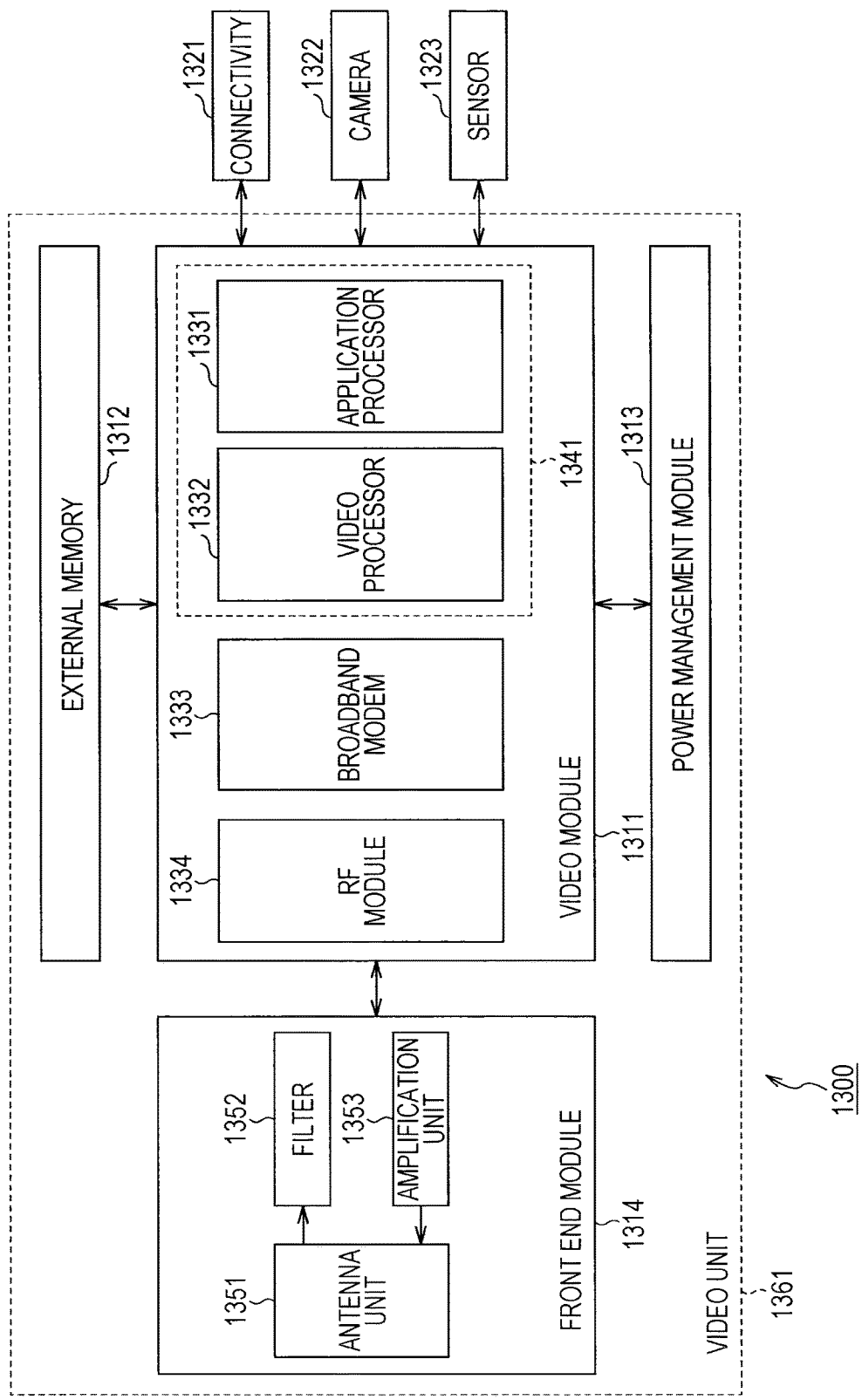
FIG. 27 is a block diagram illustrating an example of a schematic structure of a video set.

An example of carrying out the present technique as a set is described with reference to FIG. 27. FIG. 27 illustrates an example of a schematic structure of a video set to which the present technique has been applied.

In recent years, electronic appliances have come to have various functions, and when just a part of the structure is sold or provided in the development and manufacture, it is often seen that not just one structure is provided but a plurality of structures with correlated functions is combined and treated as one multi-functional set.

A video set 1300 illustrated in FIG. 27 has a structure with various functions, which is formed by having a device with a function related to image encoding or decoding (either one of them or both) combined with a device with another function related to the above function.

As illustrated in FIG. 27, the video set 1300 includes a module group including a video module 1311, an external memory 1312, a power management module 1313, a front end module 1314, and the like, and devices with the correlated functions, such as a connectivity 1321, a camera 1322, and a sensor 1323.

The module refers to a component with the functions obtained by combining several correlated functions. The specific physical structure is arbitrarily given; for example, a plurality of electronic circuit elements each having its own function, such as a processor, a resistor, and a capacitor, and other devices may be disposed on a wiring board and integrated. Further, another module or processor may be combined with the above module to form a new module.

In the case of the example of FIG. 27, the video module 1311 is the combination of the structures with functions related to image processing, and includes an application processor, a video processor, a broadband modem 1333, and an RF module 1334.

The processor is formed by integrating structures with predetermined functions on a semiconductor chip through SoC (System On a Chip), and is also referred to as, for example, a system LSI (Large Scale Integration). The structure with the predetermined function may be a logic circuit (hardware structure), a CPU, a ROM, a RAM or the like, a program executed using the same (software structure), or the combination of the both. For example, the processor may have a logic circuit, and a CPU, a ROM, a RAM, or the like and have a part of the function achieved by the logic circuit (hardware structure) and the other functions may be achieved by a program (software structure) executed in the CPU.

The application processor 1331 in FIG. 27 is the processor that executes the application for the image processing. The application executed in the application processor 1331 not just performs the calculation process but also controls the structures in and out of the video module 1311 such as the video processor 1332 as necessary for achieving the predetermined function.

The video processor 1332 is the processor with the function for the image encoding or decoding (one of them or both).

The broadband modem 1333 is a processor (or module) that performs the process related to the broadband communication with or (and) without wires through a broadband line such as the Internet or public telephone network. For example, the broadband modem 1333 converts the transmission data (digital signals) into analog signals through digital modulation, or converts the received analog signal into the data (digital signals) by demodulating the received analog signal. The broadband modem 1333 can digitally modulate/demodulate any piece of information including the image data, the stream in which the image data are encoded, the application program, and the setting data to be processed by the video processor 1332, for example.

The RF module 1334 is the module that performs the frequency conversion, modulation/demodulation, amplification, filtering, and the like on the RF (Radio Frequency) signal that are exchanged via the antenna. For example, the RF module 1334 generates the RF signal by converting the frequency of the base band signal generated by the broadband modem 1333. In another example, the RF module 1334 generates the base band signal by converting the frequency of the RF signal received via the front end module 1314.

As indicated by a dotted line 1341 in FIG. 27, the application processor 1331 and the video processor 1332 may be integrated into one processor.

The external memory 1312 is the module provided outside the video module 1311 and having a storage device used by the video module 1311. The storage device of the external memory 1312 may be achieved by any physical structure; however, since the storage device is often used for storage of a large amount of data such as the image data in units of frame, the storage device is desirably achieved by a semiconductor memory that has high capacity but costs less like a DRAM (Dynamic Random Access Memory).

The power management module 1313 manages and controls the power supply to the video module 1311 (each structure in the video module 1311).

The front end module 1314 is the module that provides the RF module 1334 with the front end function (circuit on the transmission/reception end of the antenna side). As illustrated in FIG. 27, the front end module 1314 has, for example, an antenna unit 1351, a filter 1352, and an amplification unit 1353.

The antenna unit 1351 has an antenna that transmits and receives wireless signals and a peripheral structure thereof. The antenna unit 1351 transmits the signal supplied from the amplification unit 1353 and supplies the received wireless signal to the filter 1352 as an electric signal (RF signal). The filter 1352 filters the RF signal received through the antenna unit 1351 and supplies the processed RF signal to the RF module 1334. The amplification unit 1353 amplifies the RF signal supplied from the RF module 1334 and supplies the signal to the antenna unit 1351.

The connectivity 1321 is the module having the function related to the external connection. The physical structure of the connectivity 1321 may be determined arbitrarily. For example, the connectivity 1321 has a structure with a communication function other than the communication specification for the broadband modem 1333, an external input/output terminal, or the like.

For example, the connectivity 1321 may have a module with a communication function based on the wireless communication specification such as Bluetooth (registered trademark), IEEE 802.11 (for example, Wi-Fi (Wireless Fidelity, registered trademark)), NFC (Near Field Communication), or IrDA (InfraRed Data Association), an antenna that transmits or receives the signal based on those specifications, or the like. Alternatively, the connectivity 1321 may have a module with a communication function based on the wired communication specification such as USB (Universal Serial Bus) or HDMI (registered trademark, High-Definition Multimedia Interface), a terminal based on that specification, or the like. Further alternatively, the connectivity 1321 may have another data (signal) transmission function such as an analog input/output terminal, or the like.

Note that the connectivity 1321 may incorporate a device to which the data (signals) are transmitted. For example, the connectivity 1321 may have a drive (not just the drive of the removable medium but also a hard disk, an SSD (Solid State Drive), or a NAS (Network Attached Storage)) that reads out or writes data from and in a recording medium such as a magnetic disk, an optical disk, a magneto-optical disk, or a semiconductor memory. The connectivity 1321 may have a device that outputs the image or audio (monitor, speaker, or the like).

The camera 1322 is the module that photographs a subject and obtains image data of the subject. The image data obtained by the photographing with the camera 1322 are supplied to, for example, the video processor 1332 and encoded therein.

The sensor 1323 is the module with any sensor function, such as an audio sensor, an ultrasonic wave sensor, a light sensor, an illuminance sensor, an infrared-ray sensor, an image sensor, a rotation sensor, an angle sensor, an angular velocity sensor, a speed sensor, an acceleration sensor, an inclination sensor, a magnetic identification sensor, a shock sensor, or a temperature sensor. The data detected by the sensor 1323 are supplied to the application processor 1331 and used by the application, etc.

The structure described above as the module may be achieved as a processor or on the contrary, the structure described as the processor may be achieved as a module.

In the video set 1300 with the above structure, the present technique can be applied to the video processor 1332 as described below. Therefore, the video set 1300 can be used as the set to which the present technique has been applied.

[Structure Example of Video Processor]

Figure 28:
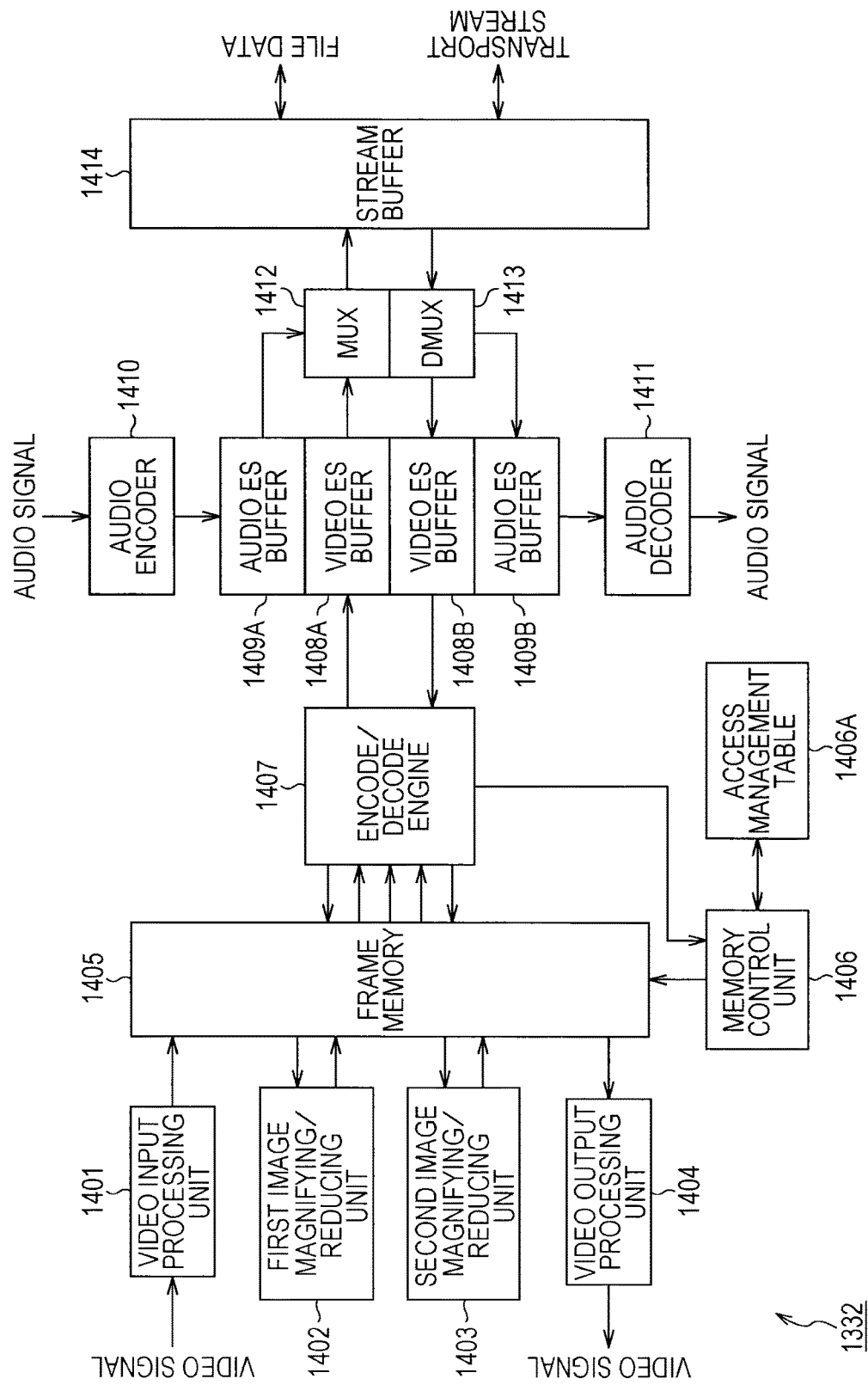
FIG. 28 is a block diagram illustrating an example of a schematic structure of a video processor.

FIG. 28 illustrates an example of a schematic structure of the video processor 1332 (FIG. 27) to which the present technique has been applied.

In the case of the example of FIG. 28, the video processor 1332 has a function of encoding a video signal and an audio signal by a predetermined method upon the reception of the signals, and a function of decoding the encoded video data and audio data and reproducing and outputting the video signal and the audio signal.

As illustrated in FIG. 28, the video processor 1332 includes a video input processing unit 1401, a first image magnifying/reducing unit 1402, a second image magnifying/reducing unit 1403, a video output processing unit 1404, a frame memory 1405, and a memory control unit 1406. The video processor 1332 includes an encode/decode engine 1407, video ES (Elementary Stream) buffers 1408A and 1408B, and audio ES buffers 1409A and 1409B. The video processor 1332 further includes an audio encoder 1410, an audio decoder 1411, a multiplexing unit (MUX (Multiplexer)) 1412, a demultiplexing unit (DMUX (Demultiplexer)) 1413, and a stream buffer 1414.

The video input processing unit 1401 acquires the video signal input from, for example, the connectivity 1321 (FIG. 27) and converts the signal into digital image data. The first image magnifying/reducing unit 1402 performs the format conversion on the image data or magnifies/reduces the image. The second image magnifying/reducing unit 1403 performs the image magnifying/reducing process on the image data according to the format at the destination to which the data are output through the video output processing unit 1404, or performs the format conversion on the image data or magnifies/reduces the image in a manner similar to the first image magnifying/reducing unit 1402. The video output processing unit 1404 performs the format conversion on the image data or converts the image data into analog signals, for example, and outputs the data as the reproduced video signal to the connectivity 1321 (FIG. 27), for example.

The frame memory 1405 is the memory for the image data shared by the video input processing unit 1401, the first image magnifying/reducing unit 1402, the second image magnifying/reducing unit 1403, the video output processing unit 1404, and the encode/decode engine 1407. The frame memory 1405 is achieved as, for example, a semiconductor memory such as a DRAM.

The memory control unit 1406 controls the access of writing and reading in and from the frame memory 1405 according to the access schedule for the frame memory 1405 that has been written in an access management table 1406A upon the reception of a synchronization signal from the encode/decode engine 1407. The access management table 1406A is updated by the memory control unit 1406 in response to the process executed by the encode/decode engine 1407, the first image magnifying/reducing unit 1402, the second image magnifying/reducing unit 1403, or the like.

The encode/decode engine 1407 encodes the image data and decodes the video stream, which is the data obtained by encoding the image data. For example, the encode/decode engine 1407 encodes the image data read out from the frame memory 1405, and sequentially writes the data in the video ES buffer 1408A as the video streams. Moreover, the encode/decode engine 1407 sequentially reads out the video streams from the video ES buffer 1408B and decodes the streams, and sequentially writes the streams in the frame memory 1405 as the image data. The encode/decode engine 1407 uses the frame memory 1405 as a work region in the encoding and decoding. The encode/decode engine 1407 outputs a synchronization signal to the memory control unit 1406 at the timing at which the process for each macroblock is started, for example.

The video ES buffer 1408A buffers the video stream generated by the encode/decode engine 1407, and supplies the stream to the multiplexing unit (MUX) 1412. The video ES buffer 1408B buffers the video stream supplied from the demultiplexing unit (DMUX) 1413 and supplies the stream to the encode/decode engine 1407.

The audio ES buffer 1409A buffers the audio stream generated by the audio encoder 1410, and supplies the stream to the multiplexing unit (MUX) 1412. The audio ES buffer 1409B buffers the audio stream supplied from the demultiplexing unit (DMUX) 1413 and supplies the stream to the audio decoder 1411.

The audio encoder 1410 converts the audio signal input from the connectivity 1321 (FIG. 27), for example, into the digital signals, thereby encoding the signal by a predetermined method such as the MPEG audio method or AC3 (AudioCode number 3). The audio encoder 1410 sequentially writes the audio stream as the data obtained by encoding the audio signals into the audio ES buffer 1409A. The audio decoder 1411 decodes the audio stream supplied from the audio ES buffer 1409B, and converts the stream into analog signals, and then supplies the signals as the reproduced audio signals to, for example, the connectivity 1321 (FIG. 27).

The multiplexing unit (MUX) 1412 multiplexes the video stream and the audio stream. A method for this multiplexing (i.e., format of the bit stream generated by the multiplexing) may be determined arbitrarily. In the multiplexing, the multiplexing unit (MUX) 1412 may add predetermined header information or the like to the bit stream. In other words, the multiplexing unit (MUX) 1412 can convert the format of the stream by the multiplexing. For example, the multiplexing unit (MUX) 1912 multiplexes the video stream and the audio stream to convert the streams into the transport stream, which is the bit stream in the format for transfer. In another example, the multiplexing unit (MUX) 1412 multiplexes the video stream and the audio stream to convert the streams into the data (file data) in the file format for recording.

The demultiplexing unit (DMUX) 1413 demultiplexes the bit stream in which the video stream and the audio stream are multiplexed, by a method corresponding to the multiplexing by the multiplexing unit (MUX) 1412. In other words, the demultiplexing unit (DMUX) 1413 extracts the video stream and the audio stream from the bit streams read out of the stream buffer 1414 (separates the video stream and the audio stream from each other). That is to say, the demultiplexing unit (DMUX) 1413 can convert the format of the stream by demultiplexing (inverted conversion of the conversion by the multiplexing unit (MUX) 1412). For example, the demultiplexing unit (DMUX) 1413 acquires the transport stream supplied from the connectivity 1321 or the broadband modem 1333 (both illustrated in FIG. 27) through the stream buffer 1414, and demultiplexes the stream, whereby the transport stream can be converted into the video stream and the audio stream. In another example, the demultiplexing unit (DMUX) 1413 acquires the file data read out from any of various recording media by the connectivity 1321 (FIG. 27) through the stream buffer 1414, and demultiplexes the stream, whereby the data can be converted into the video stream and the audio stream.

The stream buffer 1414 buffers the bit stream. For example, the stream buffer 1414 buffers the transport stream supplied from the multiplexing unit (MUX) 1412, and supplies the stream to the connectivity 1321 or the broadband modem 1333 (both illustrated in FIG. 27) at a predetermined timing or upon a request from the outside.

In another example, the stream buffer 1414 buffers the file data supplied from the multiplexing unit (MUX) 1412 and supplies the data to the connectivity 1321 (FIG. 27) or the like at a predetermined timing or upon a request from the outside, and records the data in any of various recording media.

Further, the stream buffer 1414 buffers the transport stream acquired through the connectivity 1321 or the broadband modem 1333 (both illustrated in FIG. 27), and supplies the stream to the demultiplexing unit (DMUX) 1413 at a predetermined timing or upon a request from the outside.

The stream buffer 1414 buffers the file data read out from any of various recording media at the connectivity 1321 (FIG. 27) or the like, and supplies the data to the demultiplexing unit (DMUX) 1413 at a predetermined timing or upon a request from the outside.

Next, an example of the operation of the video processor 1332 with the above structure is described. For example, the video signal input to the video processor 1332 from the connectivity 1321 (FIG. 27) or the like is converted into the digital image data of a predetermined format such as 4:2:2Y/Cb/Cr format in the video input processing unit 1401, and the image data are sequentially written in the frame memory 1405. The digital image data are read out by the first image magnifying/reducing unit 1402 or the second image magnifying/reducing unit 1403, are subjected to the format conversion into a predetermined format such as 4:2:0Y/Cb/Cr format and magnified or reduced, and then written in the frame memory 1405 again. The image data are encoded by the encode/decode engine 1407 and written in the video ES buffer 1408A as the video stream.

Moreover, the audio signal input from the connectivity 1321 (FIG. 27) or the like to the video processor 1332 is encoded by the audio encoder 1410, and written in the audio ES buffer 1409A as the audio stream.

The video stream of the video ES buffer 1408A and the audio stream of the audio ES buffer 1409A are read out by the multiplexing unit (MUX) 1412 and multiplexed therein to be converted into the transport stream or the file data, for example. The transport stream generated by the multiplexing unit (MUX) 1412 is buffered by the stream buffer 1414, and output to the external network through the connectivity 1321 or the broadband modem 1333 (both illustrated in FIG. 27). The file data generated by the multiplexing unit (MUX) 1412 are buffered by the stream buffer 1414 and then output to the connectivity 1321 (FIG. 27) or the like, and then recorded in any of various recoding media.

The transport stream input to the video processor 1332 from the external network through the connectivity 1321 or the broadband modem 1333 (both illustrated in FIG. 27) is buffered by the stream buffer 1414 and then demultiplexed by the demultiplexing unit (DMUX) 1413. The file data read out from any of various recording media and input to the video processor 1332 at the connectivity 1321 (FIG. 27) or the like are buffered by the stream buffer 1414 and then demultiplexed by the demultiplexing unit (DMUX) 1413. In other words, the file data or the transport stream input to the video processor 1332 is separated into the video stream and the audio stream by the demultiplexing unit (DMUX) 1413.

The audio stream is supplied to the audio decoder 1411 through the audio ES buffer 1409B and decoded, so that the audio signal is reproduced. The video stream is written in the video ES buffer 1408B and sequentially read out by the encode/decode engine 1407 and decoded, and written in the frame memory 1405. The decoded image data are magnified or reduced by the second image magnifying/reducing unit 1403 and written in the frame memory 1405. The decoded image data are read out by the video output processing unit 1404 and subjected to the format conversion into a predetermined format such as 4:2:2Y/Cb/Cr format, and are further converted into an analog signal, so that the video signal is reproduced and output.

When the present technique is applied to the video processor 1332 with this structure, the present technique according to any of the above embodiments may be applied to the encode/decode engine 1407. For example, the encode/decode engine 1407 may have a function of the image encoding device 11 (FIG. 1) and the image decoding device 51 (FIG. 3) according to the first embodiment. Thus, the video processor 1332 can provide the effect similar to the above effect described with reference to FIG. 1 to FIG. 15.

In the encode/decode engine 1407, the present technique (i.e., the function of the image encoding device and the image decoding device according to any of the above embodiments) may be achieved by hardware such as a logic circuit or software such as a built-in program, or both the hardware and the software.

[Another Structure Example of Video Processor]

Figure 29:
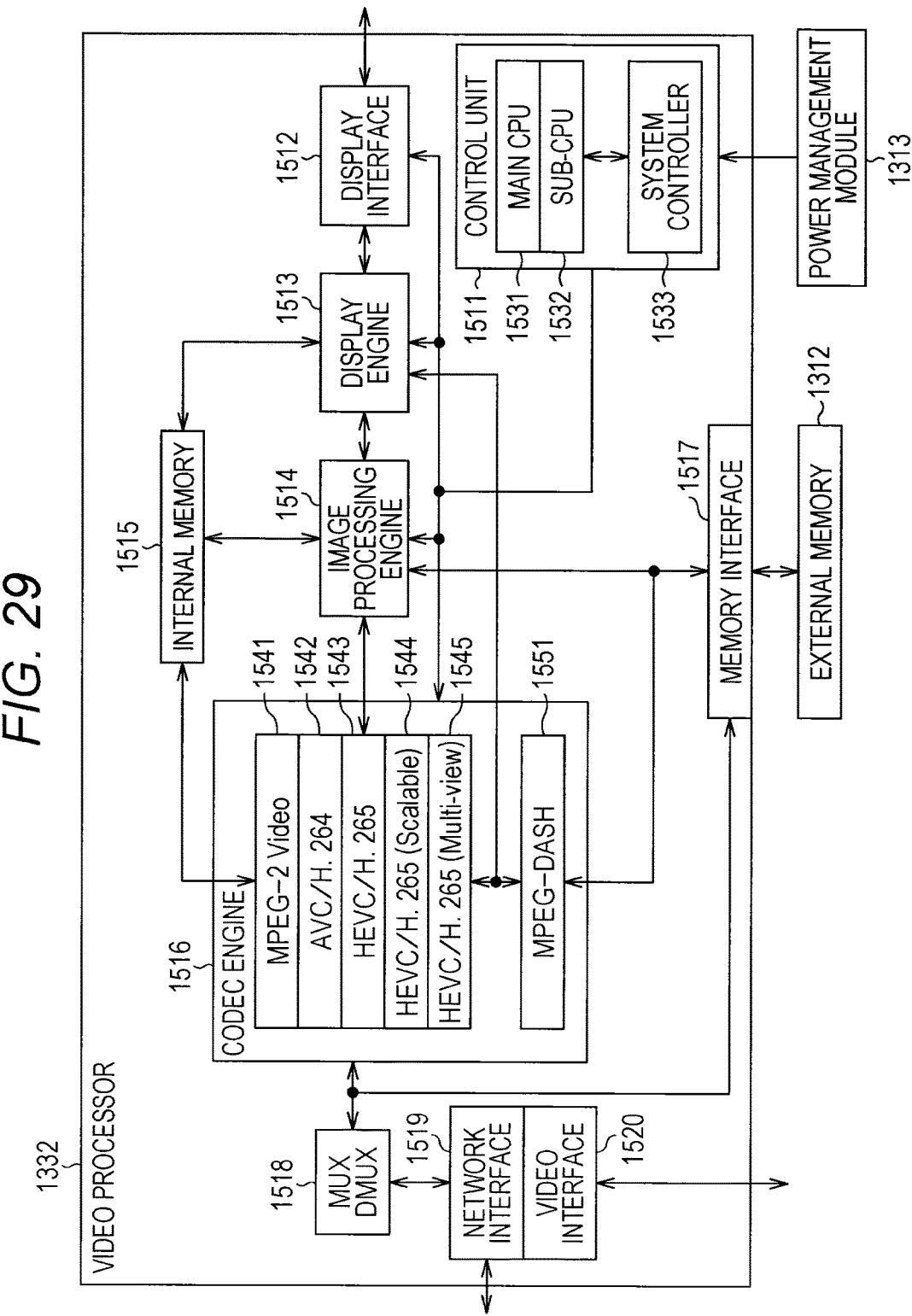
FIG. 29 is a block diagram illustrating another example of a schematic structure of a video processor.

FIG. 29 illustrates another example of a schematic structure of the video processor 1332 (FIG. 27) to which the present technique has been applied. In the case of the example of FIG. 29, the video processor 1332 has a function of encoding and decoding video data in a predetermined format.

More specifically, as illustrated in FIG. 29, the video processor 1332 includes a control unit 1511, a display interface 1512, a display engine 1513, an image processing engine 1514, and an internal memory 1515. The video processor 1332 includes a codec engine 1516, a memory interface 1517, a multiplexing/demultiplexing unit (MUX/DMUX) 1518, a network interface 1519, and a video interface 1520.

The control unit 1511 controls the operation of the processing units in the video processor 1332, such as the display interface 1512, the display engine 1513, the image processing engine 1514, and the codec engine 1516.

As illustrated in FIG. 29, the control unit 1511 includes, for example, a main CPU 1531, a sub CPU 1532, and a system controller 1533. The main CPU 1531 executes the programs and the like for controlling the operation of the processing units in the video processor 1332. The main CPU 1531 generates control signals in accordance with the programs and the like and supplies the signals to the processing units (i.e., controls the operation of the processing units). The sub CPU 1532 serves to assist the main CPU 1531. For example, the sub CPU 1532 executes the child process or subroutine of the programs executed by the main CPU 1531. The system controller 1533 controls the operation of the main CPU 1531 and the sub CPU 1532; for example, the system controller 1533 specifies the programs to be executed by the main CPU 1531 and the sub CPU 1532.

The display interface 1512 outputs the image data to, for example, the connectivity 1321 (FIG. 27) under the control of the control unit 1511. For example, the display interface 1512 converts the digital image data to the analog signals and outputs the data as the reproduced video signal or image data in the form of digital data to the monitor device or the like of the connectivity 1321 (FIG. 27).

Under the control of the control unit 1511, the display engine 1513 performs various conversion processes such as format conversion, size conversion, and color range conversion on the image data to suit the specification of the hardware such as the monitor device where the image is displayed.

The image processing engine 1514 performs a predetermined image process such as filtering for image quality improvement on the image data under the control of the control unit 1511.

The internal memory 1515 is the memory provided in the video processor 1332 and is shared among the display engine 1513, the image processing engine 1514, and the codec engine 1516. The internal memory 1515 is used to exchange data among the display engine 1513, the image processing engine 1514, and the codec engine 1516. For example, the internal memory 1515 stores the data supplied from the display engine 1513, the image processing engine 1514, and the codec engine 1516, and supplies the data to the display engine 1513, the image processing engine 1514, or the codec engine 1516 as necessary (or upon a request). The internal memory 1515 may be formed by any kind of storage device; generally, since the memory is used to store a small amount of data such as the image data or parameters in units of block, the memory 1515 is desirably formed by a semiconductor memory that has relatively small capacity (smaller capacity than the external memory 1312) but has high response speed, such as an SRAM (Static Random Access Memory).

The codec engine 1516 performs the processes for encoding or decoding the image data. The method of encoding or decoding by the codec engine 1516 is determined arbitrarily and the number of methods may be one or more than one. For example, the codec engine 1516 may have a codec function of a plurality of encoding/decoding methods, and may encode the image data or decode the encoded data by the selected method.

In the example illustrated in FIG. 29, the codec engine 1516 has, for example, MPEG-2 Video 1541, AVC/H.264 1542, HEVC/H.265 1543, HEVC/H.265 (Scalable) 1544, HEVC/H.265 (Multi-view) 1545, and MPEG-DASH 1551 as the function blocks of the process related to the codec.

MPEG-2 Video 1541 corresponds to the function block that encodes or decodes the image data in the MPEG-2 method. AVC/H.264 1542 corresponds to the function block that encodes or decodes the image data in the AVC method. HEVC/H.265 1543 corresponds to the function block that encodes or decodes the image data in the HEVC method. HEVC/H.265 (Scalable) 1544 corresponds to the function block that scalably encodes or scalably decodes the image data in the HEVC method. HEVC/H.265 (Multi-view) 1545 corresponds to the function block that encodes or decodes the image data with multiple viewpoints in the HEVC method.

MPEG-DASH 1551 corresponds to the function block that transmits or receives the image data in the MPEG-DASH (MPEG-Dynamic Adaptive Streaming over HTTP) method. MPEG-DASH is the technique of streaming the video using HTTP (HyperText Transfer Protocol), and one feature thereof is to select and transmit the appropriate piece of prepared encoded data with different resolutions, etc. in units of segment. MPEG-DASH 1551 generates the stream based on the specification or controls the transmission of the stream, and uses the aforementioned MPEG-2 Video 1541 to HEVC/H.265 (Multi-view) 1545 in the encoding and decoding of the image data.

The memory interface 1517 is the interface for the external memory 1312. The data supplied from the image processing engine 1514 or the codec engine 1516 are supplied to the external memory 1312 through the memory interface 1517. The data read out from the external memory 1312 are supplied to the video processor 1332 (image processing engine 1514 or codec engine 1516) through the memory interface 1517.

The multiplexing/demultiplexing unit (MUX/DMUX) 1518 multiplexes or demultiplexes various pieces of data related to the image, such as the bit stream of the encoded data, the image data, and the video signals. The method of the multiplexing/demultiplexing is determined arbitrarily. For example, in the multiplexing, in addition to collecting the plural pieces of data, the multiplexing/demultiplexing unit (MUX/DMUX) 1518 can add predetermined header information, etc. to the collected data. On the contrary, in the demultiplexing, in addition to dividing the data into plural pieces, the multiplexing/demultiplexing unit (MUX/DMUX) 1518 can add predetermined header information to the divided piece of data. In other words, the multiplexing/demultiplexing unit (MUX/DMUX) 1518 can convert the format of the data by the multiplexing/demultiplexing. For example, the multiplexing/demultiplexing unit (MUX/DMUX) 1518 can convert the bit stream into the transport stream, which is the bit stream in the format for transport, or the data in the file format for recording (file data) by multiplexing the bit stream. Needless to say, the inverse conversion is also possible by the demultiplexing.

The network interface 1519 is the interface for the broadband modem 1333 and the connectivity 1321 (both illustrated in FIG. 27), etc. The video interface 1520 is the interface for the connectivity 1321 and the camera 1322 (both illustrated in FIG. 27), etc.

Next, an example of the operation of the video processor 1332 as above is described. For example, upon the reception of the transport stream from the external network through the connectivity 1321 or the broadband modem 1333 (both illustrated in FIG. 27), the transport stream is supplied to the multiplexing/demultiplexing unit (MUX/DMUX) 1518 through the network interface 1519, demultiplexed therein, and decoded by the codec engine 1516. The image data obtained by the decoding of the codec engine 1516 are subjected to a predetermined image process by the image processing engine 1514, for example, and to a predetermined conversion by the display engine 1513 and the data are supplied to the connectivity 1321 (FIG. 27) or the like through the display interface 1512; thus, the image is displayed on the monitor. In another example, the image data obtained by the decoding of the codec engine 1516 are encoded again by the codec engine 1516 and multiplexed by the multiplexing/demultiplexing unit (MUX/DMUX) 1518 and converted into the file data; then, the data are output to the connectivity 1321 (FIG. 27) or the like through the video interface 1520 and recorded in any of various recording media.

In another example, the file data of the encoded data in which the image data are encoded, which have been read out from the unshown recording medium, by the connectivity 1321 (FIG. 27) or the like are supplied to the multiplexing/demultiplexing unit (MUX/DMUX) 1518 through the video interface 1520 and demultiplexed therein, and decoded by the codec engine 1516. The image data obtained by the decoding of the codec engine 1516 are subjected to a predetermined image process by the image processing engine 1514, and to a predetermined conversion by the display engine 1513; then, the data are supplied to the connectivity 1321 (FIG. 27) or the like through the display interface 1512 and the image is displayed on the monitor. In another example, the image data obtained by the decoding of the codec engine 1516 are encoded again by the codec engine 1516 and multiplexed by the multiplexing/demultiplexing unit (MUX/DMUX) 1518 and converted into the transport stream; then, the data are supplied to the connectivity 1321 or the broadband modem 1333 (both illustrated in FIG. 27) or the like through the network interface 1519 and transmitted to another device which is not shown.

The image data or another piece of data is exchanged among the processing units in the video processor 1332 through, for example, the internal memory 1515 or the external memory 1312. The power management module 1313 controls the power supply to the control unit 1511, for example.

In the case of applying the present technique to the video processor 1332 with the structure as above, the present technique according to any of the above embodiments may be applied to the codec engine 1516. In other words, for example, the codec engine 1516 may have the function block that achieves the image encoding device 11 (FIG. 1) and the image decoding device 51 (FIG. 3) according to the first embodiment. Thus, the video processor 1332 can provide the effect similar to the above effect described with reference to FIG. 1 to FIG. 15.

In the codec engine 1516, the present technique (i.e., the function of the image encoding device and the image decoding device according to any of the above embodiments) may be achieved by hardware such as a logic circuit or software such as a built-in program, or both the hardware and the software.

The two examples have been described as the structure of the video processor 1332; however, the structure of the video processor 1332 may be determined arbitrarily and may be other than the above two examples. The video processor 1332 may be configured as one semiconductor chip or as a plurality of semiconductor chips. For example, a three-dimensional multilayer LSI in which a plurality of semiconductor layers are stacked may be used. Alternatively, a plurality of LSIs may be used.

[Example of Application to Device]

The video set 1300 can be incorporated into various devices that process the image data. For example, the video set 1300 can be incorporated in the television device 900 (FIG. 23), the cellular phone 920 (FIG. 24), the recording/reproducing device 940 (FIG. 25), the photographing device 960 (FIG. 26), or the like. By having the video set 1300 incorporated, the device can have the effect similar to the effect described with reference to FIG. 1 to FIG. 15.

Even a part of each structure of the above video set 1300 can be regarded as the structure to which the present technique has been applied as long as the structure includes the video processor 1332. For example, just the video processor 1332 can be embodied as the video processor to which the present technique has been applied. Further, for example, as described above, the processor or the video module 1311, which is illustrated by the dotted line 1341, can be embodied as the processor or the module to which the present technique has been applied. Moreover, for example, the video module 1311, the external memory 1312, the power management module 1313, and the front end module 1314 can be combined to be embodied as a video unit 1361 to which the present technique has been applied. In any structure, the effect similar to the effect described with reference to FIG. 1 to FIG. 15 can be obtained.

As long as the structure includes the video processor 1332, the structure can be incorporated in various devices that process image data in a manner similar to the video set 1300. For example, the video processor 1332, the processor indicated by the dotted line 1341, the video module 1311, or the video unit 1361 can be incorporated in the television device 900 (FIG. 23), the cellular phone 920 (FIG. 24), the recording/reproducing device 940 (FIG. 25), or the photographing device 960 (FIG. 26). By incorporating any of the above structures to which the present technique has been applied, the device can have the effect similar to the effect described with reference to FIG. 1 to FIG. 15, in a manner similar to the case of the video set 1300.

In this specification, description has been made of the example in which various pieces of information such as the parameter of the deblocking filter and the parameter of the adaptive offset filter are multiplexed on the encoded stream and transmitted from the encoding side to the decoding side. The method of transmitting the information, however, is not limited to this example. For example, these pieces of information may be transmitted or recorded as the separate pieces of data that are correlated to the encoded bit stream without being multiplexed on the encoded bit stream. Here, "correlation" refers to the link of the image included in the bit stream (may be a part of the image such as slice or block) and the information corresponding to the image at the decoding. In other words, the information may be transmitted on a transmission path separate from the image (or bit stream). Alternatively, the information may be recorded in a recording medium separate from the image (or bit stream) (or in another recording area of the same recording medium). The information and the image (or bit stream) may be correlated to each other in any unit, such as in a plurality of frames, one frame, or a part of a frame.

The preferred embodiments of the present disclosure have been described with reference to the attached drawings; however, the present disclosure is not limited to the examples above. It is apparent that a person skilled in the art to which the present disclosure pertains can conceive various modifications or improvements in the scope of technical thoughts described in the scope of claims, and those are included in the range of the technique according to the present disclosure.

The present technique can have any of the structures described below.

(1) An image processing device including:
a filter determination unit that determines whether to apply a strong filter by using a strength parameter representing strength of a deblocking filter for a block boundary, which is a boundary between a block of an image locally decoded when an image is encoded, and an adjacent block adjacent to the block;
a filter unit that applies the strong filter for the block boundary if the filter determination unit has determined to apply the strong filter; and
an encoding unit that encodes the image in units having a layer structure by using the image to which the strong filter has been applied by the filter unit.

(2) The image processing device according to (1), wherein the filter determination unit determines whether to apply the strong filter by using the strength parameter representing the strength of the deblocking filter for the block boundary and a determination parameter representing a threshold used in the determination of the deblocking filter.

(3) The image processing device according to (2), wherein whether to apply the strong filter is determined using a value obtained by multiplying the strength parameter by the determination parameter.

(4) The image processing device according to (2), wherein the filter determination unit determines whether to apply the strong filter by using a function in which the strength parameter or the determination parameter is used as a variable.

(5) The image processing device according to any of (2) to (4), wherein the filter determination unit determines whether to apply the strong filter by using a linear function of the strength parameter and the determination parameter.

(6) The image processing device according to any of (2) to (5), wherein the strength parameter is a parameter that is larger when a prediction mode is intra prediction than when the prediction mode is inter prediction.

(7) The image processing device according to any of (2) to (6), wherein the strength parameter is Bs (Boundary Filtering Strength) value.

(8) The image processing device according to any of (2) to (7), wherein the determination parameter is beta used in the determination of whether to apply the deblocking filter and the determination of strength selection of the deblocking filter.

(9) An image processing method wherein an image processing device performs the steps of:
determining whether to apply a strong filter by using a strength parameter representing strength of a deblocking filter for a block boundary, which is a boundary between a block of an image locally decoded when an image is encoded, and an adjacent block adjacent to the block;
applying the strong filter for the block boundary if it has been determined to apply the strong filter; and
encoding the image in units having a layer structure by using the image to which the strong filter has been applied.

REFERENCE SIGNS LIST

11 Image encoding device
31, 31a, 31b Deblocking filter
51 Image decoding device
101 Image memory
102 Block boundary determination unit
103 Filter strength determination unit
104 Filter calculation unit
105 Coefficient memory
106 Control unit

The invention claimed is:

1. An image processing device comprising:
circuitry configured to
determine, for a first layer of an image having a plurality of layers, whether to apply a deblocking filter including a first deblocking filter and a second deblocking filter having a stronger filter than the first deblocking filter by using a strength parameter representing strength of a deblocking filter for a block boundary, which is a boundary between a block of the image locally decoded when an image is encoded, and an adjacent block adjacent to the block;
apply the second deblocking filter for the block boundary if the circuitry has determined to apply the second deblocking filter;
apply, to another layer of the image, at least one of the strength parameter and a result of determination of whether to apply the deblocking filter; and
encode the image in coding blocks formed by recursively splitting a coding tree block into smaller coding blocks as block partitioning by using the image to which the second deblocking filter has been applied,
wherein the circuitry is configured to determine whether to apply the second deblocking filter by using the strength parameter representing the strength of the deblocking filter for the block boundary and a determination parameter representing a threshold used in the determination of the deblocking filter, and wherein whether to apply the second deblocking filter is determined by obtaining the determination filter from a table and then comparing a value obtained by multiplying the strength parameter by the determination parameter with a threshold.

2. The image processing device according to claim 1, wherein the circuitry is configured to determine whether to apply the second deblocking filter by using a function in which the strength parameter or the determination parameter is used as a variable.

3. The image processing device according to claim 2, wherein the circuitry is configured to determine whether to apply the second deblocking filter by using a linear function of the strength parameter and the determination parameter.

4. The image processing device according to claim 1, wherein the strength parameter is a parameter that is larger when a prediction mode is intra prediction than when the prediction mode is inter prediction.

5. The image processing device according to claim 4, wherein the strength parameter is Bs (Boundary Filtering Strength) value.

6. The image processing device according to claim 1, wherein the determination parameter is beta used in the determination of whether to apply the deblocking filter and the determination of strength selection of the deblocking filter.

7. An image processing method wherein an image processing device performs the steps of:
determining, using circuitry, for a first layer of an image having a plurality of layers, whether to apply a deblocking filter including a first deblocking filter and a second deblocking filter having a stronger filter than the first deblocking filter by using a strength parameter representing strength of a deblocking filter for a block boundary, which is a boundary between a block of an image locally decoded when an image is encoded, and an adjacent block adjacent to the block;

applying, using the circuitry, the second deblocking filter for the block boundary if it has been determined to apply the second deblocking filter;

applying, using the circuitry, to another layer of the image, at least one of the strength parameter and a result of determination of whether to apply the deblocking filter; and encoding, using the circuitry, the image in coding blocks formed by recursively splitting a coding tree block into smaller coding blocks as block partitioning by using the image to which the second deblocking filter has been applied, wherein whether to apply the second deblocking filter is determined by using the strength parameter representing the strength of the deblocking filter for the block boundary and a determination parameter representing a threshold used in the determination of the deblocking filter, and wherein whether to apply the second deblocking filter is determined by obtaining the determination filter from a table and then comparing a value obtained by multiplying the strength parameter by the determination parameter with a threshold.

* * * * *